United States Patent
Jin et al.

(10) Patent No.: US 11,411,620 B2
(45) Date of Patent: Aug. 9, 2022

(54) PRECODING VECTOR INDICATION METHOD, PRECODING VECTOR DETERMINING METHOD, AND COMMUNICATIONS APPARATUS

(71) Applicant: HUAWEI TECHNOLOGIES CO., LTD., Guangdong (CN)

(72) Inventors: Huangping Jin, Shanghai (CN); Xiaohan Wang, Shanghai (CN); Haifan Yin, Shenzhen (CN); Peng Shang, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/176,529

(22) Filed: Feb. 16, 2021

(65) Prior Publication Data

US 2021/0194547 A1    Jun. 24, 2021

Related U.S. Application Data

(63) Continuation of application No. PCT/CN2019/095946, filed on Jul. 15, 2019.

(30) Foreign Application Priority Data

Aug. 20, 2018 (CN) .......................... 201810948970.2

(51) Int. Cl.
*H04B 7/04* (2017.01)
*H04B 7/0456* (2017.01)

(52) U.S. Cl.
CPC .................. *H04B 7/0456* (2013.01)

(58) Field of Classification Search
CPC .................................... H04B 7/0456
See application file for complete search history.

(56) References Cited

U.S. PATENT DOCUMENTS 9,654,195 B2    5/2017 Rahman et al.
2016/0142117 A1* 5/2016 Rahman ............... H04B 7/0469
                                                                375/267
(Continued)

FOREIGN PATENT DOCUMENTS

CN        102111197 A    6/2011
CN        104202276 A    12/2014
(Continued)

OTHER PUBLICATIONS

3GPP TR 36.897 V1.0.1 (Jun. 2015), "3rd Generation Partnership Project;Technical Specification Group Radio Access Network; Study on Elevation Beamforming/Full-Dimension (FD) MIMO for LTE (Release 13)," Jun. 2015, 58 pages.

(Continued)

*Primary Examiner* — Curtis B Odom
(74) *Attorney, Agent, or Firm* — Fish & Richardson P.C.

(57) ABSTRACT

This application provides methods and apparatuses for precoding vector indication and determination. One method includes: generating, by a first communications device, first indication information that indicates one or more port selection vectors, one or more frequency domain vectors, and one or more linear combination coefficients, wherein each of the one or more linear combination coefficients corresponds to a port selection vector and a frequency domain vector, each of the one or more port selection vectors indicates a port of a precoded reference signal, and each of the one or more frequency domain vectors indicates a variation pattern of a channel in a frequency domain; and sending the first indication information to a second communications device.

33 Claims, 9 Drawing Sheets

(56) References Cited

U.S. PATENT DOCUMENTS

| | | | |
|---|---|---|---|
| 2017/0302344 A1 | 10/2017 | Lin et al. | |
| 2018/0019899 A1 | 1/2018 | Kuchi | |
| 2018/0091197 A1 | 3/2018 | Huang et al. | |

FOREIGN PATENT DOCUMENTS

| | | |
|---|---|---|
| CN | 105637827 A | 6/2016 |
| CN | 107529691 A | 1/2018 |
| CN | 108111206 A | 6/2018 |
| CN | 108418612 A | 8/2018 |

OTHER PUBLICATIONS

3GPP TS 38.214 V15.2.0 (Jun. 2018), "3rd Generation Partnership Project; Technical Specification Group Radio Access Network; NR; Physical layer procedures for data (Release 15);" Jun. 2018, 95 pages.

Huawei et al.,"Further enhancements on CSI reporting and codebook design," 3GPP TSG RAN WG1 Meeting #92 R1-1802074, Athens, Greece, Feb. 26-Mar. 2, 2018, 5 pages.

Intel Corporation, "Remaining issues on CSI reporting," 3GPP TSG RAN WG1 NR Ad-Hoc#3, R1-1716293, Nagoya, Japan, Sep. 18-21, 2017, 10 pages.

PCT International Search Report and Written Opinion issued in International Application No. PCT/CN2019/095946 dated Sep. 27, 2019, 15 pages (with English translation).

Office Action issued in Chinese Application No. 201810948970.2 dated Jun. 28, 2021, 8 pages.

Huawei, HiSilicon, "Further enhancements on CSI reporting and codebook design," 3GPP TSG RAN WG1 Meeting #93, R1-1807128, Busan, Korea, May 21-25, 2018, 6 pages.

Extended European Search Report issued in European Application No. 19852593.3 dated Aug. 18, 2021, 10 pages.

Huawei, HiSilicon, "CSI feedback for beam space MIMO," 3GPP TSG-RAN WG1 Meeting #85, R1-164090, Nanjing, China, May 23-27, 2016, 3 pages.

Huawei, HiSilicon, "Enhancements on CSI reporting and codebook design," 3GPP TSG RAN WG1 Meeting #94. R1-1808949, Gothenburg, Sweden, Aug. 20-24, 2018, 7 pages.

Office Action issued in Japanese Application No. 2021-509808 dated Apr. 12, 2022, 8 pages (with English translation).

\* cited by examiner

PRECODING VECTOR INDICATION METHOD, PRECODING VECTOR DETERMINING METHOD, AND COMMUNICATIONS APPARATUS

CROSS-REFERENCE TO RELATED APPLICATIONS

This application is a continuation of International Application No. PCT/CN2019/095946, filed on Jul. 15, 2019, which claims priority to Chinese Patent Application No. 201810948970.2, filed on Aug. 20, 2018. The disclosures of the aforementioned applications are hereby incorporated by reference in their entireties.

TECHNICAL FIELD

This application relates to the wireless communications field, and more specifically, to a precoding matrix indication method, a precoding matrix determining method, and a communications apparatus.

BACKGROUND

In a massive multiple-input multiple-output (Massive MIMO) technology, interference between a plurality of users and interference between a plurality of signal streams of a same user may be reduced through precoding. This helps improve signal quality, implement spatial multiplexing, and improve spectrum utilization.

Currently, a precoding matrix feedback method is known. A terminal device may perform channel measurement based on a received reference signal to determine an ideal precoding matrix, and feed back the ideal precoding matrix to a network device by using a precoding matrix indicator (PMI). The reference signal received by the terminal device may be a reference signal that is precoded, and may be referred to as a beamformed reference signal or a precoded reference signal.

To improve feedback precision and enable the network device to obtain a precoding matrix that is relatively similar to the ideal precoding matrix, the terminal device may indicate the ideal precoding matrix to the network device in a two-level feedback manner combining a wideband feedback and a subband feedback. Specifically, the terminal device may indicate a selected port and a wideband amplitude coefficient of each port by using the wideband feedback, and may indicate, by using the subband feedback, a coefficient that can be used for each subband. For example, the subband coefficient may include a subband amplitude coefficient and a subband phase coefficient. The network device may obtain, by integrating the information indicated by the wideband feedback and the information indicated by the subband feedback, a precoding matrix approximate to the ideal precoding matrix.

To improve spectrum resource utilization, the network device may transmit data to the terminal device through a plurality of transport layers. However, if the terminal device performs the foregoing wideband feedback and subband feedback based on each transport layer, relatively large feedback overheads may be caused.

SUMMARY

This application provides a precoding vector indication method, a precoding vector determining method, and a communications apparatus, to reduce feedback overheads.

According to a first aspect, a precoding vector indication method is provided. The method may be performed by a terminal device, or may be performed by a chip configured in a terminal device.

The method includes: generating first indication information, where the first indication information is used to indicate one or more port selection vectors, one or more frequency domain vectors, and one or more linear combination coefficients, each linear combination coefficient is a linear combination coefficient corresponding to one port selection vector and one frequency domain vector, each port selection vector is used to indicate a port of one reference signal, the reference signal is a precoded reference signal, and each frequency domain vector is used to indicate a variation pattern of a channel in frequency domain; and sending the first indication information.

According to a second aspect, a precoding vector determining method is provided. The method may be performed by a network device, or may be performed by a chip configured in a network device.

The method includes: receiving first indication information, where the first indication information is used to indicate one or more port selection vectors, one or more frequency domain vectors, and one or more linear combination coefficients, each linear combination coefficient is a linear combination coefficient corresponding to one port selection vector and one frequency domain vector, each port selection vector is used to indicate a port of one reference signal, the reference signal is a precoded reference signal, and each frequency domain vector is used to indicate a variation pattern of a channel in frequency domain; and determining a precoding matrix vector based on the first indication information.

Based on the foregoing technical solutions, the terminal device may feed back a precoding vector of each subband to the network device by using the port selection vector, the frequency domain vector, and the linear combination coefficient. The network device may restore the precoding vector of each subband in a corresponding manner. In the embodiments of this application, one or more frequency domain vectors are used to describe different variation patterns of the channel in frequency domain, and a variation of the channel in frequency domain is stimulated through linear combination of the one or more frequency domain vectors, so that a relationship between subbands is fully explored. Variation patterns of all subbands are described by using a relatively small quantity of frequency domain vectors and continuity of the frequency domain, thereby reducing feedback overheads. Compared with an existing technology, a subband combination coefficient does not need to be independently reported based on each subband, and when a quantity of subbands increases, feedback overheads do not multiply. Therefore, feedback overheads can be greatly reduced, and approximate precision of a Type II codebook can also be ensured.

With reference to the first aspect, in some possible implementations, the method further includes: receiving second indication information, where the second indication information is used to indicate a length of the port selection vector.

Correspondingly, with reference to the second aspect, in some possible implementations, the method further includes: sending second indication information, where the second indication information is used to indicate a length of the port selection vector.

It should be understood that the length of the port selection vector may be indicated by the network device, or may be predefined, for example, defined in a protocol. This is not limited in this application.

With reference to the first aspect, in some possible implementations, the method further includes: receiving third indication information, where the third indication information is used to indicate a length of the frequency domain vector.

Correspondingly, with reference to the second aspect, in some possible implementations, the method further includes: sending third indication information, where the third indication information is used to indicate a length of the frequency domain vector.

It should be understood that the length of the frequency domain vector may be indicated by the network device, or may be predefined, for example, defined in a protocol. This is not limited in this application.

With reference to the first aspect or the second aspect, in some possible implementations, the first indication information is specifically used to indicate L port selection vectors, K frequency domain vectors, and P*L*K linear combination coefficients. The L port selection vectors are port selection vectors in each of P polarization directions, the K frequency domain vectors are frequency domain vectors in each of the P polarization directions, and each of the P*L*K linear combination coefficients corresponds to one port selection vector and one frequency domain vector in each of the P polarization directions, where $L \geq 1$, $K \geq 1$, $P \geq 1$, and L, K, and P are integers.

In other words, when there are a plurality of polarization directions, L port selection vectors in a first polarization direction are the same as L port selection vectors in a second polarization direction, and K frequency domain vectors in the first polarization direction are the same as K frequency domain vectors in the second polarization direction. The first polarization direction and the second polarization direction may be any two polarization directions in the plurality of polarization directions. In other words, the plurality of polarization directions may share the port selection vector and the frequency domain vector.

The L port selection vectors may be obtained from a predefined port selection vector set, and the port selection vector set includes a plurality of port selection vectors. The K frequency domain vectors may be obtained from a predefined frequency domain vector set, and the frequency domain vector set includes a plurality of frequency domain vectors. When used to indicate the L port selection vectors and the K frequency domain vectors, the first indication information may be specifically used to indicate indexes of the L port selection vectors in the port selection vector set and indexes of the K frequency domain vectors in the frequency domain vector set.

Further, optionally, the port selection vector set may be extended to a plurality of subsets by using an oversampling factor, and each subset includes a plurality of port selection vectors. The L port selection vectors are obtained from a subset in the predefined port selection vector set. Therefore, when used to indicate the L port selection vectors, the first indication information is specifically used to indicate the subset and indexes of the L port selection vectors in the subset.

With reference to the first aspect or the second aspect, in some possible implementations, the first indication information is specifically used to indicate P*L port selection vectors, K frequency domain vectors, and P*L*K linear combination coefficients. The P*L port selection vectors are port selection vectors in P polarization directions, a quantity of port selection vectors in each polarization direction is L, the K frequency domain vectors are frequency domain vectors in each of the P polarization directions, and each of the P*L*K linear combination coefficients corresponds to one port selection vector and one frequency domain vector in each of the P polarization directions, where $L \geq 1$, $K \geq 1$, $P \geq 1$, and L, K, and P are integers.

In other words, when there are a plurality of polarization directions, L port selection vectors in a first polarization direction are different from L port selection vectors in a second polarization direction, and K frequency domain vectors in the first polarization direction are the same as K frequency domain vectors in the second polarization direction. The first polarization direction and the second polarization direction may be any two polarization directions in the plurality of polarization directions. In other words, the plurality of polarization directions may share the port selection vector, but do not share the frequency domain vector.

The P*L port selection vectors may be obtained from a predefined port selection vector set, and the port selection vector set includes a plurality of port selection vectors. The K frequency domain vectors may be obtained from a predefined frequency domain vector set, and the frequency domain vector set includes a plurality of frequency domain vectors. When used to indicate the P*L port selection vectors and the K frequency domain vectors, the first indication information may be specifically used to indicate indexes of the L port selection vectors in each of the P polarization directions in the port selection vector set and indexes of the K frequency domain vectors in the frequency domain vector set.

Further, optionally, the port selection vector set may be extended to a plurality of subsets by using an oversampling factor, and each subset includes a plurality of port selection vectors. The L port selection vectors in each of the P polarization directions may be obtained from a subset in the predefined port selection vector set. Therefore, when used to indicate the P*L port selection vectors, the first indication information is specifically used to indicate P subsets corresponding to the P polarization directions and indexes of the L port selection vectors in each polarization direction in a corresponding subset.

With reference to the first aspect or the second aspect, in some possible implementations, the first indication information is specifically used to indicate P*L port selection vectors, P*K frequency domain vectors, and P*L*K linear combination coefficients. The P*L port selection vectors are port selection vectors in P polarization directions, a quantity of port selection vectors in each polarization direction is L, the P*K frequency domain vectors are frequency domain vectors in the P polarization directions, a quantity of frequency domain vectors in each polarization direction is K, and each of the P*L*K linear combination coefficients corresponds to one port selection vector and one frequency domain vector in each of the P polarization directions, where $L \geq 1$, $K \geq 1$, $P \geq 1$, and L, K, and P are integers.

In other words, when there are a plurality of polarization directions, L port selection vectors in a first polarization direction are different from L port selection vectors in a second polarization direction, and K frequency domain vectors in the first polarization direction are different from K frequency domain vectors in the second polarization direction. The first polarization direction and the second polarization direction may be any two polarization directions in the plurality of polarization directions. In other words, the plurality of polarization directions may not share the port selection vector, and do not share the frequency domain vector.

The P*L port selection vectors may be obtained from a predefined port selection vector set, and the port selection vector set includes a plurality of port selection vectors. The P*K frequency domain vectors may be obtained from a predefined frequency domain vector set, and the frequency domain vector set includes a plurality of frequency domain vectors. When used to indicate the P*L port selection vectors and the P*K frequency domain vectors, the first indication information may be specifically used to indicate indexes of the L port selection vectors in each of the P polarization directions in the port selection vector set and indexes of the K frequency domain vectors in each of the P polarization directions in the frequency domain vector set.

Further, optionally, the port selection vector set may be extended to a plurality of subsets by using an oversampling factor, and each subset includes a plurality of port selection vectors. The L port selection vectors in each of the P polarization directions may be obtained from a subset in the predefined port selection vector set. Therefore, when used to indicate the P*L port selection vectors, the first indication information is specifically used to indicate P subsets corresponding to the P polarization directions and indexes of the L port selection vectors in each polarization direction in a corresponding subset.

With reference to the first aspect or the second aspect, in some possible implementations, the first indication information is specifically used to indicate L port selection vectors, P*K frequency domain vectors, and P*L*K linear combination coefficients. The L port selection vectors are port selection vectors in each of P polarization directions, the P*K frequency domain vectors are frequency domain vectors in the P polarization directions, and each of the P*L*K linear combination coefficients corresponds to one port selection vector and one frequency domain vector in each of the P polarization directions, where $L \geq 1$, $K \geq 1$, $P \geq 1$, and L, K, and P are integers.

In other words, when there are a plurality of polarization directions, L port selection vectors in a first polarization direction are the same as L port selection vectors in a second polarization direction, and K frequency domain vectors in the first polarization direction are different from K frequency domain vectors in the second polarization direction. The first polarization direction and the second polarization direction may be any two polarization directions in the plurality of polarization directions. In other words, the plurality of polarization directions may share the port selection vector, but do not share the frequency domain vector.

The L port selection vectors may be obtained from a predefined port selection vector set, and the port selection vector set includes a plurality of port selection vectors. The P*K frequency domain vectors may be obtained from a predefined frequency domain vector set, and the frequency domain vector set includes a plurality of frequency domain vectors. When used to indicate the L port selection vectors and the P*K frequency domain vectors, the first indication information may be specifically used to indicate indexes of the L port selection vectors in the port selection vector set and indexes of the K frequency domain vectors in each of the P polarization directions in the frequency domain vector set.

Further, optionally, the port selection vector set may be extended to a plurality of subsets by using an oversampling factor, and each subset includes a plurality of port selection vectors. The L port selection vectors are obtained from a subset in the predefined port selection vector set. Therefore, when used to indicate the L port selection vectors, the first indication information is specifically used to indicate the subset and indexes of the L port selection vectors in the subset.

According to a third aspect, a precoding vector indication method is provided. The method may be performed by a terminal device, or may be performed by a chip configured in a terminal device.

The method includes: generating fourth indication information, where the fourth indication information is used to indicate one or more space-frequency vectors and a linear combination coefficient of each space-frequency vector, where the space-frequency vector is a Kronecker product of a port selection vector and a frequency domain vector, each port selection vector is used to indicate a port of one reference signal, the reference signal is a precoded reference signal, and each frequency domain vector is used to indicate a variation pattern of a channel in frequency domain; and sending the fourth indication information.

According to a fourth aspect, a precoding vector determining method is provided. The method may be performed by a network device, or may be performed by a chip configured in a network device.

The method includes: receiving fourth indication information, where the fourth indication information is used to indicate one or more space-frequency vectors and a linear combination coefficient of each space-frequency vector, where the space-frequency vector is a Kronecker product of a port selection vector and a frequency domain vector, each port selection vector is used to indicate a port of one reference signal, the reference signal is a precoded reference signal, and each frequency domain vector is used to indicate a variation pattern of a channel in frequency domain; and determining a precoding vector based on the fourth indication information.

Based on the foregoing technical solutions, the terminal device may feed back a precoding vector of each subband to the network device by using the space-frequency vector and the linear combination coefficient of the space-frequency vector. The network device may restore the precoding vector of each subband in a corresponding manner. In this embodiment of this application, the port selection vector and the frequency domain vector are combined to describe a variation pattern of the channel in space domain and frequency domain. Because the frequency domain vector is effectively used and a relationship between subbands is fully explored, variation patterns of all subbands are described by using a relatively small quantity of frequency domain vectors and continuity of the frequency domain, thereby reducing feedback overheads. Compared with an existing technology, a subband combination coefficient does not need to be independently reported based on each subband, and when a quantity of subbands increases, feedback overheads do not multiply. Therefore, feedback overheads can be greatly reduced, and approximate precision of a Type II codebook can also be ensured.

With reference to the third aspect, in some possible implementations, the method further includes: receiving second indication information, where the second indication information is used to indicate a length of the port selection vector.

Correspondingly, with reference to the fourth aspect, in some possible implementations, the method further includes: sending second indication information, where the second indication information is used to indicate a length of the port selection vector.

It should be understood that the length of the port selection vector may be indicated by the network device, or may be predefined, for example, defined in a protocol. This is not limited in this application.

With reference to the third aspect, in some possible implementations, the method further includes: receiving third indication information, where the third indication information is used to indicate a length of the frequency domain vector.

Correspondingly, with reference to the fourth aspect, in some possible implementations, the method further includes: sending third indication information, where the third indication information is used to indicate a length of the frequency domain vector.

It should be understood that the length of the frequency domain vector may be indicated by the network device, or may be predefined, for example, defined in a protocol. This is not limited in this application.

With reference to the third aspect or the fourth aspect, in some possible implementations, the fourth indication information is specifically used to indicate L space-frequency vectors and P*L linear combination coefficients, the L space-frequency vectors are space-frequency vectors in each of P polarization directions, each of the P*L linear combination coefficients corresponds to one space-frequency vector in each of the P polarization directions, L≥1, P≥1, and both L and P are integers.

In other words, when there are a plurality of polarization directions. L space-frequency vectors in a first polarization direction are the same as L space-frequency vectors in a second polarization direction. In other words, the plurality of polarization directions may share the space-frequency vector.

The L space-frequency vectors may be obtained from a predefined space-frequency vector set, and the space-frequency vector set includes a plurality of space-frequency vectors. When used to indicate the L space-frequency vectors, the fourth indication information is specifically used to indicate indexes of the L space-frequency vectors in the space-frequency vector set.

Further, optionally, the space-frequency vector set may be extended to a plurality of subsets by using an oversampling factor, and each subset includes a plurality of space-frequency vectors. The L space-frequency vectors are obtained from a subset in the predefined space-frequency vector set. Therefore, when used to indicate the L space-frequency vectors, the fourth indication information is specifically used to indicate the subset and indexes of the L space-frequency vectors in the subset.

With reference to the third aspect or the fourth aspect, in some possible implementations, the fourth indication information is used to indicate P*L space-frequency vectors and P*L linear combination coefficients. The P*L space-frequency vectors are space-frequency vectors in P polarization directions, each of the P*L linear combination coefficients corresponds to one space-frequency vector in each of the P polarization directions, and a quantity of space-frequency vectors in each polarization direction is L, where L≥1, P≥1, and both L and P are integers.

In other words, when there are a plurality of polarization directions, L space-frequency vectors in a first polarization direction are different from L space-frequency vectors in a second polarization direction. In other words, the plurality of polarization directions do not share the space-frequency vector.

Further, optionally, the space-frequency vector set may be extended to a plurality of subsets by using an oversampling factor, and each subset includes a plurality of space-frequency vectors. The L space-frequency vectors in each of the P polarization directions are obtained from a subset in the predefined space-frequency vector set. Therefore, when used to indicate the P*L space-frequency vectors, the fourth indication information is specifically used to indicate P subsets corresponding to the P polarization directions and indexes of the L space-frequency vectors in each polarization direction in a corresponding subset.

With reference to the first aspect to the fourth aspect, in some possible implementations, the length of the frequency domain vector is: a quantity of subbands included in pilot transmission bandwidth configured for the terminal device, a length of signaling used to indicate a position of a to-be-reported subband and a quantity of to-be-reported subbands, or a quantity of to-be-reported subbands.

The pilot transmission bandwidth is bandwidth configured to transmit a reference signal, and the reference signal is a reference signal used for channel measurement. The signaling used to indicate the position of the to-be-reported subband and the quantity of to-be-reported subbands may be, for example, reporting bandwidth reporting band.

With reference to the first aspect to the fourth aspect, in some possible implementations, the length of the port selection vector is a quantity of ports of the reference signal.

When polarization directions of transmit antennas are not considered or transmit antennas are single polarization transmit antennas, the length of the port selection vector may be the quantity of ports of the reference signal.

With reference to the first aspect to the fourth aspect, in some possible implementations, the length of the port selection vector is a quantity of ports of the reference signal in one polarization direction.

When transmit antennas are configured with a plurality of polarization directions, the length of the port selection vector may be the quantity of ports of the reference signal in one polarization direction.

With reference to the first aspect to the fourth aspect, in some possible implementations, the second indication information is carried in a radio resource control (RRC) message.

With reference to the first aspect to the fourth aspect, in some possible implementations, the third indication information is carried in an RRC message.

It should be understood that the second indication information and the third indication information may be carried in same signaling or different signaling. This is not limited in this application.

According to a fifth aspect, a PMI feedback method is provided. The method may be performed by a terminal device, or may be performed by a chip configured in a terminal device.

The method includes: receiving fifth indication information, where the fifth indication information is used to indicate a feedback mode for feeding back a PMI, and the feedback mode is a first feedback mode or a second feedback mode; the first feedback mode is a mode for feeding back the PMI based on a port selection vector set, and the second feedback mode is a mode for feeding back the PMI based on a space-frequency vector set; or the first feedback mode is a mode for feeding back the PMI based only on a port selection vector set, and the second feedback mode is a mode for feeding back the PMI based on the port selection vector set and a frequency domain vector set; the port selection vector set includes a plurality of port selection vectors, each port selection vector is used to indicate a port of one reference signal, and the reference signal is a precoded reference signal; the frequency domain vector set includes a plurality of frequency domain vectors, and each frequency domain vector is used to indicate a variation pattern of a channel in frequency domain; and the space-frequency vector set includes a plurality of space-frequency vectors, and each space-frequency vector is a Kronecker product of one port selection vector and one frequency domain vector; and sending the PMI based on the feedback mode.

According to a sixth aspect, a PMI feedback method is provided. The method may be performed by a network device, or may be performed by a chip configured in a network device.

The method includes: generating fifth indication information, where the fifth indication information is used to indicate a feedback mode for feeding back a PMI, and the feedback mode is a first feedback mode or a second feedback mode; the first feedback mode is a mode for feeding back the PMI based on a port selection vector set, and the second feedback mode is a mode for feeding back the PMI based on a space-frequency vector set; or the first feedback mode is a mode for feeding back the PMI based only on a port selection vector set, and the second feedback mode is a mode for feeding back the PMI based on the port selection vector set and a frequency domain vector set; the port selection vector set includes a plurality of port selection vectors, each port selection vector is used to indicate a port of one reference signal, and the reference signal is a precoded reference signal; the frequency domain vector set includes a plurality of frequency domain vectors, and each frequency domain vector is used to indicate a variation pattern of a channel in frequency domain; and the space-frequency vector set includes a plurality of space-frequency vectors, and each space-frequency vector is a Kronecker product of one port selection vector and one frequency domain vector; and sending the fifth indication information.

In the second feedback mode, the frequency domain vector is fully used. That is, a subband joint feedback is achieved by using a relationship between subbands and continuity of the frequency domain. In other words, the first feedback mode may be a subband independent feedback mode, and the second feedback mode may be a subband joint feedback mode.

Based on the foregoing technical solutions, the terminal device may feed back the PMI in a corresponding feedback mode based on an indication of the network device. Different measurement cases may be used by introducing a plurality of feedback modes, and both feedback precision and feedback overheads can be considered, thereby achieving a balance between the two.

With reference to the fifth aspect or the sixth aspect, in some possible implementations, the fifth indication information is carried in an RRC message.

According to a seventh aspect, a communications apparatus is provided, and includes each module or unit configured to perform the method according to any possible implementation of the first aspect, the third aspect, or the fifth aspect.

According to an eighth aspect, a communications apparatus is provided, and includes a processor. The processor is coupled to a memory, and may be configured to execute an instruction in the memory, to implement the method according to any possible implementation of the first aspect, the third aspect, or the fifth aspect. Optionally, the communications apparatus further includes the memory. Optionally, the communications apparatus further includes a communications interface, and the processor is coupled to the communications interface.

In an implementation, the communications apparatus is a terminal device. When the communications apparatus is a terminal device, the communications interface may be a transceiver or an input/output interface.

In another implementation, the communications apparatus is a chip configured in a terminal device. When the communications apparatus is a chip configured in a terminal device, the communications interface may be an input/output interface.

Optionally, the transceiver may be a transceiver circuit. Optionally, the input/output interface may be an input/output circuit.

According to a ninth aspect, a communications apparatus is provided, and includes each module or unit configured to perform the method according to any possible implementation of the second aspect, the fourth aspect, or the sixth aspect.

According to a tenth aspect, a communications apparatus is provided, and includes a processor. The processor is coupled to a memory, and may be configured to execute an instruction in the memory, to implement the method according to any possible implementation of the second aspect, the fourth aspect, or the sixth aspect. Optionally, the communications apparatus further includes the memory. Optionally, the communications apparatus further includes a communications interface, and the processor is coupled to the communications interface.

In an implementation, the communications apparatus is a network device. When the communications apparatus is a network device, the communications interface may be a transceiver or an input/output interface.

In another implementation, the communications apparatus is a chip configured in a network device. When the communications apparatus is a chip configured in a network device, the communications interface may be an input/output interface.

Optionally, the transceiver may be a transceiver circuit. Optionally, the input/output interface may be an input/output circuit.

According to an eleventh aspect, a processor is provided, and includes an input circuit, an output circuit, and a processing circuit. The processing circuit is configured to: receive a signal via the input circuit, and transmit a signal via the output circuit, so that the processor performs the method according to any one of the first aspect to the fourth aspect and the possible implementations of the first aspect to the fourth aspect.

In a specific implementation process, the processor may be a chip, the input circuit may be an input pin, the output circuit may be an output pin, and the processing circuit may be a transistor, a gate circuit, a trigger, various logic circuits, or the like. The input signal received by the input circuit may be received and input by, for example, but not limited to, a receiver, the signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in the embodiments of this application.

According to a twelfth aspect, a processing apparatus is provided, and includes a processor and a memory. The processor is configured to: read an instruction stored in the memory, receive a signal via a receiver, and transmit a signal via a transmitter, to perform the method according to any one of the first aspect to the fourth aspect and the possible implementations of the first aspect to the fourth aspect.

Optionally, there are one or more processors and one or more memories.

Optionally, the memory may be integrated into the processor, or the memory and the processor may be separately disposed.

In a specific implementation process, the memory may be a non-transitory memory, for example, a read-only memory (ROM). The memory and the processor may be integrated on a same chip, or may be separately disposed on different chips. A type of the memory and a manner for disposing the memory and the processor are not limited in the embodiments of this application.

It should be understood that a related data exchange process, for example, sending of indication information, may be a process of outputting indication information from the processor, and receiving of capability information, may be a process of receiving input capability information by the processor. Specifically, data output by the processor may be output to the transmitter, and input data received by the processor may be from the receiver. The transmitter and the receiver may be collectively referred to as a transceiver.

The processing apparatus according to the twelfth aspect may be a chip. The processor may be implemented by using hardware or software. When the processor is implemented by using hardware, the processor may be a logic circuit, an integrated circuit, or the like; or when the processor is implemented by using software, the processor may be a general-purpose processor, and is implemented by reading software code stored in the memory. The memory may be integrated into the processor, or may exist independently outside the processor.

According to a thirteenth aspect, a computer program product is provided. The computer program product includes a computer program (also referred to as code or an instruction), and when the computer program is run, a computer is enabled to perform the method according to any one of the first aspect to the sixth aspect and the possible implementations of the first aspect to the sixth aspect.

According to a fourteenth aspect, a computer-readable medium is provided. The computer-readable medium stores a computer program (also referred to as code or an instruction), and when the computer program is run on a computer, the computer is enabled to perform the method according to any one of the first aspect to the sixth aspect and the possible implementations of the first aspect to the sixth aspect.

According to a fifteenth aspect, a communications system is provided, and includes the foregoing network device and terminal device.

DESCRIPTION OF EMBODIMENTS

The following describes technical solutions of this application with reference to the accompanying drawings.

The technical solutions in embodiments of this application may be applied to various communications systems, such as a global system for mobile communications (GSM), a code division multiple access (CDMA) system, a wideband code division multiple access (WCDMA) system, a general packet radio service (GPRS) system, a long-term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a future 5th generation (5G) system or new radio (NR) system.

Figure 1:
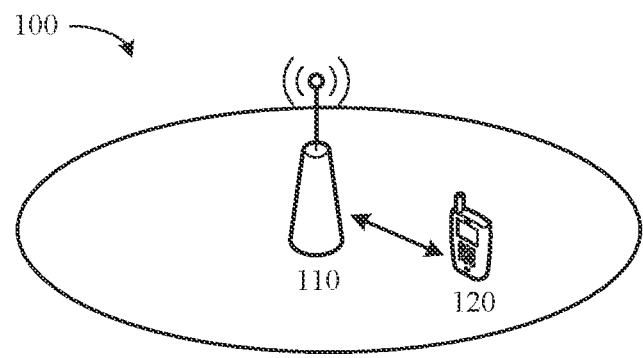
FIG. 1 is a schematic diagram of a communications system applicable to a precoding vector indication and determining method according to an embodiment of this application.

First, for ease of understanding the embodiments of this application, a communications system shown in FIG. 1 is used as an example to describe in detail a communications system applicable to the embodiments of this application are applicable. FIG. 1 is a schematic diagram of a communications system 100 applicable to a precoding matrix indication and determining method according to an embodiment of this application. As shown in FIG. 1, the communications system 100 may include at least one network device, for example, a network device 110 shown in FIG. 1. The communications system 100 may further include at least one terminal device, for example, a terminal device 120 shown in FIG. 1. The network device 110 and the terminal device 120 may communicate with each other through a wireless link. Each communications device, such as the network device 110 or the terminal device 120, may be configured with a plurality of antennas. For each communications device in the communications system 100, the plurality of configured antennas may include at least one transmit antenna configured to send a signal and at least one receive antenna configured to receive a signal. Therefore, communications devices in the communications system 100, for example, the network device 110 and the terminal device 120, may communicate with each other by using a multi-antenna technology.

It should be understood that the network device in the communications system may be any device that has a wireless transceiver function. The network device includes but is not limited to an evolved NodeB (eNB), a radio network controller (RNC), a NodeB (NB), a base station controller (BSC), a base transceiver station (BTS), a home base station (for example, a home evolved NodeB, or a home Node B, HNB), a baseband unit (BBU), an access point (AP) in a wireless fidelity (Wi-Fi) system, a wireless relay node, a wireless backhaul node, a transmission point (TP), a transmission and reception point (TRP), or the like. Alternatively, the network device may be a gNB or a transmission point (TRP or TP) in a 5G system such as an NR system, may be one antenna panel or a group (including a plurality of antenna panels) of antenna panels of a base station in a 5G system, or may be a network node, such as a baseband unit (BBU) or a distributed unit (DU), that constitutes a gNB or a transmission point.

In some deployments, the gNB may include a centralized unit (CU) and a DU. The gNB may further include a radio frequency unit (RU). The CU implements a part of functions of the gNB, and the DU implements a part of the functions of the gNB. For example, the CU implements functions of a radio resource control (RRC) layer and a packet data convergence protocol (PDCP) layer; and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in this architecture, higher layer signaling such as RRC layer signaling may also be considered as being sent by the DU or by the DU and the CU. It may be understood that the network device may be a CU node, a DU node, or a device including a CU node and a DU node. In addition, the CU may be classified as a network device in an access network (RAN), or may be classified as a network device in a core network (CN). This is not limited in this application.

It should be further understood that the terminal device in the wireless communications system may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this application.

It should be further understood that FIG. 1 is merely a simplified schematic diagram used as an example for ease of understanding. The communications system 100 may further include another network device or another terminal device, which is not shown in FIG. 1.

Figure 2:
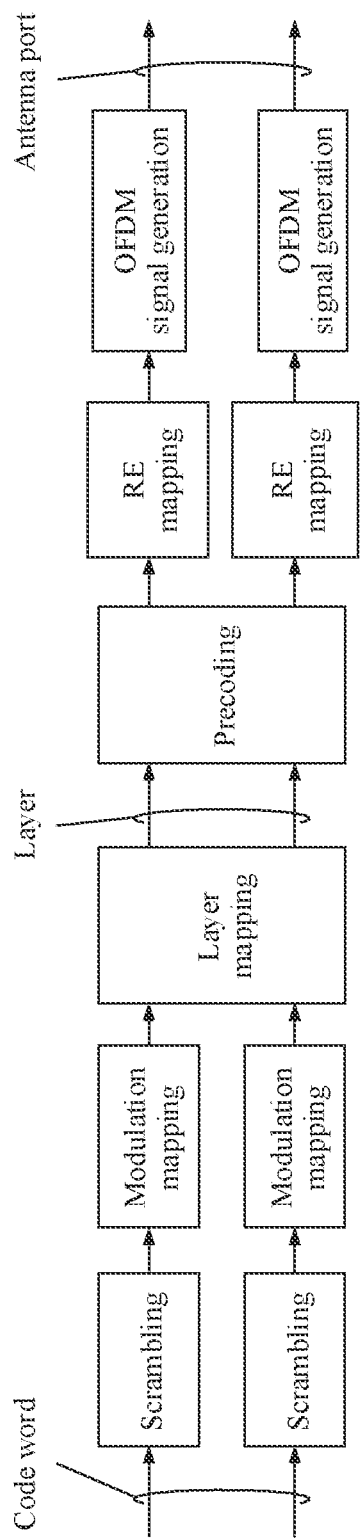
FIG. 2 is a schematic diagram of signal processing according to an embodiment of this application.

For ease of understanding the embodiments of this application, with reference to FIG. 2, the following briefly describes a processing process of a signal at a physical layer before the signal is sent.

It should be understood that the processing process of the signal shown in FIG. 2 may be performed by a network device or a chip configured in a network device; or may be performed by a terminal device or a chip configured in a terminal device. This is not limited in this application. For ease of description, these devices are collectively referred to as a sending device below.

As shown in the figure, the sending device may process a code word from a higher layer on a physical channel. The code word may be a coded bit obtained through coding (for example, including channel coding). The code word is scrambled to generate a scrambling bit. Modulation mapping is performed on the scrambling bit, to obtain a modulation symbol. The modulation symbol is mapped to a plurality of layers through layer mapping. A modulation symbol obtained through the layer mapping is precoded, to obtain a precoded signal. The precoded signal is mapped to a plurality of resource elements (RE) through RE mapping. These REs are then transmitted through an antenna port after orthogonal frequency division multiplexing (OFDM) modulation is performed on the REs.

In a precoding technology, when a channel state is known, the sending device preprocesses a to-be-sent signal, that is, processes the to-be-sent signal by using a precoding matrix matching a channel resource, so that a precoded to-be-sent signal adapts to a channel, and complexity of eliminating inter-channel impact by a receiving device is reduced. Therefore, after the to-be-sent signal is precoded, received signal quality (for example, a signal to interference plus noise ratio (SINR)) is improved. Therefore, transmission between a sending device and a plurality of receiving devices can be implemented on a same time-frequency resource by using the precoding technology. That is, multi-user multiple-input multiple-output (MU-MIMO) is implemented. It should be noted that related descriptions of the precoding technology are merely used as examples, but are not intended to limit the protection scope of the embodiments of this application. In a specific implementation process, precoding may further be performed in another manner. For example, when a channel matrix cannot be learned, precoding is performed by using a preset precoding matrix or in a weighted processing manner. For brevity, specific content of the precoding manner is not further described in this specification.

To obtain a precoding matrix that can adapt to a channel, the sending device may perform channel measurement in advance by sending a reference signal, to obtain a feedback of the receiving device, so as to determine the precoding matrix.

To facilitate understanding of the embodiments of this application, the following first briefly describes terms used in the embodiments of this application.

1. A precoded reference signal is also referred to as a beamformed reference signal. The beamformed reference signal may be a reference signal obtained after precoding processing, and may be similar to a class B reference signal in an LTE protocol. Correspondingly, a reference signal on which no precoding processing is performed may be similar to a class A reference signal in the LTE protocol.

It should be understood that the reference signal in the embodiments of this application may be a reference signal used for channel measurement. For example, the reference signal may be a channel state information reference signal (CSI-RS) or a sounding reference signal (SRS). However, it should be understood that the foregoing listed descriptions are merely examples, and should not be construed as any limitation on this application. A possibility that another reference signal used to implement a same function or a similar function is defined in a future protocol is not excluded in this application.

2. An antenna port may be briefly referred to as a port. The antenna port may be understood as a transmit antenna identified by a receiving device, or a transmit antenna that can be distinguished in space. One antenna port may be configured for each virtual antenna, each virtual antenna may be a weighted combination of a plurality of physical antennas, and each antenna port may correspond to one reference signal. Therefore, each antenna port may be referred to as a reference signal port, for example, a CSI-RS port or an SRS port.

3. A beam may be understood as distribution of signal strength formed in a direction in space, and one port may be correspondingly used for one beam. In the embodiments of this application, linear combination may be performed on a plurality of beams by using a beamforming technology, so that a transmit beam forms specific directionality in space. A "beam vector" may also be referred to as a precoding vector, and may be understood as a mathematical expression of a "beam". One beam vector may be used to form one beam.

4. A port selection vector is used to indicate a port. A length (or a dimension) of the port selection vector may be a quantity of ports of a reference signal, for example, denoted as $N_b$. The port selection vector may include a plurality of elements "0" and one element "1". A position of the element "1" in the port selection vector may be used to determine a selected port, in other words, may be used to determine a selected precoding vector. When different ports are selected, corresponding port selection vectors are also different.

If the port selection vector is denoted as e, the port selection vector with a length of $N_b$ may be denoted as, for example, $e_{N_b} = [0 \ 0 \ \ldots \ 0 \ 1 \ 0 \ \ldots \ 0]^T$, where $N_b$ may represent a quantity of ports of a reference signal, or a quantity of ports of a reference signal in one polarization direction.

In the embodiments, the port selection vector may be obtained from a predefined port selection vector set, and any two port selection vectors in the port selection vector set are different, in other words, positions of elements "1" in any two port selection vectors are different. Because the length of the port selection vector is $N_b$, the port selection vector set may include $N_b$ port selection vectors, and the port selection vectors may be pairwise orthogonal. A terminal device may feed back indication information of one or more selected ports to a network device by using a PMI. The indication information of the one or more ports may be, for example, indexes of the one or more ports or an index of a combination of the one or more ports. This is not limited in this application.

4. An ideal precoding matrix and a precoding matrix indicator PMI: The ideal precoding matrix may be determined based on an equivalent channel matrix of each subband.

Downlink channel measurement is used as an example. The network device may separately precode one or more reference signals based on one or more predefined precoding vectors, and send the one or more precoded reference signals. The precoded reference signal has specific directivity. Therefore, the precoded reference signal transmitted by the network device based on one port may be understood as a beam in a particular direction. Simply, one port corresponds to one beam. Because a precoded reference signal transmitted by the network device after precoding the reference signal based on a precoding vector is a reference signal port for the terminal device, it may be considered that one reference signal port corresponds to one precoding vector. However, it should be understood that the correspondence between the reference signal port and the precoding vector is defined only for ease of understanding the embodiments of this application, and should not constitute any limitation on this application.

The terminal device may perform equivalent channel measurement based on the received precoded reference signal, and may determine a PMI based on a port selection codebook. The port selection codebook may be, for example, a Type II port selection codebook defined in an NR protocol.

In an implementation, the terminal device may obtain an equivalent channel matrix of each subband through measurement based on the precoded reference signal, and then may select one or more relatively strong ports based on the equivalent channel matrix of each subband. The terminal device may feed back the selected port to the network device. The terminal device may indicate the selected port in a form of a vector, for example, a port selection vector.

As described above, the port selection vector may be obtained from a predefined port selection vector set. The terminal device may feed back indication information of the one or more selected ports to the network device by using a PMI. The indication information of the one or more ports may be, for example, indexes of the one or more ports or an index of a combination of the one or more ports. This is not limited in this application.

The terminal device may further perform singular value decomposition (SVD) on the equivalent channel matrix of each subband, to determine an ideal precoding matrix of each subband. In an ideal precoding matrix of a subband, each column may correspond to one transport layer, and may be referred to as an ideal precoding vector of the subband. Each element in an ideal precoding vector of a subband may be determined by using a wideband amplitude coefficient, a subband amplitude coefficient, and a subband phase coefficient that are obtained based on measurement of the subband. The terminal device may feed back a quantized value of the wideband amplitude coefficient, a quantized value of the subband amplitude coefficient, and a quantized value of the subband phase coefficient to the network device by using the PMI.

The network device may determine a precoding matrix based on a port selection vector, the quantized value of the wideband amplitude coefficient, the quantized value of the subband amplitude coefficient, and the quantized value of the subband phase coefficient that are indicated in the PMI. The precoding matrix is a precoding matrix approximate to the ideal precoding matrix determined by the terminal device.

The following formula shows that when a quantity of polarization directions is 2, the network device may determine the precoding matrix based on the PMI:

$$W = \frac{1}{\sqrt{\sum_{i=0}^{2L-1} (p_i^{(1)} p_i^{(2)})^2}} \begin{bmatrix} \sum_{i=0}^{L-1} v_i p_i^{(1)} p_i^{(2)} \varphi_i \\ \sum_{i=0}^{L-1} v_i p_{i+L}^{(1)} p_{i+L}^{(2)} \varphi_{i+L} \end{bmatrix},$$

$v_i$ is an $i^{th}$ port selection vector in L port selection vectors, $p_i^{(1)}$ is a quantized value of a wideband amplitude coefficient of an $i^{th}$ port selection vector $v_i$ in a first polarization direction, $p_i^{(2)}$ is a quantized value of a narrowband amplitude coefficient of the $i^{th}$ port selection vector $v_i$ in the first polarization direction, and $\varphi_i$ is a quantized value of a narrowband phase coefficient of the $i^{th}$ port selection vector $v_i$ in the first polarization direction; and $p_{i+L}^{(1)}$ is a quantized value of a wideband amplitude coefficient of an $i^{th}$ port selection vector v in a second polarization direction, $p_{i+L}^{(2)}$ is a quantized value of a narrowband amplitude coefficient of the $i^{th}$ port selection vector $v_i$ in the second polarization direction, and $\varphi_{i+L}$ is a quantized value of a narrowband phase coefficient of the $i^{th}$ port selection vector $v_i$ in the second polarization direction.

It should be noted that the precoding matrix determined by the network device based on the port selection vector, the quantized value of the wideband amplitude coefficient, the quantized value of the subband amplitude coefficient, and the quantized value of the subband phase coefficient that are indicated in the PMI is not a precoding matrix used for data transmission. The network device may further determine, based on ports fed back by the terminal device, precoding vectors corresponding to the ports, to determine the precoding matrix used for data transmission.

It should be understood that a specific process in which the network device determines, based on the precoding matrix determined by using the PMI, the precoding matrix used for data transmission may be the same as that in an existing technology. This is not limited in this application. In the following embodiments, unless otherwise specified, all precoding matrices represent the precoding matrix determined by the network device based on the quantized value of the wideband amplitude coefficient, the quantized value of the subband amplitude coefficient, and the quantized value of the subband phase coefficient that are indicated in the PMI. For brevity, descriptions of a same or similar case are omitted below.

6. A precoding vector is a vector in a precoding matrix, for example, a column vector. The precoding matrix may be determined by a precoding vector or precoding vectors at one or more transport layers, and each column vector in the precoding matrix may correspond to one transport layer. It is assumed that a dimension of the precoding vector may be $N_1*1$. If a quantity of transport layers is Z (Z≥1 and is an integer), a dimension of the precoding matrix may be $N_1*Z$. The quantity of transport layers may be determined by an RI, and $N_1$ may represent a quantity of ports of a reference signal.

When transmit antennas are configured with a plurality of polarization directions, a precoding vector may alternatively be a component of a precoding matrix at one transport layer in one polarization direction. It is assumed that a quantity of polarization directions is P, a quantity of ports of a reference signal in one polarization direction is $N_2$, and a dimension of a precoding vector corresponding to one transport layer is $(P*N_2)*1$. In this case, a dimension of a precoding vector in one polarization direction may be $N_2*1$.

In this embodiment of this application, the precoding vector may correspond to one transport layer, or may correspond to one polarization direction at one transport layer.

7. A frequency domain vector is a vector that is proposed in the embodiments of this application and that is used to indicate a variation pattern of a channel in frequency domain. Subband coefficients, such as the subband amplitude coefficient and the subband phase coefficient that are described above, based on a subband feedback reflect a variation pattern of a channel in frequency domain. Such a variation pattern is related to multipath latency. When a signal is transmitted on a radio channel, there may be different transmission latency on different propagation paths. Therefore, different frequency domain vectors may be used to represent variation patterns of latency on different propagation paths.

Optionally, a dimension of the frequency domain vector is a quantity of subbands included in pilot transmission bandwidth configured for the terminal device.

The pilot transmission bandwidth may be bandwidth used to transmit a reference signal. The reference signal herein may be a reference signal used for channel measurement, for example, the precoded reference signal in the embodiments of this application. The pilot transmission bandwidth may also be referred to as measurement bandwidth. It should be understood that the pilot transmission bandwidth or the measurement bandwidth is named only for ease of description, and should not constitute any limitation on this application. This application does not exclude a possibility of expressing a same meaning by using another name.

Optionally, a dimension of the frequency domain vector is a length of signaling used to indicate a position of a to-be-reported subband and a quantity of to-be-reported subbands.

The signaling used to indicate the position of the to-be-reported subband and the quantity of to-be-reported subbands may be reporting bandwidth. The signaling may indicate the position of the to-be-reported subband and the quantity of to-be-reported subbands in a form of a bitmap. Therefore, the dimension of the frequency domain vector may be a quantity of bits of the bitmap. It should be understood that the reporting band is merely a possible name of the signaling, and should not constitute any limitation on this application. This application does not exclude a possibility of naming the signaling by using another name to implement a same or similar function.

Optionally, a dimension of the frequency domain vector is a quantity of to-be-reported subbands.

In this embodiment of this application, the frequency domain vector may be a column vector, for example, a column vector whose dimension is $N_f*1$, or may be a row vector, for example, a row vector whose dimension is $1*N_f$. This is not limited in this application.

The frequency domain vector may be obtained from a predefined frequency domain vector set. The frequency domain vector set may include a plurality of frequency domain vectors.

For example, when the frequency domain vector is a column vector, each column vector in the frequency domain vector set is a discrete Fourier transform (DFT) vector, an oversampling DFT vector, a truncation of a DFT, or a truncation of an oversampling DFT vector.

Herein, "truncation" may be understood as a vector including some elements extracted from the DFT vector or the oversampling DFT vector. For example, if the DFT vector is a 16-dimensional column vector, first 10 elements may be extracted from the DFT vector to form a 10-dimensional column vector, and the 10-dimensional column vector may be considered as a truncation of the 16-dimensional DFT vector. In this embodiment of this application, a dimension of a truncation may be $N_f*1$.

Any two frequency domain vectors in the frequency domain vector set may be different. Because the length of the frequency domain vector is $N_f$, optionally, the frequency domain vector set may include $N_f$ frequency domain vectors, and the frequency domain vectors may be pairwise orthogonal. For example, an $m^{th}$ frequency domain vector in the frequency domain vector set may be denoted as $$u_m = \begin{bmatrix} 1 & e^{j\frac{2\pi m}{N_f}} & \cdots & e^{j\frac{2\pi m(N_f-1)}{N_f}} \end{bmatrix}^T \text{ or } u_m = \begin{bmatrix} 1 & e^{j\frac{2\pi m}{N_f}} & \cdots & e^{j\frac{2\pi m(N_f-1)}{N_f}} \end{bmatrix},$$

where m ranges from 0 to $N_f-1$, j is an imaginary unit, and e is a natural constant. Different values of m correspond to different angles. In other words, each value of m corresponds to one angle.

Optionally, the frequency domain vector set may alternatively include $O_f*N_f$ frequency domain vectors, which belong to $O_f$ subsets respectively. Each subset includes $N_f$ frequency domain components, and frequency domain vectors in each subset may be pairwise orthogonal. For example, an $m^{th}$ frequency domain vector in the frequency domain vector set may alternatively be denoted a $$u_m = \begin{bmatrix} 1 & e^{j\frac{2\pi m}{O_f N_f}} & \cdots & e^{j\frac{2\pi m(N_f-1)}{O_f N_f}} \end{bmatrix}^T,$$

where m ranges from 0 to $O_f^*N_f-1$, and $O_f$ is an oversampling factor, which is also referred to as an oversampling ratio.

It should be understood that the frequency domain vectors listed above are merely examples, and should not constitute any limitation on this application. A specific form of the frequency domain vector is not limited in this application.

A terminal device may feed back indication information of one or more selected frequency domain vectors to a network device by using a PMI.

8. A space-frequency vector is another vector that is proposed in the embodiments of this application and that may be used to represent a variation pattern of a channel. One space-frequency domain vector may be a Kronecker product of one port selection vector and one frequency domain vector. For example, if the space-frequency vector is denoted as b, the port selection vector is denoted as e, and the frequency domain vector is denoted as u, b=e⊗u, where ⊗ represents a Kronecker product operation.

A Kronecker product is a block matrix obtained by multiplying all elements in a matrix by another matrix. For example, a Kronecker product of a k*l-dimensional matrix A and a p*q-dimensional matrix B may be a kp*ql-dimensional matrix, which is specifically as follows:

$$A \otimes B = \begin{bmatrix} a_{11}B & \cdots & a_{1l}B \\ \vdots & \ddots & \vdots \\ a_{k1}B & \cdots & a_{kl}B \end{bmatrix}.$$

The space-frequency vector may be obtained from a predefined space-frequency vector set. The space-frequency vector set may include a plurality of space-frequency vectors. Any two space-frequency vectors in the space-frequency vector set may be different. Because the length of the port selection vector is $N_b$ and the length of the frequency domain vector is $N_f$, a length of the space-frequency vector may be $N_b^*N_f$. Optionally, the space-frequency vector set may include $N_b^*N_f$ space-frequency vectors, and the space-frequency vectors may be pairwise orthogonal. Optionally, the space-frequency vector set may alternatively include $O_f^*N_b^*N_f$ space-frequency vectors, which belong to $O_f$ subsets respectively. Each subset includes $N_b^*N_f$ space-frequency components, and space-frequency vectors in each subset may be pairwise orthogonal. A terminal device may feed back indication information of one or more selected space-frequency vectors to a network device by using a PMI.

A person skilled in the art may understand that, during downlink channel measurement, a higher similarity between a precoding matrix determined by the network device based on the PMI and an ideal precoding matrix determined by the terminal device indicates better adaption of the precoding matrix determined by the network device for data transmission to a channel state. In this way, signal receiving quality can be improved. In other words, the terminal device expects to indicate, to the network device, a precoding matrix that is most approximate to the ideal precoding matrix.

To improve spectrum resource utilization and a data transmission capability of a communications system, the network device may transmit data to the terminal device through a plurality of transport layers. Although a PMI feedback based on a Type II port selection codebook has relatively high approximate precision, there are also relatively high feedback overheads. For example, when a quantity of transport layers increases, overheads caused by a feedback performed by the terminal device based on each transport layer multiply. A larger quantity of subbands leads to a greater increase in the feedback overheads. Therefore, it is expected to provide a method that can reduce feedback overheads.

In view of this, this application provides a precoding matrix indication and determining method, to reduce feedback overheads of the PMI.

To facilitate understanding of the embodiments of this application, the following descriptions are provided.

First, in the embodiments of this application, it is assumed that a quantity of polarization directions of transmit antennas is P (P≥1 and is an integer), a quantity of transport layers is R (R≥1 and is an integer), and a quantity of to-be-reported subbands is $N_{sb}$ ($N_{sb}$≥1 and is an integer).

In the embodiments, for ease of description, when numbering is involved, numbers may be consecutive and start from 0. For example, the R transport layers may include a transport layer 0 to a transport layer R-1, and the P polarization directions may include a polarization direction 0 to a polarization direction P-1. Certainly, specific implementation is not limited thereto. For example, numbers may be consecutive and start from 1. It should be understood that the foregoing descriptions are all provided for ease of describing the technical solutions provided in the embodiments of this application, but are not intended to limit the scope of this application.

Second, in the embodiments of this application, an example in which a subband is used as a frequency domain unit is used to describe in detail a specific precoding matrix indication and determining method. However, this should not constitute any limitation on this application. It should be understood that the subband is merely a possible form of the frequency domain unit, and the frequency domain unit may alternatively be a subcarrier, a resource block (RB), or the like. This is not limited in this application. In addition, a precoding matrix corresponding to the subband in the embodiments of this application may be understood as a precoding matrix determined based on a channel matrix of the subband. In the embodiments shown below, unless otherwise specified, "a precoding matrix corresponding to a subband" and "a precoding matrix of a subband" may have a same meaning.

Third, in the embodiments of this application, matrix transformation is performed in a plurality of places. For ease of understanding, a unified description is provided herein. A superscript T represents a transpose. For example, $A^T$ represents a transpose of a matrix (or a vector) A. A superscript * represents a conjugate. For example, A* represents a conjugate of the matrix (or the vector) A. A superscript H represents a conjugate transpose. For example, $A^H$ represents a conjugate transpose of the matrix (or the vector) A. For brevity, descriptions of a same or similar case are omitted below.

Fourth, in the embodiments of this application, "used to indicate" may include "used to directly indicate" and "used to indirectly indicate". When a piece of indication information is described as indicating A, the indication information may directly indicate A or indirectly indicate A, but it does not necessarily indicate that the indication information carries A.

Information indicated by the indication information is referred to as to-be-indicated information. In a specific implementation process, the to-be-indicated information may be indicated in a plurality of manners, for example, but not limited to, a manner for directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and another part of the to-be-indicated information is known or agreed on in advance. For example, specific information may alternatively be indicated by using a pre-agreed (for example, protocol-stipulated) arrangement sequence of various pieces of information, to reduce indication overheads to some extent. In addition, a common part of all pieces of information may further be identified and indicated centrally, to reduce indication overheads caused by separately indicating same information. For example, a person skilled in the art should understand that the precoding matrix includes precoding vectors, and each precoding vector in the precoding matrix may have a same part in terms of composition or another attribute.

In addition, a specific indication manner may alternatively be various existing indication manners, for example, but not limited to, the foregoing indication manners and various combinations thereof. For details of various indication manners, refer to an existing technology. Details are not further described in this specification. It can be learned from the foregoing descriptions that, for example, when a plurality of pieces of information of a same type need to be indicated, manners of indicating different information may be different. In a specific implementation process, a required indication manner may be selected according to a specific requirement. The selected indication manner is not limited in the embodiments of this application. In this way, the indication manner involved in the embodiments of this application should be understood as covering various methods that can enable a to-be-indicated party to learn of the to-be-indicated information.

In addition, the to-be-indicated information may have another equivalent form. For example, a row vector may be represented as a column vector, a matrix may be represented by using a transposed matrix of the matrix, and a Kronecker product of two vectors may be represented in a form such as a product of a transposed vector of one vector and a transposed vector of the other vector. The technical solutions provided in the embodiments of this application should be understood as covering various forms. For example, some or all features in the embodiments of this application should be understood as covering various representations of the features.

The to-be-indicated information may be sent as a whole, or may be divided into a plurality of pieces of sub-information for separate sending. In addition, sending periodicities and/or sending occasions of the sub-information may be the same or may be different. A specific sending method is not limited in this application. The sending periodicities and/or the sending occasions of the sub-information may be predefined, for example, predefined according to a protocol, or may be configured by a transmit end device by sending configuration information to a receive end device. The configuration information may include, for example, but is not limited to, a combination of one or at least two of RRC signaling, media access control (MAC) signaling, and downlink control information (DCI).

Fifth, the terms "first", "second", "third", and "fourth", and various sequence numbers in the following embodiments are merely used for differentiation for ease of description, and are not used to limit the scope of the embodiments of this application, for example, are used to distinguish between different indication information.

Sixth, in the embodiments shown below, "pre-obtaining" may include being indicated by network device signaling or predefined, for example, defined in a protocol. "Predefinition" may be implemented by pre-storing corresponding code or a corresponding table in a device (for example, a terminal device or a network device) or in another manner that can be used to indicate related information. A specific implementation of "predefinition" is not limited in this application.

Seventh, "storage" in the embodiments of this application may be storage in one or more memories. The one or more memories may be separately disposed, or may be integrated into an encoder or a decoder, a processor, or a communications apparatus. Alternatively, a part of the one or more memories may be separately disposed, and a part of the one or more memories are integrated into a decoder, a processor, or a communications apparatus. The memory may be a storage medium in any form. This is not limited in this application.

Eighth, the "protocol" in the embodiments of this application may be a standard protocol in the communications field, for example, may include an LTE protocol, an NR protocol, and a related protocol applied to a future communications system. This is not limited in this application.

Ninth, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally represents an "or" relationship between the associated objects. "At least one item (piece) of the following" or a similar expression thereof refers to any combination of these items, including any combination of singular items (pieces) or plural items (pieces). For example, at least one (piece) of a, b, or c may represent: a, b, c, a-b, a-c, b-c, or a-b-c, where a, b, and c may be singular or plural.

The precoding matrix indication and determining method provided in the embodiments of this application is described in detail below with reference to the accompanying drawings.

It should be understood that the method provided in the embodiments of this application may be applied to a communications system in which communication is performed by using a multi-antenna technology, for example, the communications system 100 shown in FIG. 1. The communications system may include at least one network device and at least one terminal device. The network device and the terminal device may communicate with each other by using a multi-antenna technology.

It should be further understood that, a specific structure of an execution body of the method provided in the embodiments of this application is not specifically limited in the embodiments shown below, provided that a program that records code of the method provided in the embodiments of this application can be run to perform communication according to the method provided in the embodiments of this application. For example, the execution body of the method provided in the embodiments of this application may be the terminal device or the network device, or a functional module that can invoke and execute the program in the terminal device or the network device.

Without loss of generality, interaction between the network device and the terminal device is used as an example below to describe in detail the precoding vector indication and determining method provided in the embodiments of this application.

Figure 3:
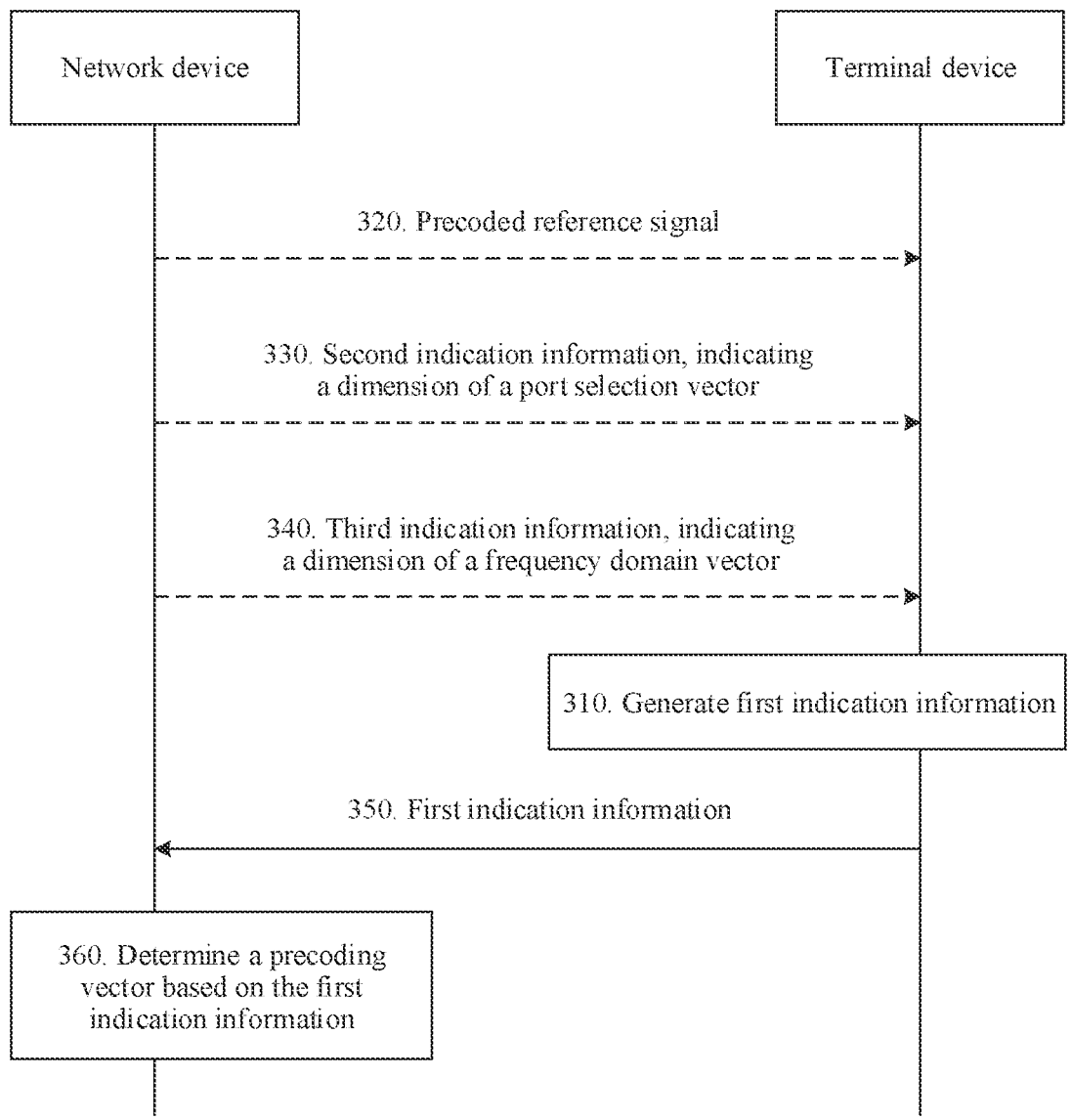
FIG. 3 is a schematic flowchart of a precoding vector indication and determining method according to an embodiment of this application.

FIG. 3 is a schematic flowchart of a precoding vector indication and determining method 300 shown from a perspective of device interaction according to an embodiment of this application. As shown in the figure, the method 300 may include S310 to S360. The following describes the steps in the method 300 in detail.

It should be noted that, in the embodiments shown below, for ease of understanding, an example in which a quantity of transport layers is 1 is used to describe the precoding vector indication and determining method. It should be understood that when the quantity of transport layers is greater than 1, the precoding vector indication and determining method provided in this application is also applicable.

In S310, a terminal device generates first indication information, where the first indication information may be used to indicate one or more port selection vectors, one or more frequency domain vectors, and one or more linear combination coefficients.

Specifically, the terminal device may determine an ideal precoding vector of each subband based on an equivalent channel matrix of each subband. In an implementation, the terminal device may determine the equivalent channel matrix of each subband based on a precoded reference signal sent by a network device, and perform SVD on an ideal channel matrix of each subband to obtain the ideal precoding vector of each subband, and further determine the ideal precoding vector of each subband.

Optionally, before S310, the method 300 further includes the following step: S320. The network device sends the precoded reference signal. Correspondingly, the terminal device receives the precoded reference signal.

Transmit antennas of the network device may be single polarization antennas, that is, a quantity of polarization directions may be 1, in other words, polarization directions are not considered. Alternatively, the transmit antennas of the network device may be multi-polarization antennas, that is, a quantity of polarization directions is greater than 1, for example, the quantity of polarization directions is 2. For ease of understanding, the following describes the embodiments of this application in detail by using an example in which the quantity of polarization directions is equal to 1. However, it should be understood that when the quantity of polarization directions is greater than 1, the precoding vector indication and determining method provided in this application is also applicable.

The method for determining an ideal precoding vector by the terminal device based on a precoded reference signal is described in detail above. For brevity, details are not described herein again. It should be further understood that a method for determining an ideal precoding vector by the terminal device is not limited to the foregoing examples. The terminal device may further determine the ideal precoding vector based on a channel state. For example, the terminal device may determine the ideal precoding vector based on reciprocity between an uplink channel and a downlink channel. This is not limited in this application.

In this embodiment of this application, a variation pattern of a channel environment of each subband is represented by using a variation of a latency domain, and a variation characteristic of latency may further be represented through linear combination of different frequency domain vectors. Therefore, the terminal device may select one or more relatively strong frequency domain vectors, and perform linear combination on the selected frequency domain vectors to represent the variation pattern of the channel environment of each subband.

Based on the foregoing design, the ideal precoding vector that is of each subband and that is determined by the terminal device may be fed back by using information in space domain and frequency domain and weights of the information in space domain and frequency domain. In an implementation, the information in space domain and frequency domain and the weights of the information in space domain and frequency domain may be represented by using a space-frequency matrix. The information in space domain may be fed back by using a selected port selection vector. The information in frequency domain may be fed back by using a selected frequency domain vector. The weights of the information in space domain and frequency domain may be fed back by using a linear combination coefficient. One space-frequency matrix may be obtained through linear combination on a plurality of component matrices. Each component matrix of the space-frequency matrix may be determined by a product of one port selection vector and one frequency domain vector. For example, if the port selection vector is a column vector, and the frequency domain vector is also a column vector, each component matrix of the space-frequency matrix may be determined by a product of one port selection vector and a conjugate transpose of one frequency domain vector. If the port selection vector is denoted as e and the frequency domain vector is denoted as u, a component matrix of the space-frequency matrix may be w=exu$^H$. For another example, if the port selection vector is a column vector and the frequency domain vector is a row vector, each component matrix of the space-frequency matrix may be determined by a product of one port selection vector and a conjugate of one frequency domain vector. If the port selection vector is denoted as e and the frequency domain vector is denoted as u, a component matrix of the space-frequency matrix may be w=exu*. Each linear combination coefficient may represent a weight of a component matrix, or each coefficient may be a linear combination coefficient corresponding to one port selection vector and one frequency domain vector.

In this embodiment, for ease of description, assuming that both the port selection vector and the frequency domain vector are column vectors, each component matrix in the space-frequency matrix may be determined by a product of one port selection vector and a conjugate transpose of one frequency domain vector. However, it should be understood that this shall not constitute any limitation on this application. Based on a same concept, a person skilled in the art may obtain, through equivalent transformation or replacement, a structure that is the same as or similar to that of the space-frequency matrix in this application.

A component matrix of the space-frequency matrix may be determined based on one selected port selection vector and one frequency domain vector. After a plurality of component matrices of a space-frequency matrix are summed by using linear combination coefficients, the space-frequency matrix may be obtained. However, it should be understood that the space-frequency matrix is only an intermediate quantity introduced for ease of understanding and description, and shall not constitute any limitation on this application. The terminal device does not necessarily generate the space-frequency matrix in a process of generating the first indication information, and the network device does not necessarily generate the space-frequency matrix either in a process of determining the precoding vector of each subband based on the first indication information.

In this embodiment of this application, after determining the ideal precoding vector of each subband, the terminal device may select one or more port selection vectors and one or more frequency domain vectors based on a predefined port selection vector set and a predefined frequency domain vector set, and further determine the linear combination coefficient based on the selected port selection vector and the selected frequency domain vector. In this way, the terminal device may generate the first indication information based on the selected port selection vector, the selected frequency domain vector, and the linear combination coefficient, to indicate the port selection vector, the frequency domain vector, and the linear combination coefficient to the network device.

A dimension (or a length) of the port selection vector may be determined by a quantity of ports of a reference signal. For example, if the quantity of ports of the reference signal is $N_b$, the dimension of the port selection vector may be $N_b$; and a dimension of the frequency domain vector may be $N_f$. In this case, a dimension of the space-frequency matrix may be $N_b*N_f$.

The length of the port selection vector may be indicated by the network device, or may be predefined. This is not limited in this application. When the length of the port selection vector is indicated by the network device, optionally, the method further includes the following step: S330. The terminal device receives second indication information, where the second indication information is used to indicate the dimension of the port selection vector. Correspondingly, the network device sends the second indication information. A specific meaning of the port selection vector is described in detail above. For brevity, details are not described herein again.

Optionally, the second indication information is carried in an RRC message.

The length of the frequency domain vector may be indicated by the network device, or may be predefined. This is not limited in this application. When the length of the frequency domain vector is indicated by the network device, optionally, the method further includes the following step: S340. The terminal device receives third indication information, where the third indication information is used to indicate the dimension of the frequency domain vector. Correspondingly, the network device sends the third indication information.

Optionally, the third indication information is carried in an RRC message.

It should be understood that the second indication information and the third indication information may be carried in a same RRC message or different RRC messages. This is not limited in this application.

As described above, the dimension of the frequency domain vector may be a quantity of subbands included in pilot transmission bandwidth configured for the terminal device, a signaling length of a reporting band, or a quantity of to-be-reported subbands.

The quantity of subbands included in the pilot transmission bandwidth configured for the terminal device may be determined by using a size of the pilot transmission bandwidth and bandwidth of a subband. In an implementation, the network device may notify the terminal device of the pilot transmission bandwidth and the bandwidth of the subband by using signaling. The terminal device may determine, based on the pilot transmission bandwidth and the bandwidth of the subband that are indicated in the signaling, the quantity of subbands included in the pilot transmission bandwidth. Optionally, the network device sends a radio resource control (RRC) message to the terminal device, where the RRC message carries indication information of the pilot transmission bandwidth and indication information of the bandwidth of the subband. The indication information may be an example of the third indication information described above.

For example, the reporting band may be a bitmap of a to-be-reported subband notified by the network device to the terminal device. Specifically, the network device may indicate the to-be-reported subband to the terminal device by using a bitmap including a plurality of bits. A signaling length of the reporting band may be a quantity of bits of the bitmap.

Specifically, the quantity of bits included in the bitmap may be determined by measurement bandwidth, and the measurement bandwidth may be bandwidth for transmitting the precoded reference signal. Each bit may correspond to one subband. For example, when a bit is "0", a corresponding subband may be a subband for which CSI does not need to be reported; or when a bit is "1", a corresponding subband is a subband for which CSI needs to be reported. Alternatively, when a bit is "1", a corresponding subband may be a subband for which CSI does not need to be reported; or when a bit is "0", a corresponding subband is a subband for which CSI needs to be reported. This is not limited in this application.

Optionally, the network device sends an RRC message to the terminal device, where the RRC message carries the reporting band. The reporting band may be another example of the third indication information described above.

The to-be-reported subband may be determined by the foregoing reporting band, or may be separately indicated by the network device. This is not limited in this application. When the to-be-reported subband is separately indicated by the network device, information used to indicate the to-be-reported subband may be still another example of the third indication information.

The following describes in detail a specific process in which the terminal device determines the port selection vector, the frequency domain vector, and the linear combination coefficient.

For ease of description, it is assumed that a quantity of port selection vectors determined by the terminal device is L, and a quantity of frequency domain vectors determined by the terminal device is K. In this case, a quantity of linear combination coefficients is $L*K$. $L \geq 1$, $K \geq 1$, and both L and K are integers.

Step (i): The terminal device determines the port selection vector and the frequency domain vector based on ideal precoding vectors of all subbands.

The terminal device may determine the L port selection vectors and the K frequency domain vectors based on the predefined port selection vector set and the predefined frequency domain vector set.

In a possible design, the port selection vector set may include $N_b$ vectors, each of which has a dimension of $N_b$, and the $N_b$ vectors are sequentially arranged from left to right, to obtain a matrix whose dimension is $N_b*N_b$, for example, denoted as E. The frequency domain vector set may include $N_f$ vectors, each of which has a dimension of $N_f$, and the $N_f$ vectors are sequentially arranged from left to right, to obtain a matrix whose dimension is $N_f*N_f$, for example, denoted as U.

The terminal device may sequentially arrange the ideal precoding vectors of all the subbands from the first subband to an $N_f^{th}$ subband from left to right, to obtain a matrix including the ideal precoding vectors of all the subbands. A dimension of the matrix may be $N_b*N_f$. For example, the matrix is denoted as X.

The terminal device may left-multiply the matrix X by a conjugate transpose of E, and right-multiply the matrix X by U, to obtain a projected matrix, for example, denoted as Y. In this case, $Y=E^H XU$. A dimension of the matrix Y may still be $N_b*N_f$. The terminal device may determine L relatively strong rows and K relatively strong columns from the projected matrix Y. For example, the terminal device may separately perform a modulo operation on $N_b$ rows in the matrix Y, and select L rows with larger moduli; and separately perform a modulo operation on $N_f$ columns in the matrix Y, to select K columns with larger moduli. L port selection vectors are selected from the port selection vector set or from E based on sequence numbers of the L rows with larger moduli. The sequence numbers of the L rows are sequence numbers of columns in which the L port selection vectors are located in the port selection vector set, or sequence numbers of rows in which the L port selection vectors are located in E. K frequency domain vectors are selected from the frequency domain vector set or from U based on sequence numbers of the K columns with larger moduli. The sequence numbers of the K columns are sequence numbers of columns in which the K frequency domain vectors are located in the frequency domain vector set, or sequence numbers of columns in which the K frequency domain vectors are located in U.

In another possible design, the port selection vector set may include $N_b$ vectors, each of which has a dimension of $N_b$, and the $N_b$ vectors are sequentially arranged from left to right, to obtain a matrix whose dimension is $N_b*N_b$, for example, denoted as E. The frequency domain vector set may be extended to include $O_f*N_f$ vectors whose dimension is $N_f$ by using a frequency domain oversampling factor $O_f$. Every $N_f$ vectors may be used as one subset, and $N_f$ vectors in each subset may be pairwise orthogonal. If the $N_f$ vectors in each subset are sequentially arranged from left to right, a matrix whose dimension is $N_f*N_f$ may be obtained, for example, denoted as $U_i$, where i may range from 1 to $O_f*N_f$.

The terminal device may sequentially arrange the ideal precoding vectors of all the subbands from the first subband to an $N_f^{th}$ subband from left to right, to obtain a matrix X whose dimension is $N_b*N_f$. Then, the matrix X is left-multiplied by a conjugate transpose of E, and right-multiplied by $U_i$, to obtain a projected matrix, for example, denoted as $Y_i$. In this case, $Y_i=E^H XU_i$, and L relatively strong rows and K relatively strong columns are determined from the projected matrix $Y_i$. If 1 to $O_f*N_f$ are traversed for a value of i, $O_f$ groups of L relatively strong rows and K relatively strong columns may be obtained. The terminal device may further select one group from the $O_f$ groups. For example, moduli of L rows in the selected group of vectors may be greater than moduli of L rows in each of remaining $O_f-1$ groups of vectors, and moduli of K columns in the selected group of vectors may be greater than moduli of K columns in each of the remaining $O_f-1$ group of vectors. Sequence numbers of the L rows in this group of vectors are sequence numbers of columns in which the L port selection vectors are located in the port selection vector set, or sequence numbers of rows in which the L port selection vectors are located in E. A subset from which the K columns are taken is one of $O_f$ subsets in the foregoing frequency domain vector set, and for example, is denoted as a first subset. Sequence numbers of the K columns in this group of vectors are sequence numbers of columns in which the K frequency domain vectors are located in a matrix including vectors in the first subset.

It should be understood that the foregoing listed specific methods for determining the L port selection vectors and the K frequency domain vectors are merely examples, and should not constitute any limitation on this application. A specific method for determining the L port selection vectors and the K frequency domain vectors is not limited in this application. In addition, the K frequency domain vectors may be pairwise orthogonal, or may be non-orthogonal. When the K frequency domain vectors are K non-orthogonal vectors, the K frequency domain vectors may be obtained from different subsets in the $O_f$ subsets. This is not limited in this application.

Step (ii): The terminal device determines a linear combination coefficient.

The terminal device may extract the L columns selected from the port selection vector set in step (i), and arrange the L columns from left to right to obtain a matrix whose dimension is $N_b*L$, for example, denoted as B; and extract the K columns selected from the frequency domain vector set in step (i), and arrange the K columns from left to right to obtain a matrix whose dimension is $N_f*K$, for example, denoted as $B_f$.

The terminal device may further left multiply the matrix X by a conjugate transpose of $B_b$, and right-multiply the matrix X by $B_f$, to obtain a projected matrix. A dimension of the matrix is $L*K$, and $L*K$ elements in the matrix are linear combination coefficients. The matrix whose dimension is $L*K$ may be referred to as a coefficient matrix A. Each row in the coefficient matrix may correspond to one port selection vector, and each column in the coefficient matrix may correspond to one frequency domain vector.

The terminal device may construct a space frequency matrix $W=B_b AB_f^H$ based on the L port selection vectors and the K frequency domain vectors that are determined in step (i) and the $L*K$ linear combination coefficients that are determined in step (ii).

Step (iii): The terminal device generates first indication information.

Based on the L port selection vectors determined in step (i), the terminal device may determine information used to indicate the L port selection vectors, and the information may be used to indicate positions of the L port selection vectors in the port selection vector set.

As described above, the port selection vector set may include a plurality of pairwise orthogonal port selection vectors. When indicating the L port selection vectors, the first indication information may be specifically used to indicate an index of a combination of the L port selection vectors. For example, the protocol may predefine a plurality of combinations of a plurality of port selection vectors, and each combination may correspond to one index. The L port selection vectors may be one of the plurality of combinations, or may be close to one of the plurality of combinations. The terminal device may indicate the L port selection vectors by using an index of the combination.

It should be understood that indicating the L port selection vectors by indicating the index of the combination of the L port selection vectors is merely a possible implementation, and should not constitute any limitation on this application. For example, when indicating the L port selection vectors, the first indication information may also be used to indicate indexes of the L port selection vectors in the port selection vector set. A specific manner for indicating the L port selection vectors is not limited in this application.

Based on the K frequency domain vectors determined in step (i), the terminal device may indicate positions of the K frequency domain vectors in the frequency domain vector sets.

As described above, the frequency domain vector set may include a plurality of pairwise orthogonal frequency domain vectors. When indicating the K frequency domain vectors, the first indication information may be specifically used to indicate an index of a combination of the K frequency domain vectors, or may indicate indexes of the K frequency domain vectors in the frequency domain vector set. This is not limited in this application.

Alternatively, the frequency domain vector set may include a plurality of subsets, and frequency domain vectors in each subset are pairwise orthogonal. The K frequency domain vectors may be obtained from one of the plurality of subsets, for example, a first subset. In this case, when indicating the K frequency domain vectors, the first indication information may be specifically used to indicate the first subset and indexes of the K frequency domain vectors in the first subset. The indexes of the K frequency domain vectors in the first subset may be, for example, the index of the combination of the K frequency domain vectors or the indexes of the K frequency domain vectors. This is not limited in this application.

Based on the L*K linear combination coefficients determined in step (iii), the terminal device indicates the L*K linear combination coefficients in a normalized manner.

In an implementation, the terminal device may determine a coefficient with a largest amplitude (for example, denoted as a largest coefficient) from the L*K linear combination coefficients, and indicates a position of the largest coefficient in the coefficient matrix (for example, a sequence number of a row and a sequence number of a column of the largest coefficient in the coefficient matrix). Then, the terminal device may further indicate a relative value of a coefficient with a largest amplitude (for example, denoted as an intra-row largest coefficient) in each row in the coefficient matrix relative to the foregoing largest coefficient, and a relative value of another coefficient in each row relative to the intra-row largest coefficient in the same row. Alternatively, the terminal device may further indicate a relative value of a coefficient with a largest amplitude (for example, denoted as an intra-column largest coefficient) in each column in the coefficient matrix relative to the foregoing largest coefficient, and a relative value of another coefficient in each column relative to the intra-column largest coefficient in the same column.

In another implementation, the terminal device may determine a coefficient with a largest amplitude (namely, the foregoing largest coefficient) from the L*K coefficients, and indicates a position of the largest coefficient in the coefficient matrix (for example, a sequence number of a row and a sequence number of a column of the largest coefficient in the coefficient matrix). Then, the terminal device may further indicate a relative value of another coefficient in the coefficient matrix relative to the largest coefficient.

A one-to-one correspondence between a plurality of relative values and a plurality of indexes may be predefined in a codebook. The terminal device may feed back, to the network device based on the one-to-one correspondence, an index corresponding to a relative value of each coefficient or an index of a value close to a relative value of each coefficient. Therefore, the coefficients indicated by the terminal device may be the same as or close to the coefficients determined in step (ii), and therefore become quantized values of the coefficients.

It should be understood that indicating the L*K linear combination coefficients in a normalized manner is merely a possible implementation, and should not constitute any limitation on this application. For example, the terminal device may directly indicate indexes of quantized values of the L*K linear combination coefficients, or may indicate the L*K linear combination coefficients in a differential manner. A specific method for indicating the L*K linear combination coefficients by the terminal device is not limited in this application.

It should be further understood that the terminal device may indicate the L*K linear combination coefficients according to a preset rule. For example, when indicating the linear combination coefficients based on the second implementation, the terminal device may indicate sequence numbers of a row and a column in which the largest coefficient is located, and then sequentially indicate quantized values of coefficients in each row in the coefficient matrix from a row 0 to a row L−1. The terminal device may sequentially indicate the quantized values of the coefficients in each row from a column 0 to a column K−1. It should be understood that the rules listed above are merely examples, and a specific method for indicating the linear combination coefficients by the terminal device according to a preset rule is not limited in this application. However, it may be understood that the terminal device and the network device may perform indication and parsing according to a same rule. For brevity, descriptions of a same or similar case are omitted below.

Based on the methods listed above, the terminal device may generate the first indication information.

In S350, the terminal device sends the first indication information. Correspondingly, the network device receives the first indication information.

Optionally, the first indication information may be a PMI or an information element in a PMI. This is not limited in this application.

Optionally, the first indication information is transmitted on a physical uplink control channel (PUCCH).

A specific method for sending the first indication information by the terminal device to the network device may be the same as that in an existing technology. For brevity, a detailed description of a specific process thereof is omitted herein.

In S360, the network device determines a precoding vector of each subband based on the first indication information.

The network device may determine the L port selection vectors from the port selection vector set and the K frequency domain vectors from the frequency domain vector set based on the first indication information, and further determine the L*K linear combination coefficients based on the predefined one-to-one correspondence between a plurality of relative values and a plurality of indexes.

The network device may determine the space-frequency matrix based on the L port selection vectors, the K frequency domain vectors, and the L*K linear combination coefficients.

Specifically, the network device may sequentially arrange the L port selection vectors from left to right to obtain a matrix whose dimension is $N_b*L$, sequentially arrange the K frequency domain vectors from left to right to obtain a matrix whose dimension is $N_f*K$, parse the L*K linear combination coefficients according to the preset rule, and further arrange the L*K linear combination coefficients to obtain a coefficient matrix whose dimension is L*K.

It may be understood that the matrix whose dimension is $N_b*L$ may be the same as or similar to $B_b$ determined by the terminal device above, the matrix whose dimension is $N_f*K$ may be the same as or similar to Br determined by the terminal device above, and the matrix whose dimension is L*K may be the same as or similar to the coefficient matrix determined by the terminal device above.

After normalization processing is performed on each column in the space-frequency matrix, a precoding vector corresponding to each subband may be obtained. In this way, the precoding vector of each subband may be determined.

In the normalization processing, $N_b$ elements in each column may be multiplied by a normalization coefficient, so that a sum of powers of all elements in the column is equal to 1. The normalization coefficient may be, for example, a reciprocal of a square root of a sum of modulus lengths of the $N_b$ elements in this column. A specific normalization processing method is not limited in this application. Further, if a length $N_f$ of the frequency domain vector is determined based on a quantity of subbands included in pilot transmission bandwidth or is determined based on a signaling length of a reporting band, a quantity of to-be-reported subbands, for example, denoted as $N_{sb}$, may be less than $N_f$. The $N_{sb}$ subbands may be a subset of $N_f$ subbands. The network device may determine, based on positions of the $N_b$¬ subbands in the $N_f$ subbands, precoding vectors corresponding to the $N_b$¬ subbands. For example, $N_f$ is 10, including subbands 0 to 9, and $N_{sb}$ is 5. Specific positions of the Ns subbands in the 10 subbands may be indicated by using, for example, the reporting band described above, for example, including a subband 1, a subband 3, a subband 5, a subband 7, and a subband 9. In this case the network device may extract a column 1, a column 3, a column 5, a column 7, and a column 9 in the space-frequency matrix, and each column is a precoding vector corresponding to one subband. For example, the column 1 is a precoding vector of the subband 1, and the column 3 is a precoding vector of the subband 3. For brevity, no enumeration is provided herein.

The length of the frequency domain vector is determined based on the quantity of subbands included in the pilot transmission bandwidth or the signaling length of the reporting band. A variation pattern of a channel on a plurality of consecutive subbands may be reflected by using the frequency domain vector. Compared with a frequency domain vector whose length is determined based on a quantity of to-be-reported subbands, the frequency domain vector determined based on the quantity of subbands in the pilot transmission bandwidth or the signaling length of the reporting band can more accurately reflect the variation pattern of the channel in frequency domain, and a precoding vector restored based on the feedback can better adapt to the channel.

It should be understood that the method for determining the L port selection vectors, the K frequency domain vectors, and the L*K linear combination coefficients by the terminal device and the method for determining the precoding vector by the network device that are listed above are merely possible implementations, and should not constitute any limitation on this application.

Based on the foregoing methods, the terminal device may feed back the precoding vector of each subband to the network device by using the port selection vector, the frequency domain vector, and the linear combination coefficient. The network device may restore the precoding vector of each subband in a corresponding manner. In the embodiments of this application, K frequency domain vectors are used to describe different variation patterns of the channel in frequency domain, and a variation of the channel in frequency domain is stimulated through linear combination of the K frequency domain vectors, so that a relationship between subbands is fully explored. Variation patterns of all subbands are described by using a relatively small quantity of frequency domain vectors and continuity of the frequency domain, thereby reducing feedback overheads. Compared with an existing technology, a subband combination coefficient does not need to be independently reported based on each subband, and when a quantity of subbands increases, feedback overheads do not multiply. Therefore, feedback overheads can be greatly reduced, and approximate precision of a Type II codebook can also be ensured.

It should be noted that, according to the precoding vector indication and determining method provided above, the variation pattern of the channel in frequency domain is described based on the frequency domain vector, and a variation of the channel in frequency domain is infinitely approximated through linear combination of the K frequency domain vectors. This may be considered as a subband joint feedback mode. Therefore, the foregoing feedback mode of indicating a precoding vector may be referred to as a subband joint feedback mode. Correspondingly, a feedback mode of independently feeding back a subband combination coefficient based on each subband may be referred to as a subband independent feedback mode. The feedback mode may be, for example, a feedback mode defined in a type II port selection codebook defined in the NR protocol TS38.214 release 15 (R15).

It should be further noted that only for ease of understanding, a specific process of indicating and determining a precoding vector is described in detail above by using one transport layer as an example. However, in an actual transmission process, a quantity of transport layers is usually not limited to one. In addition, the transmit antennas may alternatively be configured with a plurality of polarization directions, such as a horizontal polarization direction and a vertical polarization direction.

When there are a plurality of transport layers and a plurality of polarization directions, the terminal device may still indicate the precoding matrix according to the foregoing method, and the network device may also determine the precoding matrix according to the foregoing method.

Figure 4:
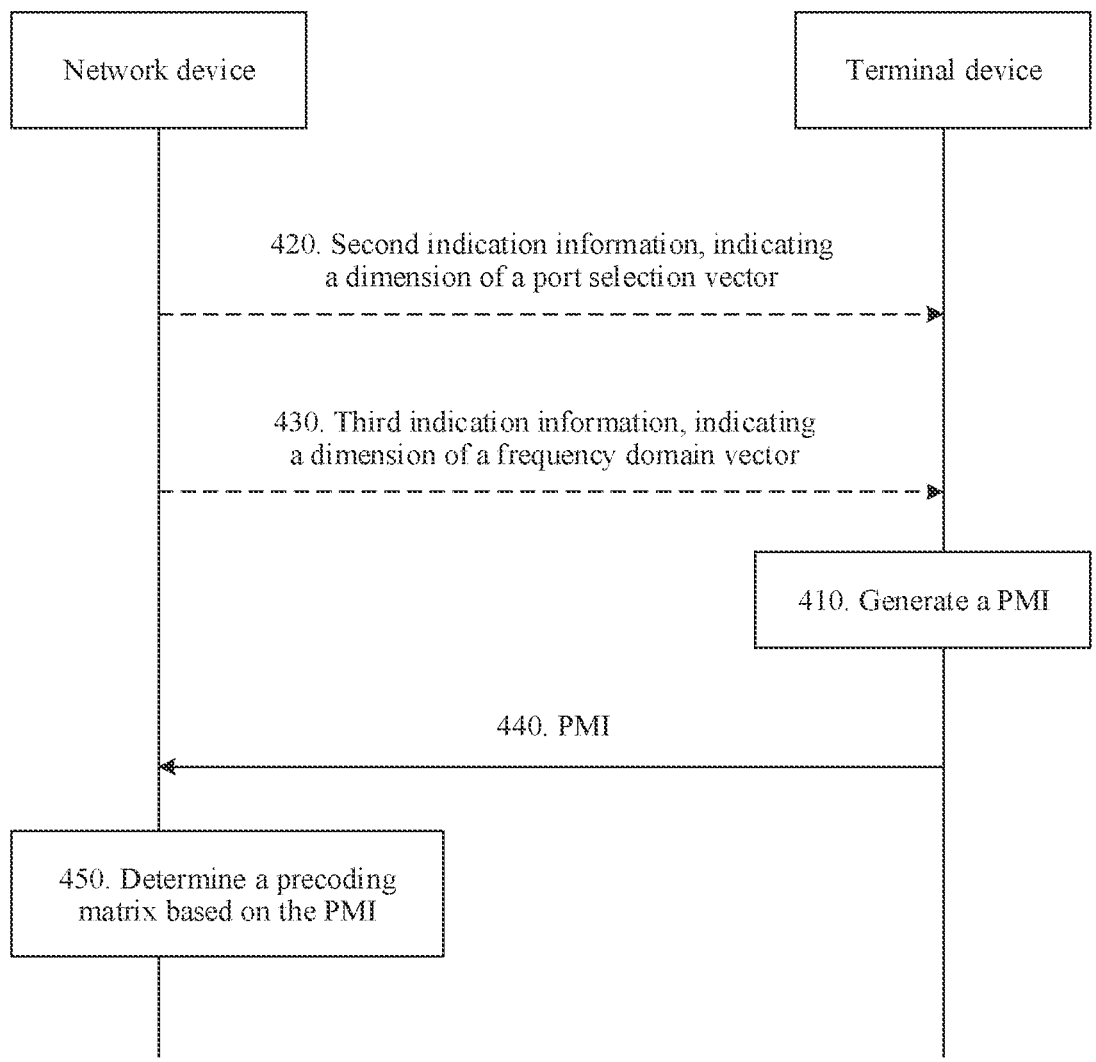
FIG. 4 is a schematic flowchart of a precoding matrix indication and determining method according to another embodiment of this application.

With reference to FIG. 4, the following describes in detail a process in which the terminal device indicates the precoding matrix and a process in which the network device determines the precoding matrix when a quantity R of transport layers is greater than 1 and a quantity P of polarization directions is greater than 1. FIG. 4 shows a precoding matrix indication and determining method 400 according to another embodiment of this application from a perspective of device interaction. The method 400 may include S410 to S450. The following describes the steps in the method 400 in detail.

In S410, a terminal device generates a PMI.

First, the terminal device may determine an ideal precoding matrix of each subband based on an equivalent channel matrix of each subband. The foregoing has described in detail the specific process in which the terminal device determines the ideal precoding matrix of each subband based on the precoded reference signal sent by the network device. For brevity, details are not described herein again.

As described above, the ideal precoding matrix that is of each subband and that is determined by the terminal device may be fed back by using information in space domain and frequency domain and weights of the information in space domain and frequency domain. The information in space domain may be fed back by using a selected port selection vector. The information in frequency domain may be fed back by using a selected frequency domain vector. The weights of the information in space domain and frequency domain may be fed back by using a linear combination coefficient. A dimension of the port selection vector and a dimension of the frequency domain vector may be separately indicated by the network device, or may be predefined, for example, defined in a protocol.

When the dimension of the port selection vector is indicated by the network device, optionally, the method further includes the following step. S420. The terminal device receives second indication information, where the second indication information is used to indicate the length of the port selection vector. Correspondingly, the network device sends the second indication information. In this embodiment, the dimension of the port selection vector may be determined by a quantity of ports of a reference signal in one polarization direction.

Optionally, the second indication information is carried in an RRC message.

When the dimension of the frequency domain vector is indicated by the network device, optionally, the method further includes the following step: S430. The terminal device receives third indication information, where the third indication information is used to indicate the dimension of the frequency domain vector. Correspondingly, the network device sends the third indication information.

Optionally, the third indication information is carried in an RRC message.

In this embodiment, when a quantity of transport layers is R, the PMI may include R pieces of indication information corresponding to the R transport layers, and each group of indication information may correspond to one transport layer. At a transport layer, ben a quantity of polarization directions is P, one piece of indication information corresponding to the transport layer may be specifically used to indicate P groups of port selection vectors, P groups of frequency domain vectors, and P groups of linear combination coefficients that respectively correspond to the P polarization directions. Each group of port selection vectors may include L port selection vectors, each group of frequency domain vectors may include K frequency domain vectors, and each group of linear combination coefficients may include L*K linear combination coefficients. The indication information may be considered as an example of the first indication information in the foregoing embodiment 300.

In the P groups of port selection vectors, any two groups of port selection vectors may be the same, or at least two groups of port selection vectors may be different. In the P groups of frequency domain vectors, any two groups of frequency domain vectors may be the same, or at least two groups of frequency domain vectors may be different.

When any two groups of port selection vectors are the same and any two groups of frequency domain vectors are the same, only one group of port selection vectors may be fed back for the P polarization directions. In this case, the terminal device may determine the L port selection vectors based on ideal precoding vectors of all subbands in one polarization direction, or may determine the L port selection vectors based on ideal precoding vectors of all subbands in the P polarization directions.

That at least two groups of port selection vectors are different may specifically include. The at least two groups of port selection vectors are partially different or the at least two groups of port selection vectors are completely different. In other words, the at least two groups of port selection vectors are at least partially different. Similarly, that at least two groups of frequency domain vectors are different may specifically include: The at least two groups of frequency domain vectors are partially different or the at least two groups of frequency domain vectors are completely different. In other words, the at least two groups of frequency domain vectors are at least partially different. When the at least two groups of port selection vectors are different and the at least two groups of frequency domain vectors are different, the P groups of port selection vectors in the P polarization directions may be fed back separately, and the P groups of frequency domain vectors in the P polarization directions may also be fed back separately. In this case, the terminal device may determine, based on the ideal precoding vectors of the subbands in each polarization direction, the L port selection vectors and the K frequency domain vectors that correspond to the polarization direction. In other words, the terminal device may determine P*L port selection vectors and P*K frequency domain vectors.

Therefore, when the quantity of transport layers is 1 and the quantity of polarization directions is P, if port selection vectors in any two polarization directions are the same and frequency domain vectors in any two polarization directions are the same, the PMI may include information used to indicate the L port selection vectors, information used to indicate the K frequency domain vectors, and information used to indicate P*L*K linear combination coefficients. In other words, port selection vectors in all polarization directions may not be repeatedly indicated based on each polarization direction, frequency domain vectors in all polarization directions may not be repeatedly indicated based on each polarization direction either, but linear combination coefficients in all polarization directions may be separately indicated based on each polarization direction.

When the quantity of transport layers is 1 and the quantity of polarization directions is P, if port selection vectors in at least two polarization directions are different and frequency domain vectors in at least two polarization directions are different, the PMI may include information used to indicate the P*L port selection vectors, information used to indicate the P*K frequency domain vectors, and information used to indicate the P*L*K linear combination coefficients. In other words, port selection vectors in all polarization directions may be separately indicated based on each polarization direction, frequency domain vectors in all polarization directions may also be separately indicated based on each polarization direction, and linear combination coefficients in all polarization directions may also be separately indicated based on each polarization direction.

When the quantity of transport layers is 1 and the quantity of polarization directions is P, if port selection vectors in at least two polarization directions are different and frequency domain vectors in any two polarization directions are the same, the PMI may include information used to indicate the P*L port selection vectors, information used to indicate the K frequency domain vectors, and information used to indicate the P*L*K linear combination coefficients. In other words, port selection vectors in all polarization directions may be separately indicated based on each polarization direction, frequency domain vectors in all polarization directions may not be repeatedly indicated based on each polarization direction, and linear combination coefficients in all polarization directions may be separately indicated based on each polarization direction.

When the quantity of transport layers is 1 and the quantity of polarization directions is P, if port selection vectors in any two polarization directions are the same and frequency domain vectors in at least two polarization directions are different, the PMI may include information used to indicate the L port selection vectors, information used to indicate the P*K frequency domain vectors, and information used to indicate the P*L*K linear combination coefficients. In other words, port selection vectors in all polarization directions may not be repeatedly indicated based on each polarization direction, frequency domain vectors in all polarization directions may be separately indicated based on each polarization direction, and linear combination coefficients in all polarization directions may be separately indicated based on each polarization direction.

Further, if the quantity of transport layers is greater than 1, for example, the quantity of transport layers is R, the PMI may be used to indicate R groups of port selection vectors, R groups of frequency domain vectors, and R groups of linear combination coefficients that respectively correspond to the R transport layers. In the R groups of port selection vectors, any two groups of port selection vectors may be the same, or at least two groups of port selection vectors may be different. In the R groups of frequency domain vectors, any two groups of frequency domain vectors may be the same, or at least two groups of frequency domain vectors may be different.

When any two groups of port selection vectors are the same and any two groups of frequency domain vectors are the same, only one group of port selection vectors may be fed back for the R transport layers. In this case, the terminal device may determine one group of port selection vectors based on ideal precoding vectors of all subbands at a transport layer, or may determine one group of port selection vectors based on ideal precoding vectors of all subbands at R transport layers; and the terminal device may determine one group of frequency domain vectors based on ideal precoding vectors of all subbands at a transport layer, or may determine one group of frequency domain vectors based on ideal precoding vectors of all subbands at R transport layers.

That at least two groups of port selection vectors are different may specifically include: The at least two groups of port selection vectors are partially different or the at least two groups of port selection vectors are completely different. In other words, the at least two groups of port selection vectors are at least partially different. Similarly, that at least two groups of frequency domain vectors are different may specifically include: The at least two groups of frequency domain vectors are partially different or the at least two groups of frequency domain vectors are completely different. In other words, the at least two groups of frequency domain vectors are at least partially different. When the at least two groups of port selection vectors are different and the at least two groups of frequency domain vectors are different, the R groups of port selection vectors at the R transport layers may be fed back separately, and the R groups of frequency domain vectors at the R transport layers may also be fed back separately. In this case, the terminal device may determine, based on ideal precoding vectors of all subbands at each transport layer, one group of port selection vectors and one group of frequency domain vectors that correspond to the transport layer.

Therefore, when the quantity of transport layers is R and the quantity of polarization directions is 1, if port selection vectors at any two transport layers are the same and frequency domain vectors at any two transport layers are the same, the PMI may include information used to indicate the L port selection vectors, information used to indicate the K frequency domain vectors, and information used to indicate R*L*K linear combination coefficients. In other words, port selection vectors at all transport layers may not be repeatedly indicated based on each transport layer, frequency domain vectors at all transport layers may not be repeatedly indicated based on each transport layer either, but linear combination coefficients at all transport layers may be separately indicated based on each transport layer. In other words, the information that is described above and that is used to indicate the L port selection vectors and the K frequency domain vectors in the first indication information may not be repeatedly indicated based on each transport layer, that is, may not be repeatedly indicated in first indication information corresponding to each transport layer.

When the quantity of transport layers is R and the quantity of polarization directions is 1, if port selection vectors at least two transport layers are different and frequency domain vectors at least two transport layers are different, the PMI may include information used to indicate R*L port selection vectors, information used to indicate R*K frequency domain vectors, and information used to indicate R*L*K linear combination coefficients. In other words, port selection vectors at all transport layers may be separately indicated based on each transport layer, frequency domain vectors at all transport layers may also be separately indicated based on each transport layer, and linear combination coefficients at all transport layers may also be separately indicated based on each transport layer. In other words, the information that is described above and that is used to indicate the L port selection vectors and the K frequency domain vectors in the first indication information may be separately indicated, based on each transport layer, in first indication information corresponding to each transport layer.

When the quantity of transport layers is R and the quantity of polarization directions is 1, if port selection vectors at least two transport layers are different and frequency domain vectors at any two transport layers are the same, the PMI may include information used to indicate R*L port selection vectors, information used to indicate K frequency domain vectors, and information used to indicate R*L*K linear combination coefficients. In other words, port selection vectors at all transport layers may be separately indicated based on each transport layer, frequency domain vectors at all transport layers may not be repeatedly indicated based on each transport layer, and linear combination coefficients at all transport layers may be separately indicated based on each transport layer. In other words, the information that is described above and that is used to indicate the K frequency domain vectors in the first indication information may not be repeatedly indicated based on each transport layer, that is, may not be repeatedly indicated in first indication information corresponding to each transport layer; and the information that is described above and that is used to indicate the L port selection vectors in the first indication information may be separately indicated, based on each transport layer, in first indication information corresponding to each transport layer.

When the quantity of transport layers is R and the quantity of polarization directions is 1, if port selection vectors at any two transport layers are the same and frequency domain vectors at least two transport layers are different, the PMI may include information used to indicate the L port selection vectors, information used to indicate R*K frequency domain vectors, and information used to indicate R*L*K linear combination coefficients. In other words, port selection vectors at all transport layers may not be repeatedly indicated based on each transport layer, frequency domain vectors at all transport layers may be separately indicated based on each transport layer, and linear combination coefficients at all transport layers may be separately indicated based on each transport layer. In other words, the information that is described above and that is used to indicate the L port selection vectors in the first indication information may not be repeatedly indicated based on each transport layer, that is, may not be repeatedly indicated in first indication information corresponding to each transport layer; and the information that is described above and that is used to indicate the K frequency domain vectors in the first indication information may be separately indicated, based on each transport layer, in first indication information corresponding to each transport layer.

In conclusion, when the quantity of transport layers is R and the quantity of polarization directions is P, if port selection vectors at any two transport layers are the same and frequency domain vectors at any two transport layers are the same, and port selection vectors in any two polarization directions are the same and frequency domain vectors in any two polarization directions are the same, the PMI may include information used to indicate the L port selection vectors, information used to indicate the K frequency domain vectors, and information used to indicate R*P*L*K linear combination coefficients. In other words, port selection vectors in each polarization direction at each transport layer may not be repeatedly indicated based on each polarization direction at each transport layer, frequency domain vectors in each polarization direction at each transport layer may not be repeatedly indicated based on each polarization direction at each transport layer either, and linear combination coefficients in each polarization direction at each transport layer may be separately indicated based on each polarization direction at each transport layer. In other words, the information that is described above and that is used to indicate the L port selection vectors and the K frequency domain vectors in the first indication information may not be repeatedly indicated based on each transport layer, that is, may not be repeatedly indicated in first indication information corresponding to each transport layer.

When the quantity of transport layers is R and the quantity of polarization directions is P, if port selection vectors at any two transport layers are the same and frequency domain vectors at any two transport layers are the same, and port selection vectors in at least two polarization directions are different and frequency domain vectors in at least two polarization directions are different, the PMI may include information used to indicate the P*L port selection vectors, information used to indicate the P*K frequency domain vectors, and information used to indicate R*P*L*K linear combination coefficients. In other words, port selection vectors at each transport layer may not be repeatedly indicated based on each transport layer, but may be separately indicated based on each polarization direction; frequency domain vectors at each transport layer may not be repeatedly indicated based on each transport layer either, but may be separately indicated based on each polarization direction; and linear combination coefficients in each polarization direction at each transport layer may be separately indicated based on each polarization direction at each transport layer. In other words, the information that is described above and that is used to indicate the L port selection vectors and the K frequency domain vectors in the first indication information may not be repeatedly indicated based on each transport layer, that is, may not be repeatedly indicated in first indication information corresponding to each transport layer.

When the quantity of transport layers is R and the quantity of polarization directions is P, if port selection vectors at least two transport layers are different and frequency domain vectors at least two transport layers are different, and port selection vectors in at least two polarization directions are different and frequency domain vectors in at least two polarization directions are different, the PMI may include information used to indicate R*P*L port selection vectors, information used to indicate R*P*K frequency domain vectors, and information used to indicate R*P*L*K linear combination coefficients. In other words, port selection vectors at each transport layer may not be repeatedly indicated based on each transport layer, but may be separately indicated based on each polarization direction; frequency domain vectors at each transport layer may not be repeatedly indicated based on each transport layer either, but may be separately indicated based on each polarization direction; and linear combination coefficients in each polarization direction at each transport layer may be separately indicated based on each polarization direction at each transport layer. In other words, the information that is described above and that is used to indicate the L port selection vectors and the K frequency domain vectors in the first indication information may be separately indicated, based on each transport layer, in first indication information corresponding to each transport layer.

Without loss of generality, by using an example in which the quantity P of polarization directions is 2, the following describes in detail a specific process in which the terminal device determines a port selection vector, a frequency domain vector, and a linear combination coefficient at one transport layer.

When the quantity of polarization directions is 2, the two polarization directions may share a same port selection vector and a same frequency domain vector. In this case, the port selection vector and the frequency domain vector may be indicated to the transport layer only once. Alternatively, different port selection vectors and different frequency domain vectors may be used in the two polarization directions. In this case, a port selection vector and a frequency domain vector may be indicated separately for two polarization directions at a same transport layer. Alternatively, the two polarization directions may share a same frequency domain vector and use different port selection vectors, or the two polarization directions may share a same port selection vector and use different frequency domain vectors.

With reference to the foregoing two cases, the following separately describes a specific process in which the terminal device determines a port selection vector and a frequency domain vector at one transport layer.

Case 1: Two polarization directions share one or more same port selection vectors and one or more same frequency domain vectors.

In an implementation, the terminal device may randomly select one polarization direction from the two polarization directions, for example, a polarization direction 0 or a polarization direction 1. The terminal device may determine the port selection vector and the frequency domain vector based on components of ideal precoding vectors of all subbands in the polarization direction 0 or the polarization direction 1.

Specifically, the polarization direction 0 is used as an example. The terminal device may sequentially arrange the components of the ideal precoding vectors of all the subbands in the polarization direction 0 from a subband 0 to a subband $N_f-1$ from left to right, to obtain a matrix including the components of the ideal precoding vectors of all the subbands in the polarization direction 0. A dimension of the matrix may be $N_b*N_f$. For example, the matrix is denoted as $X_0$.

Then, the terminal device may determine the L port selection vectors and the K frequency domain vectors based on the matrix $X_0$, a matrix E including a port selection vector set, and a matrix U including a frequency domain vector set. Alternatively, the terminal device may determine the L port selection vectors and the K frequency domain vectors based on the matrix $X_0$, a matrix E including a port selection vector set, and a matrix $U_i$ including a frequency domain vector set.

A specific process in which the terminal device determines the port selection vector and the frequency domain vector based on components of ideal precoding vectors of all subbands in the polarization direction 1 may be similar to the specific process in which the terminal device determines the port selection vector and the frequency domain vector based on the ideal precoding vectors of all the subbands in step (i) in S310 in the foregoing method 300. For brevity, details are not described herein again.

In another implementation, the terminal device may determine the port selection vector and the frequency domain vector based on components of ideal precoding vectors of all subbands in each of the two polarization directions.

Specifically, the terminal device may sequentially arrange the components of the ideal precoding vectors of all the subbands in the polarization direction 0 from a subband 0 to a subband $N_f-1$ from left to right, to obtain a matrix including the components of the ideal precoding vectors of all the subbands in the polarization direction 1. A dimension of the matrix may be $N_b*N_f$, and the matrix is, for example, denoted as $X_0$. The terminal device sequentially arranges the components of the ideal precoding vectors of all the subbands in the polarization direction 1 from a subband 0 to a subband $N_f-1$ from left to right, to obtain a matrix including the components of the ideal precoding vectors of all the subbands in the polarization direction 1. A dimension of the matrix may be $N_b*N_f$, and the matrix is, for example, denoted as $X_1$.

It is assumed that there are $N_b$ port selection vectors and $N_f$ frequency domain vectors. The terminal device may left-multiply the matrix $X_1$ by a conjugate transpose of a matrix E including the $N_b$ vectors, and right-multiply the matrix $X_1$ by the matrix U including the $N_f$ vectors, to obtain a projected matrix, for example, denoted as $Y_0$. In this case, $Y_0=E^H X_0 U$. A dimension of the matrix $Y_0$ may still be $N_b*N_f$. The terminal device may left-multiply the matrix $X_1$ by the conjugate transpose of E, and right-multiply the matrix $X_1$ by U, to obtain a projected matrix, for example, denoted as $Y_i$. In this case, $Y_1=E^H X_1 U$. A dimension of the matrix $Y_i$ may still be $N_b*N_f$. The terminal device may calculate a sum of modulus lengths of all rows in the matrices $Y_0$ and $Y_1$, for example, calculate a sum of a modulus length of a row j in the matrix $Y_0$ and a modulus length of a row j in the matrix $Y_i$, where 0 to $N_b\neg-1$ are traversed for a value of j. L rows with a larger sum are selected, and sequence numbers of the L rows in the matrix $Y_0$ or $Y_i$ may be sequence numbers of columns in which the L port selection vectors are located in the port selection vector set. The terminal device may calculate a sum of modulus lengths of all columns in the matrices $Y_0$ and $Y_1$, for example, calculate a sum of a modulus length of a column k in the matrix $Y_0$ and a modulus length of a column k in the matrix $Y_1$, where 0 to $N_f-1$ are traversed for a value of k. K columns with a larger sum are selected, and sequence numbers of the K columns in the matrix $Y_0$ or $Y_1$ may be sequence numbers of columns in which the K frequency domain vectors are located in the frequency domain vector set.

If there are $N_b$ port selection vectors and $O_f*N_f$ frequency domain vectors, the terminal device may still determine the L port selection vectors and the K frequency domain vectors in the foregoing manner. A specific implementation process thereof is similar to that described above. For brevity, details are not described herein again.

Optionally, when K frequency domain vectors in any two of the P polarization directions are the same, or in other words, when K frequency domain vectors in a first polarization direction are the same as K frequency domain vectors in a second polarization direction, the K frequency domain vectors are obtained from a subset of the frequency domain vector set. When is used to indicate the K frequency domain vectors, the PMI may be specifically used to indicate the subset and indexes of the K frequency domain vectors in the subset.

Case 2: Port selection vectors in two polarization directions are independent of each other, and frequency domain vectors in the two polarization directions are independent of each other.

When the port selection vectors in the two polarization directions are independent of each other and frequency domain vectors in the two polarization directions are independent of each other, the terminal device may determine a port selection vector and a frequency domain vector in each polarization direction based on components of ideal precoding vectors of all subbands in each polarization direction. A specific process thereof is the same as the specific process of the first implementation in Case 1. For brevity, details are not described herein again.

It may be understood that when the port selection vectors in the two polarization directions are independent of each other and the frequency domain vectors in the two polarization directions are independent of each other, port selection vectors corresponding to each polarization direction may be separately obtained from a port selection vector set, and frequency domain vectors corresponding to each polarization direction may be separately obtained from a frequency domain vector set, for example, may be obtained from a same subset or different subsets in the frequency domain vector set.

Optionally, when K frequency domain vectors in any two of the P polarization directions are different, or in other words, when K frequency domain vectors in a first polarization direction are different from K frequency domain vectors in a second polarization direction, the PMI may be used to indicate P*K frequency domain vectors. K frequency domain vectors in each polarization direction may be obtained from a subset in the frequency domain vector set. When used to indicate the frequency domain vectors, the PMI may be specifically used to indicate P subsets corresponding to the P polarization directions and indexes of the K frequency domain vectors in each polarization direction in a corresponding subset.

Case 3: Two polarization directions share a same frequency domain vector, and use different port selection vectors.

The terminal device may determine the K frequency domain vectors according to the method in the foregoing Case 1, and determine the L port selection vectors in each of the two polarization directions according to the method in the foregoing Case 2. A specific implementation process is not described herein again.

Case 4: Two polarization directions share a same port selection vector, and use different frequency domain vectors.

The terminal device may determine the L port selection vectors according to the method in the foregoing Case 1, and determine the K frequency domain vectors in each of the two polarization directions according to the method in the foregoing Case 2. A specific implementation process is not described herein again.

It should be understood that the foregoing listed specific manners of determining the port selection vector and the frequency domain vector by the terminal device are merely examples, and should not constitute any limitation on this application. A specific manner for determining the port selection vector and the frequency domain vector by the terminal device is not limited in this application.

The foregoing uses two polarization directions as an example to describe in detail the specific process of determining the port selection vector and the frequency domain vector. When the quantity of transport layers is greater than 1, the terminal device may also determine the port selection vector and the frequency domain vector according to a method similar to the foregoing method. For brevity, details are not described herein.

After determining the port selection vector and the frequency domain vector, the terminal device may further determine the linear combination coefficient. A specific quantity of the linear combination coefficients is described in detail above with reference to different cases. The terminal device may determine, with reference to different cases, one or more linear combination coefficients corresponding to the port selection vector and the frequency domain vector. The specific process of determining the linear combination coefficient based on the L port selection vectors and the K frequency domain vectors has been described in detail in step (ii) in S310 of the method 300. However, in this embodiment, if a quantity of groups of port selection vectors is greater than 1 or a quantity of groups of frequency domain vectors is greater than 1, the terminal device may separately determine corresponding linear combination coefficients based on different groups of port selection vectors or different groups of frequency domain vectors. A specific determining process thereof may be the same as that described above. For brevity, details are not described herein again.

The terminal device generates a PMI based on the port selection vector, the frequency domain vector, and the linear combination coefficient. It may be understood that the PMI may include the first indication information. Specifically, when the quantity of transport layers is 1 and the quantity of polarization directions is 1, the PMI may be the first indication information. When the quantity of transport layers is greater than 1 or the quantity of polarization directions is greater than 1, the first indication information may be some information in the PMI.

In S440, the terminal device sends the PMI. Correspondingly, the network device receives the PMI.

A specific process of sending the PMI by the terminal device to the network device may be the same as that in an existing technology. For brevity, a detailed description of the specific process thereof is omitted herein.

In S450, the network device determines a precoding matrix of each subband based on the PMI.

The network device may determine, based on the received PMI, the port selection vector, the frequency domain vector, and a quantized value of the linear combination coefficient in each polarization direction at each transport layer. The specific process thereof has been described in detail in S340. For brevity, details are not described herein again.

The network device may determine, based on the following formula, a space-frequency matrix corresponding to each transport layer.

$$W = \begin{bmatrix} e_{N_b}^{(l_0)}, e_{N_b}^{(l_1)}, \dots, e_{N_b}^{(l_{L-1})} & 0 \\ 0 & e_{N_b}^{(l_0)}, e_{N_b}^{(l_1)}, \dots, e_{N_b}^{(l_{L-1})} \end{bmatrix} \begin{bmatrix} \alpha_{0,0} & \cdots & \alpha_{0,K-1} \\ \vdots & \ddots & \vdots \\ \alpha_{2L-1,1} & \cdots & \alpha_{2L-1,K-1} \end{bmatrix} [u_0 \ u_1 \ \cdots \ u_{K-1}]^H$$

where $e_N^{(l_0)}$ to $e_N^{(l_{L-1})}$ represent L port selection vectors indicated by the PMI, the subscript $N_b$ represents $N_b$ ports of a reference signal in one polarization direction, the superscript $l_{-i}$ represents a selected port in the $N_b$ ports, i ranges from 0 to L−1, $$\begin{bmatrix} e_{N_b}^{(l_0)}, e_{N_b}^{(l_1)}, \dots, e_{N_b}^{(l_{L-1})} & 0 \\ 0 & e_{N_b}^{(l_0)}, e_{N_b}^{(l_1)}, \dots, e_{N_b}^{(l_{L-1})} \end{bmatrix}$$

represents L same port selection vectors shared in two polarization directions, $\alpha_{0,0}$ to $\alpha_{2L-1,K-1}$ represent quantized values of L*K linear combination coefficients indicated by the PMI, and $u_0$ to $u_{k-1}$ represent K frequency domain vectors indicated by the PMI.

The network device may determine, based on the foregoing formula, R space-frequency matrices corresponding to R transport layers. A dimension of each space-frequency matrix may be $2N_b*N_f$. That is, each column vector in the space-frequency matrix corresponds to one subband.

The network device traverses 1 to $N_f$ for a value of $n_f$, and repeatedly performs the following operations to obtain precoding matrices respectively corresponding to the $N_f$ subbands: extracting a columns $n_f$ in R space-frequency matrices, sequentially arranging the R columns corresponding to transport layers 1 to R from left to right, and performing normalization processing, to obtain a precoding matrix corresponding to a subband $n_f$, where a dimension of the precoding matrix may be $2N_b*R$.

In the normalization processing, each element in each of the R column vectors may be multiplied by a normalization coefficient of each column, so that a sum of powers of the elements is equal to 1; and the R column vectors may be multiplied by an overall normalization coefficient, so that a sum of powers of the column vectors is equal to 1. A specific normalization processing method is not limited in this application.

It should be understood that determining the precoding matrix based on the space-frequency matrix is merely a possible implementation, and the network device may not generate the space-frequency matrix, but directly determine the precoding matrix based on the port selection vector, the frequency domain vector, and the corresponding linear combination coefficient that are determined by the PMI.

For example, a precoding vector that is at each transport layer and that corresponds to a subband $n_f$ may be determined by using the following formula:

$$w_{n_f} = \eta \begin{bmatrix} \sum_{i=0}^{L-1} e_{N_b}^{(l_i)} \left( \sum_{k=0}^{K-1} \alpha_{i,k} u_{r,k,n_f} \right) \\ \sum_{i=0}^{L-1} e_{N_b}^{(l_i)} \left( \sum_{k=1}^{K} \alpha_{i+L,k} u_{r,k,n_f} \right) \end{bmatrix},$$

$\eta$ is a normalization coefficient, and $0 < \eta \leq 1$, or $\eta > 0$; $e_{N_b}^{(l_i)}$ represents a port selection vector i in the L port selection vectors indicated by the PMI; $u_{r,k,n_f}$ represents an element $n_f$ in a frequency domain vector k in the K frequency domain vectors indicated by the PMI; and $\alpha_{l,k}$ represents a quantized value of a linear combination coefficient that is indicated by the PMI and that corresponds to $e_N^{(l_i)}$ and $u_{r,k,n_f}$.

It should be understood that the foregoing listed specific methods for determining the precoding matrix of each subband by the network device based on the PMI are merely examples, and should not constitute any limitation on this application. A specific method for determining the precoding matrix of each subband by the network device based on the PMI is not limited in this application.

Further, if a length $N_f$ of the frequency domain vector is determined based on a quantity of subbands included in pilot transmission bandwidth or is determined based on a signaling length of a reporting band, a quantity $N_{sb}$ of to-be-reported subbands may be less than $N_f$. The $N_{sb}$ subbands may be a subset of $N_f$ subbands. The network device may determine, based on positions of the $N_{sb}$ subbands in the $N_f$ subbands, precoding vectors corresponding to the $N_{sb}$ subbands. The specific process of determining the precoding vectors corresponding to the $N_{sb}$ subbands has been described in detail in S360 in the foregoing method 300. For brevity, details are not described herein again.

Based on the foregoing technical solutions, the terminal device may feed back a precoding matrix of each subband to the network device by using the port selection vector, the frequency domain vector, and the linear combination coefficient. The network device may restore the precoding matrix of each subband in a corresponding manner. In the embodiments of this application, K frequency domain vectors are used to describe different variation patterns of the channel in frequency domain, and a variation of the channel in frequency domain is stimulated through linear combination of the K frequency domain vectors, so that a relationship between subbands is fully explored. Variation patterns of all subbands are described by using a relatively small quantity of frequency domain vectors and continuity of the frequency domain, thereby reducing feedback overheads. Compared with an existing technology, a subband combination coefficient does not need to be independently reported based on each subband, and when a quantity of subbands increases, feedback overheads do not multiply. Therefore, feedback overheads can be greatly reduced, and approximate precision of a Type II codebook can also be ensured.

The specific methods, provided in the embodiments of this application, for indicating and determining the precoding vector or the precoding matrix are described above in detail with reference to specific embodiments. However, a method for indicating a precoding vector or a precoding matrix by the terminal device is not limited to the foregoing description, and another precoding vector indication and determining method is provided below.

Figure 5:
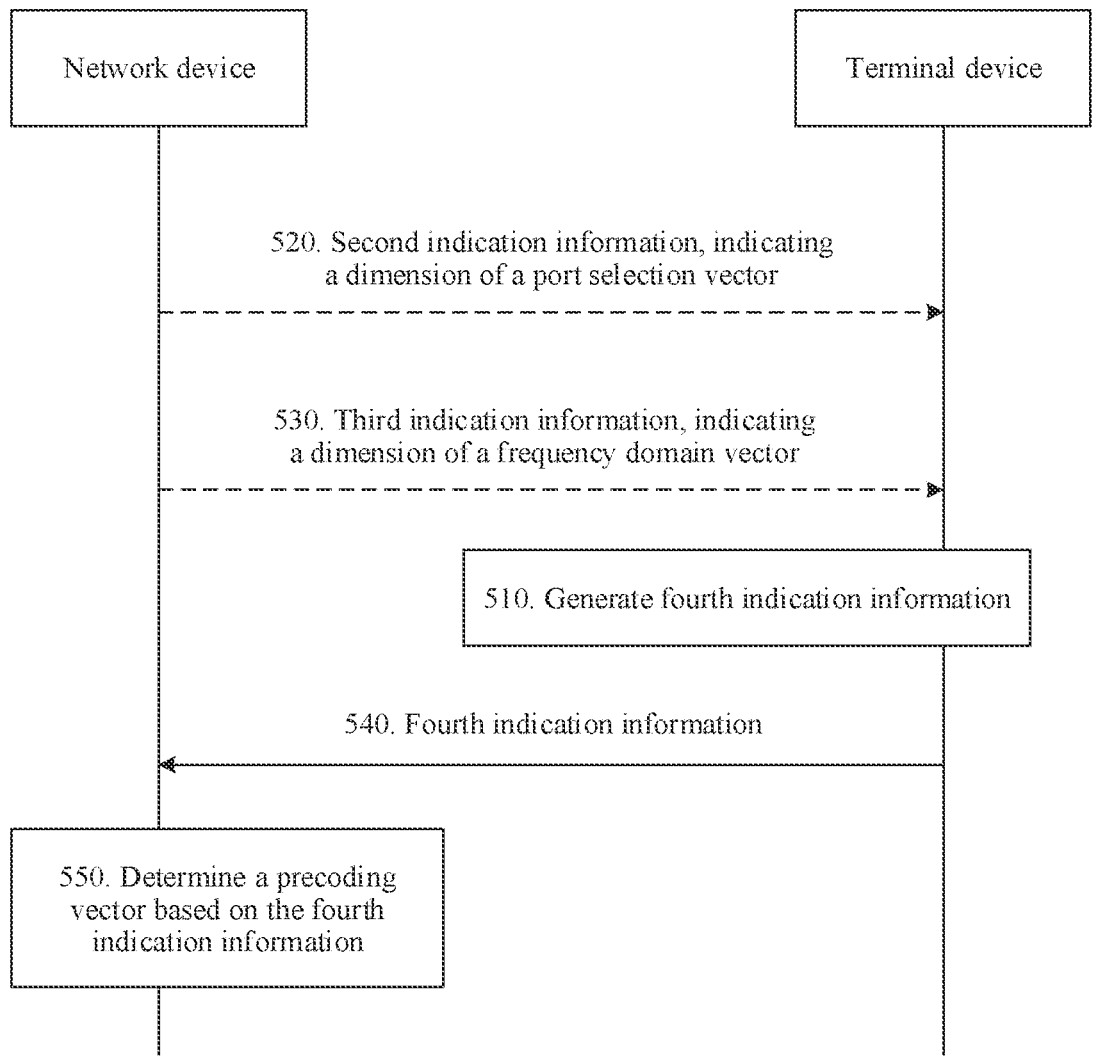
FIG. 5 is a schematic flowchart of a precoding vector indication and determining method according to still another embodiment of this application.

FIG. 5 is a schematic flowchart of a precoding vector indication and determining method shown from a perspective of device interaction according to still another embodiment of this application. As shown in the figure, the method 500 may include S510 to S550. The following describes the steps in the method 500 in detail.

It should be noted that, in the embodiments shown below, for ease of understanding, an example in which a quantity of transport layers is 1 is used to describe the precoding vector indication and determining method. It should be understood that when the quantity of transport layers is greater than 1, the precoding vector indication and determining method provided in this application is also applicable.

In S510, a terminal device generates fourth indication information, where the fourth indication information may be used to indicate one or more space-frequency vectors and a linear combination coefficient of each space-frequency vector.

Specifically, the terminal device may determine an ideal precoding vector of each subband based on an equivalent channel matrix of each subband. The specific process of determining the ideal precoding vector of each subband by the terminal device is described in detail above. For brevity, details are not described herein again.

In this embodiment of this application, a variation pattern of a channel environment of each subband is represented by using a variation of a latency domain, and a variation characteristic of latency may further be represented through linear combination of different frequency domain vectors. Therefore, the terminal device may represent the ideal precoding vector of each subband by using a frequency domain vector and a port selection vector. Different from the method 300, in this embodiment, the port selection vector and the frequency domain vector are comprehensively considered, and the ideal precoding vector of each subband is simulated through linear combination of space-frequency vectors.

A space-frequency vector may be obtained by combining a port selection vector and a frequency domain vector. For example, if the port selection vector is a column vector and the frequency domain vector is a column vector, one space-frequency vector may be a Kronecker product of one port selection vector and one frequency domain vector. If the space-frequency vector is denoted as b, the port selection vector is denoted as e, and the frequency domain vector is denoted as u, $b = e \otimes u$. If the port selection vector is a column vector and the frequency domain vector is a row vector, one space-frequency vector may be a Kronecker product of one port selection vector and one frequency domain vector. If the space-frequency vector is denoted as b, the port selection vector is denoted as e, and the frequency domain vector is denoted as u, $b = e \otimes u^T$.

In this embodiment, for ease of description, assuming that both the port selection vector and the frequency domain vector are column vectors, the space-frequency vector is a Kronecker product of the port selection vector and the frequency domain vector. However, it should be understood that this shall not constitute any limitation on this application. Based on a same concept, a person skilled in the art may obtain, through equivalent transformation or replacement, a structure that is the same as or similar to that of the space-frequency vector in this application.

As described above, a dimension of the port selection vector may be $N_b$, and a dimension of the frequency domain vector may be $N_f$. In this case, a dimension of the space-frequency vector may be $N_b*N_f$. For example, the space-frequency vector may be a column vector whose dimension is $N_b*N_f$. Therefore, the terminal device may predetermine a length of the port selection vector and a length of the frequency domain vector. The length of the port selection vector may be indicated by a network device, or may be predefined, for example, defined in a protocol. This is not limited in this application. If the length of the port selection vector is indicated by the network device, optionally, the method 500 further includes the following step. S520. The terminal device receives second indication information, where the second indication information is used to indicate the dimension of the port selection vector. Correspondingly, the network device sends the second indication information. Optionally, the third indication information is carried in an RRC message.

The length of the frequency domain vector may be indicated by the network device, or may be predefined, for example, defined in a protocol. This is not limited in this application. If the length of the frequency domain vector is indicated by the network device, optionally, the method 500 further includes the following step: S530. The terminal device receives third indication information, where the third indication information is used to indicate the dimension of the frequency domain vector. Correspondingly, the network device sends the third indication information.

Optionally, the third indication information is carried in an RRC message.

The following describes in detail a specific process in which the terminal device determines the space-frequency vector and the linear combination coefficient.

Step (i): The terminal device determines the space-frequency vector based on ideal precoding vectors of all subbands.

The terminal device may determine L space frequency vectors based on a predefined space-frequency vector set.

The terminal device may sequentially arrange ideal precoding vectors of all subbands from a subband 0 to a subband $N_f-1$ from top to bottom, to obtain a vector whose length is $N_b*N_f$. For ease of description, the vector whose length is $N_b*N_f$ is denoted as a first vector below. The terminal device may project the first vector onto each vector in the space-frequency vector set, and determine the L space-frequency vectors based on projection values.

In a possible design, the space-frequency vector set may include $N_b*N_f$ vectors, each of which has a length of $N_b*N_f$, and the vectors may be pairwise orthogonal. In this case, $N_b*N_f$ values may be obtained by projecting the first vector to each vector in the space-frequency vector set. The terminal device may select L values with larger moduli (for example, denoted as L larger values) from the $N_b*N_f$ values, and use vectors used to generate the L larger values as the L space-frequency vectors.

In another possible design, the space frequency vector set may include $N_b*N_f*O_f$ vectors, each of which has a length of $N_b*N_f$. The $N_b*N_f*O_f$ vectors may be divided into $O_f$ subsets, each subset may include $N_b*N_f$ vectors, and the $N_b*N_f$ vectors in each subset may be pairwise orthogonal. The first vector may be sequentially projected to each vector in the $O_f$ subsets to obtain $O_f$ groups of values, and each group includes $N_b*N_f$ values. The terminal device may select, from each group of the $O_f$ groups of values, L values with larger moduli, and then select one group of values from $O_f$ groups of L values with larger moduli. For example, a sum of modulus lengths of L values (for example, denoted as L larger values) in the selected group of values may be greater than a sum of modulus lengths of L values in any group of values in the remaining $O_f-1$ groups. L vectors used to generate the L larger values may be used as the L space-frequency vectors.

Step (ii): The terminal device determines a linear combination coefficient.

The foregoing L larger values are L linear combination coefficients corresponding to the L space-frequency vectors. 1 to L are traversed for a value of l, so that linear combination coefficients in a one-to-one correspondence with the L space-frequency vectors can be obtained. A linear combination coefficient of a space-frequency vector l in the L space-frequency vectors is determined by an inner product of the first vector and the space-frequency vector l.

Each linear combination coefficient may include an amplitude coefficient and a phase coefficient. For example, if the amplitude coefficient is denoted as a, $0 \leq a \leq 1$, if the phase coefficient is denoted as $\varphi$, $$\varphi \in \{e^{j\frac{2\pi x}{N_{PSK}}}, x = 0 \sim N_{PSK} - 1\}.$$

$N_{PSK}$ may be configured by the network device by using higher layer signaling, for example, an RRC message. A value of $N_{PSK}$ may be related to a quantity of quantization bits of a phase, and is used to represent a quantity of quantizable1 phases.

Step (iii): The terminal device generates fourth indication information.

Based on the L space-frequency vectors determined in step (i), the terminal device determines information used to indicate the L space-frequency vectors, and the information may be used to indicate positions of the L space-frequency vectors in the space-frequency vector set.

As described above, the space-frequency vector set may include a plurality of pairwise orthogonal space-frequency vectors. When indicating the L space-frequency vectors, the fourth indication information may be specifically used to indicate an index of a combination of the L space-frequency vectors. The combination of the L space-frequency vectors may be one of a plurality of combinations, or may be close to one of a plurality of combinations. The terminal device may indicate the L space-frequency vectors by using the index of the combination.

Alternatively, the space-frequency vector set may include a plurality of subsets, and space-frequency vectors in each subset are pairwise orthogonal. The L space-frequency vectors may be obtained from one of the plurality of subsets, for example, a second subset. In this case, when indicating the L space-frequency vectors, the fourth indication information may be specifically used to indicate the second subset and indexes of the L space-frequency vectors in the second subset. The indexes of the L space-frequency domain vectors in the second subset may be, for example, the index of the combination of the L space-frequency domain vectors or the indexes of the L space-frequency domain vectors. This is not limited in this application.

It should be understood that indicating the L space-frequency vectors by indicating the index of the combination of the L space-frequency vectors is merely a possible implementation, and should not constitute any limitation on this application. For example, when indicating the L space-frequency vectors, the fourth indication information may alternatively be used to indicate the indexes of the L space-frequency vectors in the space-frequency vector set. A specific manner for indicating the L space-frequency vectors is not limited in this application.

Based on the L linear combination coefficients determined in step (ii), the terminal device may indicate the L linear combination coefficients in a normalized manner.

In an implementation, the terminal device may determine a coefficient with a largest amplitude (for example, denoted as a largest coefficient) from the L coefficients, and indicates a sequence number of the largest coefficient in the L coefficients. Then, the terminal device may further indicate a relative value of another coefficient in the L coefficients relative to the largest coefficient.

A one-to-one correspondence between a plurality of relative values and a plurality of indexes may be predefined in a codebook. The terminal device may feed back, to the network device based on the one-to-one correspondence, an index corresponding to a relative value of each coefficient or an index of a value close to a relative value of each coefficient. Therefore, the coefficients indicated by the terminal device may be the same as or close to the coefficients determined in step (ii), and therefore become quantized values of the coefficients.

It should be understood that indicating the L linear combination coefficients in a normalized manner is merely a possible implementation, and should not constitute any limitation on this application. For example, the terminal device may directly indicate indexes of quantized values of the L linear combination coefficients, or may indicate the L linear combination coefficients in a differential manner. A specific method for indicating the L linear combination coefficients by the terminal device is not limited in this application.

Based on the methods listed above, the terminal device may generate the fourth indication information.

In S540, the terminal device sends the fourth indication information. Correspondingly, the network device receives the fourth indication information.

Optionally, the fourth indication information may be a PMI or an information element in a PMI. This is not limited in this application.

Optionally, the fourth indication information is transmitted on a PUCCH.

A specific method for sending the fourth indication information by the terminal device to the network device may be the same as that in an existing technology. For brevity, a detailed description of a specific process thereof is omitted herein.

In S550, the network device determines a precoding vector of each subband based on the fourth indication information.

The network device may determine the L space-frequency vectors from the space-frequency vector set based on the fourth indication information, and may further determine quantized values of the L linear combination coefficients based on the predefined one-to-one correspondence between a plurality of relative values and a plurality of indexes. The network device performs linear combination on the L space-frequency vectors based on the L space-frequency vectors and the quantized values of the L linear combination coefficients, to obtain a vector whose length is $N_b*N_f$. The vector may include precoding vectors of $N_f$ subbands. For ease of description, the vector whose length is $N_b*N_f$ is denoted as a second vector, and the second vector may be a vector obtained by splicing the precoding vectors of the $N_f$ subbands. Specifically, elements in a row $(n_f-1)*N_b$ to a row $n_f*N_b-1$ in the second vector are extracted, and are arranged from top to bottom. A column vector obtained after normalization processing is a precoding vector of an $n_f^{th}$ subband. The network device may traverse 0 to $N_f-1$ for a value of $n_f$. The foregoing operations are repeated to obtain $N_f$ precoding vectors corresponding to the $N_f$ subbands.

In the normalization processing, $N_b$ elements in each column vector may be multiplied by a normalization coefficient, so that a sum of powers of all elements in the column is equal to 1. The normalization coefficient may be, for example, a reciprocal of a square root of a sum of modulus lengths of the $N_b$ elements in this column. A specific normalization processing method is not limited in this application.

Further, if a length $N_f$ of the frequency domain vector is determined based on a quantity of subbands included in pilot transmission bandwidth or is determined based on a signaling length of a reporting band, a quantity $N_{sb}$ of to-be-reported subbands may be less than $N_f$. The $N_{sb\neg}$ subbands may be a subset of $N_f$ subbands. The network device may determine, based on positions of the $N_{sb\neg}$ subbands in the $N_f$ subbands, precoding vectors corresponding to the $N_{sb\neg}$ subbands. The specific process of determining the precoding vectors corresponding to the $N_{sb\neg}$ subbands has been described in detail in S360 in the foregoing method 300. For brevity, details are not described herein again.

It should be understood that the method for determining the L space-frequency vectors and the L linear combination coefficients by the terminal device and the method for determining the precoding vector by the network device that are listed above are merely possible implementations, and should not constitute any limitation on this application. In addition, the space-frequency vector may be a Kronecker product of a port selection vector and a frequency domain vector, or may be another equivalent form, for example, a product of a port selection vector and a transposed vector of a frequency domain vector. Based on a same concept, a person skilled in the art may feed back a precoding vector through mathematical transformation or equivalent replacement.

It should be noted that the foregoing listed methods for determining the fourth indication information by the terminal device are merely examples, and should not constitute any limitation on this application. Alternatively, the terminal device may select the port selection vector and the frequency domain vector based on the port selection vectors and the frequency domain vectors in the embodiments 300 and 400 described above, and indicate the port selection vector, the frequency domain vector, and the linear combination coefficient to the network device, so that the network device determines the precoding vector based on the indicated port selection vector, the indicated frequency domain vector, and a quantized value of the indicated linear combination coefficient. In other words, the terminal device may alternatively determine and send the fourth indication information based on a port selection vector set and a frequency domain vector set, and the network device may alternatively determine the precoding vector based on the port selection vector set, the frequency domain vector set, and the fourth indication information. In other words, the method embodiments 300 and 400 described above may be understood as specific implementation forms of feeding back the precoding vector by the terminal device. The first indication information described above may be an example of the fourth indication information.

Based on the foregoing method, the terminal device may feed back a precoding vector of each subband to the network device by using the space-frequency vector and the linear combination coefficient of the space-frequency vector. The network device may restore the precoding vector of each subband in a corresponding manner. In this embodiment of this application, the port selection vector and the frequency domain vector are combined to describe a variation pattern of a channel in space domain and frequency domain. Because the frequency domain vector is effectively used and a relationship between subbands is fully explored, variation patterns of all subbands are described by using a relatively small quantity of frequency domain vectors and continuity of the frequency domain, thereby reducing feedback overheads. Compared with an existing technology, a subband combination coefficient does not need to be independently reported based on each subband, and when a quantity of subbands increases, feedback overheads do not multiply. Therefore, feedback overheads can be greatly reduced, and approximate precision of a Type II codebook can also be ensured.

Because the frequency domain vector is used, subband feedback overheads of the terminal device are reduced. Therefore, the foregoing feedback mode of indicating a precoding vector may also be referred to as a subband joint feedback mode.

It should be noted that only for ease of understanding, a specific process of indicating and determining a precoding vector is described in detail above by using one transport layer as an example. However, in an actual transmission process, a quantity of transport layers is usually not limited to one. In addition, transmit antennas may alternatively be configured with a plurality of polarization directions, such as a horizontal polarization direction and a vertical polarization direction. When there are a plurality of transport layers and a plurality of polarization directions, the terminal device may still indicate the precoding matrix according to the foregoing method, and the network device may also determine the precoding matrix according to the foregoing method.

Figure 6:
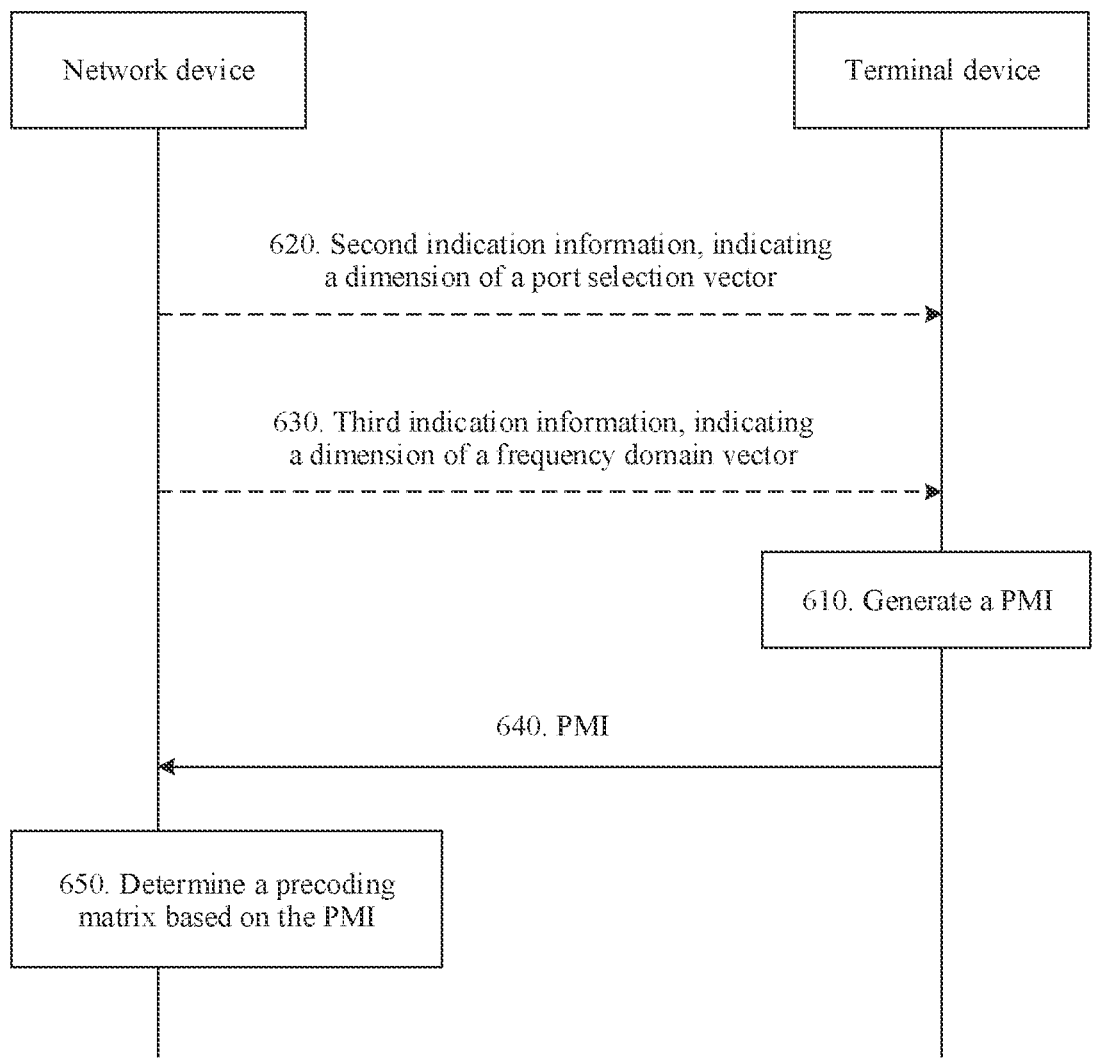
FIG. 6 is a schematic flowchart of a precoding matrix indication and determining method according to yet another embodiment of this application.

With reference to FIG. 6, the following describes in detail a process in which the terminal device indicates the precoding matrix and a process in which the network device determines the precoding matrix when a quantity R of transport layers is greater than 1 and a quantity P of polarization directions is greater than 1. FIG. 6 shows a precoding matrix indication and determining method 600 according to another embodiment of this application from a perspective of device interaction. The method 600 may include S610 to S650. The following describes the steps in the method 600 in detail.

In S610, a terminal device generates a PMI.

First, the terminal device may determine an ideal precoding matrix of each subband based on an equivalent channel matrix of each subband. The foregoing has described in detail the specific process in which the terminal device determines the ideal precoding matrix of each subband based on the precoded reference signal sent by the network device. For brevity, details are not described herein again.

As described above, the ideal precoding matrix of each subband determined by the terminal device may be fed back by using a space-frequency vector and a linear combination coefficient of the space-frequency vector. One space-frequency vector may be a Kronecker product of one port selection vector and one frequency domain vector. A dimension of the port selection vector and a dimension of the frequency domain vector may be separately indicated by the network device, or may be predefined, for example, defined in a protocol.

When the dimension of the port selection vector is indicated by the network device, optionally, the method further includes the following step. S620. The terminal device receives second indication information, where the second indication information is used to indicate the length of the port selection vector. Correspondingly, the network device sends the second indication information. In this embodiment, the dimension of the port selection vector may be determined by a quantity of ports of a reference signal in one polarization direction.

Optionally, the second indication information is carried in an RRC message.

When the dimension of the frequency domain vector is indicated by the network device, optionally, the method further includes the following step: S630. The terminal device receives third indication information, where the third indication information is used to indicate the dimension of the frequency domain vector. Correspondingly, the network device sends the third indication information.

Optionally, the third indication information is carried in an RRC message.

In this embodiment, when a quantity of transport layers is R, the terminal device may determine R pieces of indication information corresponding to the R transport layers, and each piece of indication information may correspond to one transport layer. At a transport layer, when a quantity of polarization directions is P, one group of indication information corresponding to the transport layer may be specifically used to indicate P groups of space-frequency vectors and P groups of linear combination coefficients that respectively correspond to the P polarization directions. Each group of space-frequency vectors may include L space-frequency vectors, and each group of linear combination coefficients may include L*K linear combination coefficients. It should be understood that the indication information may be considered as an example of the fourth indication information in the foregoing embodiment 500.

In the P groups of space-frequency vectors, any two groups of space-frequency vectors may be the same, or at least two groups of space-frequency vectors may be different.

When any two groups of space-frequency vectors are the same, only one group of space-frequency vectors may be fed back for the P polarization directions. In this case, the terminal device may determine the L space-frequency vectors based on ideal precoding vectors of all subbands in one polarization direction, or may determine the L space-frequency vectors based on ideal precoding vectors of all subbands in the P polarization directions.

That at least two groups of space-frequency vectors are different may specifically include: The at least two groups of space-frequency vectors are partially different or the at least two groups of space-frequency vectors are completely different. In other words, the at least two groups of space-frequency vectors are at least partially different. When the at least two groups of space-frequency vectors are different, the P groups of space-frequency vectors in the P polarization directions may be separately fed back. In this case, the terminal device may determine, based on the ideal precoding vectors of all the subbands in each polarization direction, the L space-frequency vectors that correspond to the polarization direction. In other words, the terminal device may determine P*L space-frequency vectors.

Therefore, when the quantity of transport layers is 1 and the quantity of polarization directions is P, if space-frequency vectors in any two polarization directions are the same, the PM may include information used to indicate the L space-frequency vectors and information used to indicate the P*L linear combination coefficients. In other words, space-frequency vectors in all polarization directions may not be repeatedly indicated based on each polarization direction, but linear combination coefficients in all polarization directions may be separately indicated based on each polarization direction.

When the quantity of transport layers is 1 and the quantity of polarization directions is P, if space-frequency vectors in at least two polarization directions are different, the PMI may include information used to indicate P*L space-frequency vectors and information used to indicate the P*L linear combination coefficients. In other words, space-frequency vectors in all polarization directions may be separately indicated based on each polarization direction, and linear combination coefficients in all polarization directions may also be separately indicated based on each polarization direction.

Further, if the quantity of transport layers is greater than 1, for example, the quantity of transport layers is R, the PMI may be used to indicate R groups of space-frequency vectors and R groups of linear combination coefficients that respectively correspond to the R transport layers. In the R groups of space-frequency vectors, any two groups of space-frequency vectors may be the same, or at least two groups of space-frequency vectors may be different.

When any two groups of space-frequency vectors are the same, only one group of space-frequency vectors may be fed back for the R transport layers. In this case, the terminal device may determine a group of space-frequency vectors based on ideal precoding vectors of all subbands at a transport layer, or may determine a group of space-frequency vectors based on ideal precoding vectors of all subbands at the R transport layers.

That at least two groups of space-frequency vectors are different may specifically include: The at least two groups of space-frequency vectors are partially different or the at least two groups of space-frequency vectors are completely different. In other words, the at least two groups of space-frequency vectors are at least partially different. When the at least two groups of space-frequency vectors are different, the R groups of space-frequency vectors of the R transport layers may be separately fed back. In this case, the terminal device may determine, based on ideal precoding vectors of all subbands at each transport layer, a group of space-frequency vectors corresponding to the transport layer.

Therefore, when the quantity of transport layers is R and the quantity of polarization directions is 1, if space-frequency vectors at any two transport layers are the same, the PMI may include information used to indicate the L space-frequency vectors and information used to indicate R*L linear combination coefficients. In other words, space-frequency vectors at all transport layers may not be repeatedly indicated based on each transport layer, and linear combination coefficients at all transport layers may be separately indicated based on each transport layer. In other words, the information that is described above and that is used to indicate the L space-frequency vectors in the fourth indication information may not be repeatedly indicated based on each transport layer, that is, may not be repeatedly indicated in fourth indication information corresponding to each transport layer.

When the quantity of transport layers is R and the quantity of polarization directions is 1, if space-frequency vectors at least two transport layers are different, the PMI may include information used to indicate R*L space-frequency vectors and information used to indicate R*L linear combination coefficients. In other words, space-frequency vectors at all transport layers may be separately indicated based on each transport layer, space-frequency vectors at all transport layers may also be separately indicated based on each transport layer, and linear combination coefficients at all transport layers may also be separately indicated based on each transport layer. In other words, the information that is described above and that is used to indicate the L space-frequency vectors in the fourth indication information may be separately indicated, based on each transport layer, in fourth indication information corresponding to each transport layer.

In conclusion, when the quantity of transport layers is R and the quantity of polarization directions is P, if space-frequency vectors at any two transport layers are the same and space-frequency vectors in any two polarization directions are the same, the PMI may include information used to indicate the L space-frequency vectors and information used to indicate R*P*L linear combination coefficients. In other words, polarization direction vectors in each polarization direction at each transport layer may not be repeatedly indicated based on each polarization direction at each transport layer, and linear combination coefficients in each polarization direction at each transport layer may be separately indicated based on each polarization direction at each transport layer. In other words, the information that is described above and that is used to indicate the L space-frequency vectors in the fourth indication information may not be repeatedly indicated based on each transport layer, that is, may not be repeatedly indicated in fourth indication information corresponding to each transport layer.

When the quantity of transport layers is R and the quantity of polarization directions is P, if space-frequency vectors at any two transport layers are the same and space-frequency vectors in at least two polarization directions are different, the PMI may include information used to indicate P*L space-frequency vectors and information used to indicate R*P*L linear combination coefficients. In other words, space-frequency vectors at each transport layer may not be repeatedly indicated based on each transport layer, but space-frequency vectors in each polarization direction may be separately indicated based on each polarization direction; and linear combination coefficients in each polarization direction at each transport layer may be separately indicated based on each polarization direction at each transport layer. In other words, the information that is described above and that is used to indicate the L space-frequency vectors in the fourth indication information may not be repeatedly indicated based on each transport layer, that is, may not be repeatedly indicated in fourth indication information corresponding to each transport layer.

When the quantity of transport layers is R and the quantity of polarization directions is P, if space-frequency vectors at least two transport layers are different and space-frequency vectors in at least two polarization directions are different, the PMI may include information used to indicate R*P*L space-frequency vectors and information used to indicate R*P*L linear combination coefficients. In other words, space-frequency vectors in each polarization direction at each transport layer may be separately indicated based on each polarization direction at each transport layer, and linear combination coefficients in each polarization direction at each transport layer may be separately indicated based on each polarization direction at each transport layer. In other words, the information that is described above and that is used to indicate the L space-frequency vectors in the fourth indication information may be separately indicated, based on each transport layer, in fourth indication information corresponding to each transport layer.

Without loss of generality, by using an example in which the quantity P of polarization directions is 2, the following describes in detail a specific process in which the terminal device determines a space-frequency vector and a linear combination coefficient at a transport layer.

When the quantity of polarization directions is 2, the two polarization directions may share a same space-frequency vector. In this case, the space-frequency vector may be indicated to the transport layer only once. Alternatively, different space-frequency vectors may be used in the two polarization directions. In this case, a space-frequency vector may be indicated separately for two polarization directions at a same transport layer.

With reference to the foregoing two cases, the following separately describes a specific process in which the terminal device determines a space-frequency vector at a transport layer.

Case 1: Two polarization directions share one or more same space-frequency vectors.

In an implementation, the terminal device may randomly select one polarization direction from the two polarization directions, for example, a polarization direction 0. The terminal device may determine the space-frequency vector based on components of ideal precoding vectors of all subbands in the polarization direction 0.

Specifically, the terminal device may sequentially arrange components of the ideal precoding vectors of all the subbands in the polarization direction 0 from a subband 0 to a subband $N_f-1$ from top to bottom, to obtain a vector whose length is $N_b*N_f$. For ease of description, the vector whose length is $N_b*N_f$ is denoted as a third vector below. The terminal device may project the third vector onto each vector in the space-frequency vector set, and determine the L space-frequency vectors based on projection values.

A specific process in which the terminal device determines the space-frequency vector based on the components of the ideal precoding vectors of all the subbands in the polarization direction 0 may be similar to the specific process in which the terminal device determines the space-frequency vector based on the ideal precoding vectors of all the subbands in step (i) in S510 in the foregoing method 500. For brevity, details are not described herein again.

In another implementation, the terminal device may determine the space-frequency vector based on components of ideal precoding vectors of all subbands in each of the two polarization directions.

Specifically, the terminal device may sequentially arrange the components of the ideal precoding vectors of all the subbands in the polarization direction 0 from a subband 1 to a subband $N_f$ from top to bottom, to obtain a vector including the components of the ideal precoding vectors of all the subbands in the polarization direction 0. A length of the vector may be $N_b*N_f$, and the vector is, for example, denoted as $Z_0$. The terminal device sequentially arranges the components of the ideal precoding vectors of all the subbands in the polarization direction 1 from a subband 0 to a subband $N_f-1$ from top to bottom, to obtain a vector including the components of the ideal precoding vectors of all the subbands in the polarization direction 1. A length of the vector may be $N_b*N_f$, and the vector is, for example, denoted as $Z_1$.

It is assumed that the space-frequency vector set includes $N_b*N_f$ vectors. The terminal device may project the vector $Z_0$ onto each vector in the space-frequency vector set, to obtain $N_b*N_f$ values, for example, denoted as projection values in a first polarization direction. An order of the projection values in the first polarization direction corresponds to an order of the $N_b*N_f$ vectors in the space-frequency vector set. The terminal device may also project the vector $Z_1$ onto each vector in the space-frequency vector set, to obtain $N_b*N_f$ values, for example, denoted as projection values in a second polarization direction. An order of the projection values in the second polarization direction corresponds to the order of the $N_b*N_f$ vectors in the space-frequency vector set. The terminal device may calculate a sum of a modulus length of a projection value of the first polarization direction and a modulus length of a projection value of the second polarization direction, to determine L values with a larger modulus length sum, where the two projection values correspond to a same sequence number. Vectors of projection values used to generate the L values with the larger modulus length sum may be used as L space-frequency vectors. Sequence numbers of the projection values used to generate the L values in the projection values in the first polarization direction or sequence numbers of the projection values used to generate the L values in the projection values in the second polarization direction are sequence numbers of columns in which the L space-frequency vectors are located in the space-frequency vector set.

If there are $O_f*N_f$ port selection vectors, the terminal device may still determine the L space-frequency vectors in the foregoing manner. A specific implementation process thereof is similar to that described above. For brevity, details are not described herein again.

Optionally, when L space-frequency vectors in any two of the P polarization directions are the same, or in other words, when L space-frequency vectors in a first polarization direction are the same as L space-frequency vectors in a second polarization direction, the L space-frequency vectors are obtained from a subset of the space-frequency vector set. When used to indicate the L space-frequency vectors, the PMI may be specifically used to indicate the subset and indexes of the L space-frequency vectors in the subset.

Case 2: Space-frequency vectors in two polarization directions are independent of each other.

When the space-frequency vectors in the two polarization directions are independent of each other, the terminal device may determine a space-frequency vector in each polarization direction based on components of ideal precoding vectors of all subbands in each polarization direction. A specific process thereof is the same as the specific process of the first implementation in Case 1. For brevity, details are not described herein again.

It may be understood that when the space frequency vectors in the two polarization directions are independent of each other, space-frequency vectors corresponding to each polarization direction may be obtained from a same subset or different subsets in the space-frequency vector set.

Optionally, when L space-frequency vectors in any two of the P polarization directions are the same, or in other words, when L space-frequency vectors in a first polarization direction are different from L space-frequency vectors in a second polarization direction, the PMI may be used to indicate P*L space-frequency vectors. L space-frequency vectors in each polarization direction may be obtained from a subset in the L space-frequency vector set. When used to indicate the space-frequency vectors, the PMI may be specifically used to indicate P subsets corresponding to the P polarization directions and indexes of the L space-frequency vectors in each polarization direction in a corresponding subset.

It should be understood that the foregoing listed specific methods for determining the space-frequency vector by the terminal device are merely examples, and should not constitute any limitation on this application. A specific manner for determining the space-frequency vector by the terminal device is not limited in this application.

The foregoing uses two polarization directions as an example to describe in detail the specific process of determining the space-frequency vector. When the quantity of transport layers is greater than 1, the terminal device may also determine the space-frequency vector according to a method similar to the foregoing method. For brevity, details are not described herein.

After determining the space-frequency vector, the terminal device may further determine the linear combination coefficient. A specific quantity of the linear combination coefficients is described in detail above with reference to different cases. The terminal device may determine, with reference to different cases, a linear combination coefficient corresponding to the space-frequency vector. The specific process of determining the linear combination coefficient based on the L space-frequency vectors has been described in detail in step (ii) in S510 of the method 500. However, in this embodiment, if a quantity of groups of space-frequency vectors is greater than 1, the terminal device may separately determine corresponding linear combination coefficients based on different groups of space-frequency vectors. A specific determining process thereof may be the same as that described above. For brevity, details are not described herein again.

The terminal device may generate a PMI based on the space-frequency vector and the linear combination coefficient. It may be understood that the PMI may include the fourth indication information. Specifically, when the quantity of transport layers is 1 and the quantity of polarization directions is 1, the PMI may be the fourth indication information. When the quantity of transport layers is greater than 1 or the quantity of polarization directions is greater than 1, the fourth indication information may be some information in the PMI.

In S640, the terminal device sends the PMI Correspondingly, the network device receives the PMI.

A specific process of sending the PMI by the terminal device to the network device may be the same as that in an existing technology. For brevity, a detailed description of the specific process thereof is omitted herein.

In S650, the network device determines a precoding matrix of each subband based on the PMI.

The network device may determine, based on the received PMI, the space-frequency vector and a quantized value of the linear combination coefficient in each polarization direction at each transport layer. The specific process thereof has been described in detail in S540. For brevity, details are not described herein again.

The network device may determine, based on the following formula, a vector corresponding to each transport layer:

$$W = \begin{bmatrix} \sum_{l=0}^{L} a_l \varphi_l b_l \\ \sum_{l=0}^{L-1} a_{l+L} \varphi_{l+L} b_l \end{bmatrix},$$

where $b_l$ represents a space-frequency vector l, l may range from 0 to L−1, $a_l$ represents a quantized value of an amplitude coefficient of a space-frequency vector l in the first polarization direction, and $0 \leq a_l \leq 1$; $\varphi_l$ represents a quantized value of a phase coefficient of the l in the first polarization direction, and $$\varphi_l \in \{e^{j\frac{2\pi x}{N_{PSK}}}, x = 0 \sim N_{PSK} - 1\}; a_{l+L}$$

represents a quantized value of an amplitude coefficient of a space-frequency vector l in the second polarization direction, and $0 \leq a_{l+L} \leq 1$; and $\varphi_{l+L}$ represents a quantized value of a phase coefficient of the l in the second polarization direction, and $$\varphi_{l+L} \in \{e^{j\frac{2\pi x}{N_{PSK}}}, x = 0 \sim N_{PSK} - 1\}.$$

The vector represented by the foregoing formula may be obtained by splicing a precoding vector in the first polarization direction at a transport layer and a precoding vector in the second polarization direction at the transport layer, and a length of the vector may be $2N_b*N_f$. The first $N_b*N_f$ rows may be obtained by splicing precoding vectors of all subbands in the first polarization direction from a subband 1 to a subband $N_f$ from top to bottom. The last $N_b*N_f$ rows may be obtained by splicing precoding vectors of all subbands in the second polarization direction from a subband 1 to a subband $N_f$ from top to bottom.

The network device may extract elements in a row $(n_f-1)*N_b$ to a row $n_f*N_b-1$ in the vector, and arrange the elements from top to bottom. An obtained vector corresponds to a component, for example, denoted as a first component, of a precoding vector of a subband $n_f$ in the first polarization direction. The network device extracts elements in a row $(N_f+n_f-1)*N_b$ to a row $(N_f+n_f)*N_b-1$ in the vector, and arranges the elements from top to bottom. An obtained vector corresponds to a component, for example, denoted as a second component, of a precoding vector of the subband $n_f$ in the second polarization direction. The network device may splice the first component and the second component to obtain a vector whose dimension is $2N_b$. For example, the network device arranges the first component and the second component from top to bottom to obtain a column vector whose dimension is $2N_b$. The network device may further perform normalization processing on the vector, to obtain a precoding vector corresponding to the subband $n_f$.

The network device may traverse 0 to $N_f-1$ for a value of n. The foregoing operations are repeated to obtain $N_f$ precoding vectors corresponding to the $N_f$ subbands.

In the normalization processing, for example, $N_b$ elements in each column may be multiplied by a normalization coefficient, so that a sum of powers of all elements in the column is equal to 1. The normalization coefficient may be, for example, a reciprocal of a square root of a sum of modulus lengths of the $N_b$ elements in this column. A specific normalization processing method is not limited in this application.

The network device may determine, based on the foregoing formula, R vectors corresponding to R transport layers. A length of each vector may be $2N_b*N_f$. The network device may determine, based on the R vectors, $N_f$ precoding vectors that are at each of the R transport layers and that correspond to the $N_f$ sub-bands.

The network device may traverse 0 to $N_f-1$ for a value of $n_f$, and repeatedly perform the following operations to obtain $N_f$ precoding matrices corresponding to the $N_f$ subbands: extracting a precoding vector corresponding to the subband $n_f$ at each transport layer, and sequentially arranging precoding vectors corresponding to transport layers 1 to R from left to right, to obtain a precoding matrix corresponding to the subband $n_f$, where a dimension of the precoding matrix may be $2N_b*R$.

Further, if a length $N_f$ of the frequency domain vector is determined based on a quantity of subbands included in pilot transmission bandwidth or is determined based on a signaling length of a reporting band, a quantity $N_{sb}$ of to-be-reported subbands may be less than $N_f$. The $N_{sb¬}$ subbands may be a subset of $N_f$ subbands. The network device may determine, based on positions of the $N_{sb¬}$ subbands in the $N_f$ subbands, precoding vectors corresponding to the $N_{sb¬}$ subbands. The specific process of determining the precoding vectors corresponding to the $N_{sb¬}$ subbands has been described in detail in S360 in the foregoing method 300. For brevity, details are not described herein again.

It should be understood that the method for determining the L space-frequency vectors and the L linear combination coefficients by the terminal device and the method for determining the precoding matrix by the network device that are listed above are merely possible implementations, and should not constitute any limitation on this application. In addition, the space-frequency vector may be a Kronecker product of a port selection vector and a frequency domain vector, or may be another equivalent form. Based on a same concept, a person skilled in the art may feed back a precoding vector through mathematical transformation or equivalent replacement.

Based on the foregoing method, the terminal device may feed back a precoding matrix of each subband to the network device by using the space-frequency vector and the linear combination coefficient of the space-frequency vector. The network device may restore the precoding matrix of each subband in a corresponding manner. In this embodiment of this application, the port selection vector and the frequency domain vector are combined to describe a variation pattern of a channel in space domain and frequency domain. Because the frequency domain vector is effectively used and a relationship between subbands is fully explored, variation patterns of all subbands are described by using a relatively small quantity of frequency domain vectors and continuity of the frequency domain, thereby reducing feedback overheads. Compared with an existing technology, a subband combination coefficient does not need to be independently reported based on each subband, and when a quantity of subbands increases, feedback overheads do not multiply. Therefore, feedback overheads can be greatly reduced, and approximate precision of a Type II codebook can also be ensured.

Because the frequency domain vector is used, subband feedback overheads of the terminal device are reduced. Therefore, the foregoing feedback mode of indicating a precoding vector may also be referred to as a subband joint feedback mode.

The precoding vector indication and determining method (or in other words, a precoding matrix indication and determining method) provided above may coexist with another precoding vector indication and determining method, and both methods may be referred to as a PMI feedback mode. The network device may determine a feedback mode based on a to-be-reported subband. The following describes in detail a specific process in which the terminal device feeds back a PMI based on an indication of the network device.

Figure 7:
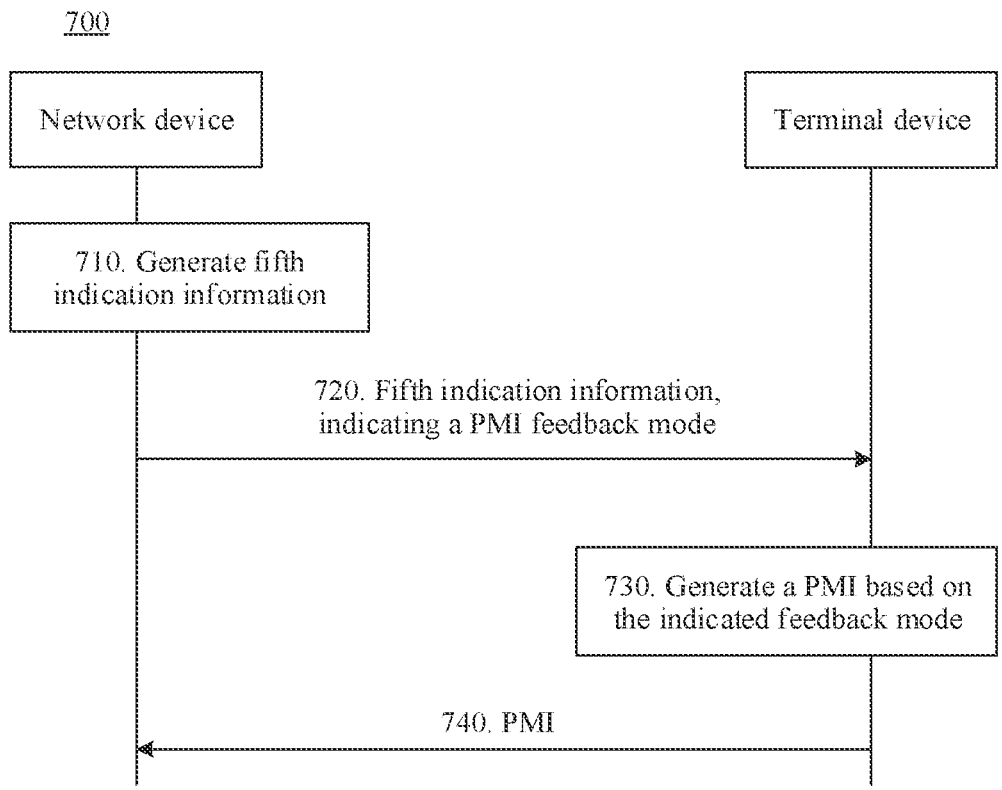
FIG. 7 is a schematic flowchart of feeding back a PMI according to still another embodiment of this application.

FIG. 7 is a schematic flowchart of a PMI feedback method 700 shown from a perspective of device interaction according to yet another embodiment of this application. As shown in the figure, the method 70) may include S710 to S740. The following describes the steps in the method 700 in detail.

In S710, a network device generates fifth indication information, where the fifth indication information is used to indicate a feedback mode for feeding back a PMI.

In this embodiment, the PMI feedback mode may be the feedback mode provided above, or may be another feedback mode. Specifically, the PMI feedback mode may be a first feedback mode or a second feedback mode. The first feedback mode may be a mode for feeding back the PMI based only on a port selection vector set, and the second feedback mode may be a mode for feeding back the PMI based on the port selection vector set and a frequency domain vector set. Alternatively, the first feedback mode may be a mode for feeding back the PMI based on a port selection vector set, and the second feedback mode is a mode for feeding back the PMI based on a space-frequency vector set.

The feedback of the PMI based only on the port selection vector set in the first feedback mode may be relative to the second feedback mode. Compared with the second feedback mode, in the first feedback mode, the PMI may be fed back based only on the port selection vector set, and no additional vector set such as the frequency domain vector set needs to be provided. In other words, a difference between the first feedback mode and the second feedback mode may be that the first feedback mode is not based on the frequency domain vector set, but the second feedback mode is based on the frequency domain vector set.

Alternatively, the first feedback mode may be a mode for feeding back the PMI based on the port selection vector set, and the second feedback mode may be a mode for feeding back the PMI based on the space-frequency vector set. Vector sets based on which the PMI is fed back in the two feedback modes may be different.

In other words, the first feedback mode may be a subband independent feedback mode, and the second feedback mode may be a subband joint feedback mode.

The port selection vector set may provide a plurality of port selection vectors, the frequency domain vector set may provide a plurality of frequency domain vectors, and the space-frequency vector set may provide a plurality of space-frequency vectors.

In a possible implementation, the first feedback mode may be, for example, a feedback mode that is defined in the NR protocol TS38.214 R15 and that is used to feed back the PMI based on a Type II port selection codebook, and specifically, may be a subband independent feedback mode. The second feedback mode may be, for example, the feedback mode described above with reference to the method 300 to the method 600. Compared with the first feedback mode, the second feedback mode may be understood as a subband joint feedback mode. As can be learned from the foregoing description, in the second feedback mode, a plurality of subbands are jointly fed back based on continuity in frequency domain by using a relationship between the subbands, to reduce frequency domain feedback overheads. Compared with the first feedback mode, the second feedback mode can greatly reduce feedback overheads especially when there are a relatively large quantity of to-be-reported subbands.

In this embodiment, the fifth indication information may explicitly indicate the feedback mode. For example, an indication bit or an indication field may be used to indicate the feedback mode. For example, when the indication bit is set to "0", it indicates that the first feedback mode is used; and when the indication bit is set to "1" it indicates that the second feedback mode is used. Alternatively, when the indication bit is set to "1", it indicates that the first feedback mode is used; and when the indication bit is set to "0", it indicates that the second feedback mode is used. This is not limited in this application.

The fifth indication information may alternatively implicitly indicate the feedback mode by using other information. For example, when the network device indicates a length of a frequency domain vector to a terminal device, it may be considered that the network device needs the terminal device to feed back the PMI based on the second feedback mode. In this case, the second indication information that is described above and that is used to indicate the length of the frequency domain vector may be understood as an example of the fifth indication information.

It should be noted that a length of a space frequency vector may be determined by a length of a frequency domain vector and a length of a port selection vector. Therefore, when the network device indicates the length of the frequency domain vector to the terminal device, the terminal device may feed back the PMI based on the port selection vector and the frequency domain vector, or may feed back the PMI based on the space-frequency vector. This is not limited in this application.

In S720, the network device sends the fifth indication information. Correspondingly, the terminal device receives the fifth indication information.

Optionally, the fifth indication information is carried in an RRC message.

A specific method for sending the fifth indication information by the network device to the terminal device may be the same as a manner for sending signaling by the network device to the terminal device in an existing technology. For brevity, a detailed description of a specific process thereof is omitted herein.

In S730, the terminal device generates the PMI based on the feedback mode indicated by the fifth indication information.

The terminal device may generate the PMI based on the feedback mode indicated by the fifth indication information. When the terminal device generates the PMI based on the first feedback mode, a specific process in which the terminal device generates the PMI may be the same as that in an existing technology. For brevity, details are not described herein. When the terminal device generates the PMI based on the second feedback mode, the specific implementation process thereof has been described in detail in the foregoing method 300 to method 600. For brevity, details are not described herein again.

In S740, the terminal device sends the PMI.

The terminal device may send the PMI to the network device, so that the network device determines a precoding matrix. The network device may be the foregoing network device sending the fifth indication information, or may be another network device. This is not limited in this application. It should be understood that the step of sending the PMI by the terminal device to the network device shown in the figure is merely an example, should not constitute any limitation on this application.

Then, the network device may determine the precoding matrix based on the PMI, and further determine a precoding matrix used for data transmission. The network device may determine the precoding matrix based on the PMI in different feedback modes. When the terminal device generates the PMI based on the first feedback mode, a specific process in which the network device determines the precoding matrix based on the PMI may be the same as that in an existing technology. For brevity, details are not described herein. When the terminal device generates the PMI based on the second feedback mode, the specific process in which the network device determines the precoding matrix based on the PMI has been described in detail in the foregoing method 300 to method 600. For brevity, details are not described herein again.

Based on the foregoing method, the terminal device may feed back the PMI in a corresponding feedback mode based on an indication of the network device. Different measurement cases may be used by introducing a plurality of feedback modes, and both feedback precision and feedback overheads can be considered, thereby achieving a balance between the two.

It should be understood that sequence numbers of the processes do not mean execution sequences in the foregoing embodiments. The execution sequences of the processes should be determined based on functions and internal logic of the processes, and should not constitute any limitation on the implementation processes of the embodiments of this application.

The methods provided in the embodiments of this application are described above in detail with reference to FIG. 3 to FIG. 7. Apparatuses provided in the embodiments of this application are described below in detail with reference to FIG. 8 to FIG. 10.

Figure 8:
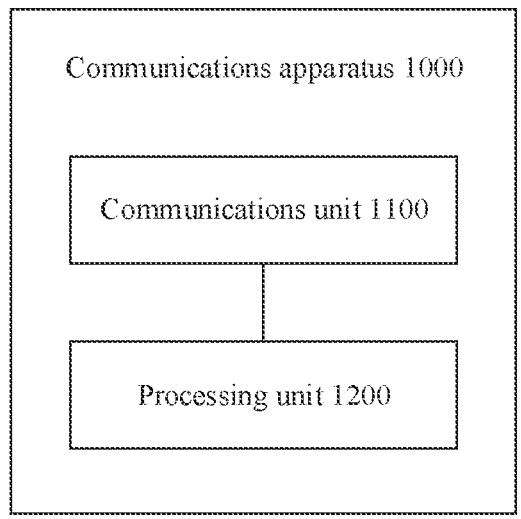
FIG. 8 is a schematic block diagram of a communications apparatus according to an embodiment of this application.

FIG. 8 is a schematic block diagram of a communications apparatus according to an embodiment of this application. As shown in the figure, the communications apparatus 1000 may include a communications unit 1100 and a processing unit 1200.

In a possible design, the communications apparatus 1000 may correspond to the terminal device in the foregoing method embodiments, for example, may be the terminal device, or a chip configured in the terminal device.

In an embodiment, the processing unit 1200 may configured to generate first indication information, where the first indication information is used to indicate one or more port selection vectors, one or more frequency domain vectors, and one or more linear combination coefficients, each linear combination coefficient is a linear combination coefficient corresponding to one port selection vector and one frequency domain vector, each port selection vector is used to indicate a port of one reference signal, the reference signal is a precoded reference signal, and each frequency domain vector is used to indicate a variation pattern of a channel in frequency domain; and the communications unit 1100 is configured to send the first indication information.

Optionally, the communications unit 1100 is further configured to receive second indication information, where the second indication information is used to indicate a length of the port selection vector.

Optionally, the communications unit 1100 is further configured to receive third indication information, where the third indication information is used to indicate a length of the frequency domain vector.

Optionally, the first indication information is specifically used to indicate L port selection vectors, K frequency domain vectors, and P*L*K linear combination coefficients, the L port selection vectors are port selection vectors in each of P polarization directions, the K frequency domain vectors are frequency domain vectors in each of the P polarization directions, each of the P*L*K linear combination coefficients corresponds to one port selection vector and one frequency domain vector in each of the P polarization directions, L≥1, K≥1, P≥1, and L, K, and P are integers.

Optionally, the L port selection vectors are obtained from a subset in a predefined port selection vector set, and the port selection vector set includes a plurality of port selection vectors; and when used to indicate the L port selection vectors, the first indication information is specifically used to indicate the subset and indexes of the L port selection vectors in the subset.

Optionally, the first indication information is specifically used to indicate P*L port selection vectors, K frequency domain vectors, and P*L*K linear combination coefficients, the P*L port selection vectors are port selection vectors in P polarization directions, a quantity of port selection vectors in each polarization direction is L, the K frequency domain vectors are frequency domain vectors in each of the P polarization directions, each of the P*L*K linear combination coefficients corresponds to one port selection vector and one frequency domain vector in each of the P polarization directions, L≥1, K≥1, P≥1, and L, K, and P are integers.

Optionally, the L port selection vectors in each of the P polarization directions are obtained from a subset in a predefined port selection vector set, and the port selection vector set includes a plurality of port selection vectors; and when used to indicate the P*L port selection vectors, the first indication information is specifically used to indicate P subsets corresponding to the P polarization directions and indexes of the L port selection vectors in each polarization direction in a corresponding subset.

Optionally, the length of the frequency domain vector is:
a quantity of subbands included in pilot transmission bandwidth configured for the terminal device, where the pilot transmission bandwidth is bandwidth configured to transmit a reference signal, and the reference signal is a reference signal used for channel measurement;
a length of signaling used to indicate a position of a to-be-reported subband and a quantity of to-be-reported subbands; or
a quantity of to-be-reported subbands.

In another embodiment, the processing unit 1200 is configured to generate fourth indication information, where the fourth indication information is used to indicate one or more space-frequency vectors and a linear combination coefficient of each space-frequency vector, where the space-frequency vector is a Kronecker product of a port selection vector and a frequency domain vector, each port selection vector is used to indicate a port of one reference signal, the reference signal is a precoded reference signal, and each frequency domain vector is used to indicate a variation pattern of a channel in frequency domain; and the communications unit 1100 is configured to send the fourth indication information.

Optionally, the communications unit 1100 is further configured to receive second indication information, where the second indication information is used to indicate a length of the port selection vector.

Optionally, the communications unit 1100 is further configured to receive third indication information, where the third indication information is used to indicate a length of the frequency domain vector.

Optionally, the fourth indication information is specifically used to indicate L space-frequency vectors and P*L linear combination coefficients, the L space-frequency vectors are space-frequency vectors in each of P polarization directions, each of the P*L linear combination coefficients corresponds to one space-frequency vector in each of the P polarization directions, L≥1, P≥1, and both L and P are integers.

Optionally, the L space-frequency vectors are obtained from a subset in a predefined space-frequency vector set, and the space-frequency vector set includes a plurality of space-frequency vectors; and when used to indicate the L space-frequency vectors, the fourth indication information is specifically used to indicate the subset and indexes of the L space-frequency vectors in the subset.

Optionally, the fourth indication information is specifically used to indicate P*L space-frequency vectors and P*L linear combination coefficients, the P*L space-frequency vectors are space-frequency vectors in P polarization directions, a quantity of space-frequency vectors in each polarization direction is L, each of the P*L linear combination coefficients corresponds to one space-frequency vector in each of the P polarization directions, L≥1, P≥1, and both L and P are integers.

Optionally, the L space-frequency vectors in each of the P polarization directions are obtained from a subset in a predefined space-frequency vector set, and the space-frequency vector set includes a plurality of space-frequency vectors; and when used to indicate the P*L space-frequency vectors, the fourth indication information is specifically used to indicate P subsets corresponding to the P polarization directions and indexes of the L space-frequency vectors in each polarization direction in a corresponding subset.

Optionally, the length of the frequency domain vector is:
a quantity of subbands included in pilot transmission bandwidth configured for the terminal device, where the pilot transmission bandwidth is bandwidth configured to transmit a reference signal, and the reference signal is a reference signal used for channel measurement;
a length of signaling used to indicate a position of a to-be-reported subband and a quantity of to-be-reported subbands; or
a quantity of to-be-reported subbands.

In still another embodiment, the communications unit 1100 is configured to receive fifth indication information, where the fifth indication information is used to indicate a feedback mode for feeding back a PMI, and the feedback mode is a first feedback mode or a second feedback mode; the first feedback mode is a mode for feeding back the PMI based on a port selection vector set, and the second feedback mode is a mode for feeding back the PMI based on a space-frequency vector set; or the first feedback mode is a mode for feeding back the PMI based only on a port selection vector set, and the second feedback mode is a mode for feeding back the PMI based on the port selection vector set and a frequency domain vector set; the space-frequency vector set includes a plurality of space-frequency vectors, the port selection vector set includes a plurality of port selection vectors, each port selection vector is used to indicate a port of one reference signal, and the reference signal is a precoded reference signal; and the frequency domain vector set includes a plurality of frequency domain vectors, each frequency domain vector is used to indicate a variation pattern of a channel in frequency domain, and each space-frequency vector is a Kronecker product of one port selection vector and one frequency domain vector; and the processing unit 1200 is configured to generate the PMI based on the feedback mode, where the communications unit 1100 is further configured to send the PMI.

Optionally, the fifth indication information is carried in an RRC message.

It should be understood that the communications apparatus 1000 may correspond to the terminal device in the method 300 to the method 700 according to the embodiments of this application. The communications apparatus 1000 may include units configured to perform the steps performed by the terminal device in the method 300 in FIG. 3, the method 400 in FIG. 4, the method 500 in FIG. 5, the method 600 in FIG. 6, or the method 700 in FIG. 7. In addition, the units in the communications apparatus 1000 and the foregoing other operations and/or functions are used to implement corresponding procedures of the method 300 in FIG. 3, the method 400 in FIG. 4, the method 500 in FIG. 5, the method 600 in FIG. 6, or the method 700 in FIG. 7.

When the communications apparatus 1000 is configured to perform the method 300 in FIG. 3, the communications unit 1100 may be configured to perform S320 to S350 in the method 300, and the processing unit 1200 may be configured to perform S310 in the method 300.

When the communications apparatus 1000 is configured to perform the method 400 in FIG. 4, the communications unit 1100 may be configured to perform S420 to S440 in the method 400, and the processing unit 1200 may be configured to perform S410 in the method 400.

When the communications apparatus 1000 is configured to perform the method 500 in FIG. 5, the communications unit 1100 may be configured to perform S520 to S540 in the method 500, and the processing unit 1200 may be configured to perform S510 in the method 500.

When the communications apparatus 1000 is configured to perform the method 600 in FIG. 6, the communications unit 1100 may be configured to perform S620 to S640 in the method 600, and the processing unit 1200 may be configured to perform S610 in the method 600.

When the communications apparatus 1000 is configured to perform the method 700 in FIG. 7, the communications unit 1100 may be configured to perform S720 and S740 in the method 700, and the processing unit 1200 may be configured to perform S730 in the method 700.

It should be understood that a specific process in which each unit performs the foregoing corresponding steps is described in detail in the foregoing method embodiments. For brevity, details are not described herein again.

Figure 9:
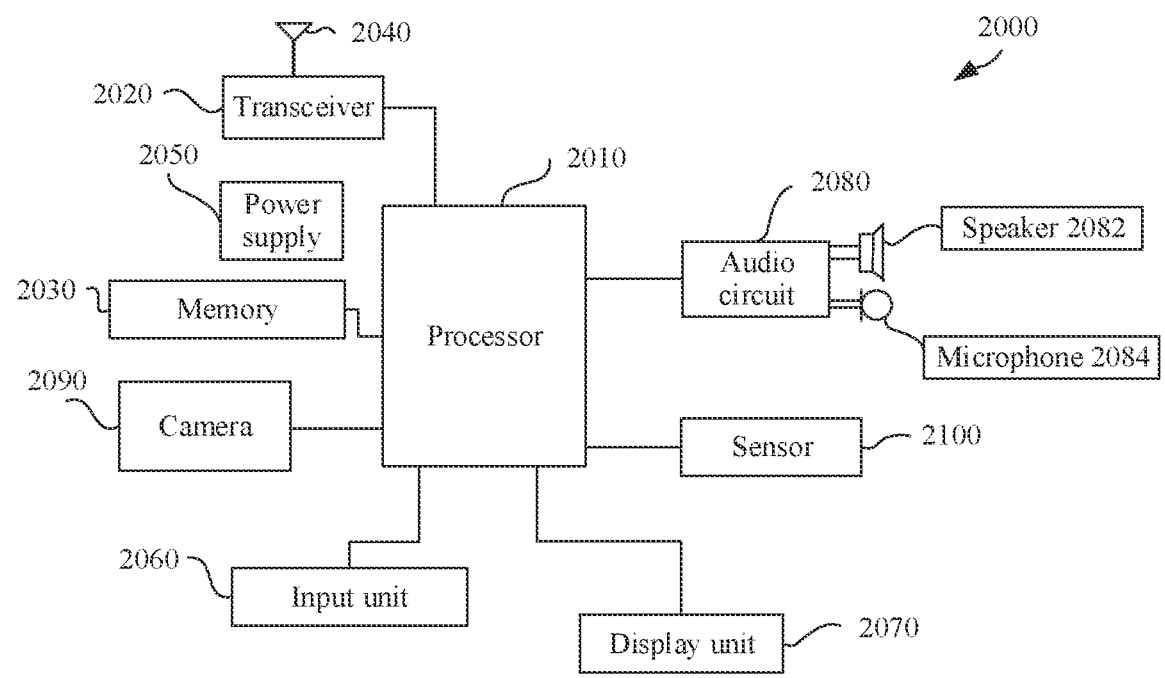
FIG. 9 is a schematic structural diagram of a terminal device according to an embodiment of this application.

It should be further understood that when the communications apparatus 1000 is a terminal device, the communications unit 1100 in the communications apparatus 1000 may correspond to a transceiver 2020 in a terminal device 2000 shown in FIG. 9, and the processing unit 1200 in the communications apparatus 1000 may correspond to a processor 2010 in the terminal device 2000 shown in FIG. 9.

It should be further understood that when the communications apparatus 1000 is a chip configured in a terminal device, the communications unit 1100 in the communications apparatus 1000 may be an input/output interface.

In another possible design, the communications apparatus 1000 may correspond to the network device in the foregoing method embodiments, for example, may be the network device, or a chip configured in the network device.

In an embodiment, the communications unit 1100 is configured to receive first indication information, where the first indication information is used to indicate one or more port selection vectors, one or more frequency domain vectors, and one or more linear combination coefficients, each linear combination coefficient corresponds to one port selection vector and one frequency domain vector, each port selection vector is used to indicate a port of one reference signal, the reference signal is a precoded reference signal, and each frequency domain vector is used to indicate a variation pattern of a channel in frequency domain; and the processing unit 1200 is configured to determine a precoding vector based on the first indication information.

Optionally, the communications unit 1100 is further configured to send second indication information, where the second indication information is used to indicate a length of the port selection vector.

Optionally, the communications unit 1100 is further configured to send third indication information, where the third indication information is used to indicate a length of the frequency domain vector.

Optionally, the first indication information is specifically used to indicate L port selection vectors, K frequency domain vectors, and P*L*K linear combination coefficients, the L port selection vectors are port selection vectors in each of P polarization directions, the K frequency domain vectors are frequency domain vectors in each of the P polarization directions, each of the P*L*K linear combination coefficients corresponds to one port selection vector and one frequency domain vector in each of the P polarization directions, L≥1, K≥1, P≥1, and L, K, and P are integers.

Optionally, the L port selection vectors are obtained from a subset in a predefined port selection vector set, and the port selection vector set includes a plurality of port selection vectors; and when used to indicate the L port selection vectors, the first indication information is specifically used to indicate the subset and indexes of the L port selection vectors in the subset.

Optionally, the first indication information is specifically used to indicate P*L port selection vectors, K frequency domain vectors, and P*L*K linear combination coefficients, the P*L port selection vectors are port selection vectors in P polarization directions, a quantity of port selection vectors in each polarization direction is L, the K frequency domain vectors are frequency domain vectors in each of the P polarization directions, each of the P*L*K linear combination coefficients corresponds to one port selection vector and one frequency domain vector in each of the P polarization directions, L≥1, K≥1, P≥1, and L, K, and P are integers.

Optionally, the L port selection vectors in each of the P polarization directions are obtained from a subset in a predefined port selection vector set, and the port selection vector set includes a plurality of port selection vectors; and when used to indicate the P*L port selection vectors, the first indication information is specifically used to indicate P subsets corresponding to the P polarization directions and indexes of the L port selection vectors in each polarization direction in a corresponding subset.

Optionally, the length of the frequency domain vector is:
a quantity of subbands included in pilot transmission bandwidth configured for a terminal device, where the pilot transmission bandwidth is bandwidth configured to transmit a reference signal, and the reference signal is a reference signal used for channel measurement:
a length of signaling used to indicate a position of a to-be-reported subband and a quantity of to-be-reported subbands; or
a quantity of to-be-reported subbands.

In another embodiment, the communications unit 1100 is configured to receive fourth indication information, where the fourth indication information is used to indicate one or more space-frequency vectors and a linear combination coefficient of each space-frequency vector, where the space-frequency vector is a Kronecker product of a port selection vector and a frequency domain vector, each port selection vector is used to indicate a port of one reference signal, the reference signal is a precoded reference signal, and each frequency domain vector is used to indicate a variation pattern of a channel in frequency domain, and the processing unit 1200 is configured to determine a precoding vector based on the fourth indication information.

Optionally, the communications unit 1100 is further configured to send second indication information, where the second indication information is used to indicate a length of the port selection vector.

Optionally, the communications unit 1100 is further configured to send third indication information, where the third indication information is used to indicate a length of the frequency domain vector.

Optionally, the fourth indication information is specifically used to indicate L space-frequency vectors and P*L linear combination coefficients, the L space-frequency vectors are space-frequency vectors in each of P polarization directions, each of the P*L linear combination coefficients corresponds to one space-frequency vector in each of the P polarization directions, L≥1, P≥1, and both L and P are integers.

Optionally, the L space-frequency vectors are obtained from a subset in a predefined space-frequency vector set, and the space-frequency vector set includes a plurality of space-frequency vectors; and when used to indicate the L space-frequency vectors, the fourth indication information is specifically used to indicate the subset and indexes of the L space-frequency vectors in the subset.

Optionally, the fourth indication information is specifically used to indicate P*L space-frequency vectors and P*L linear combination coefficients, the P*L space-frequency vectors are space-frequency vectors in P polarization directions, a quantity of space-frequency vectors in each polarization direction is L, each of the P*L linear combination coefficients corresponds to one space-frequency vector in each of the P polarization directions, L≥1, P≥1, and both L and P are integers.

Optionally, the L space-frequency vectors in each of the P polarization directions are obtained from a subset in a predefined space-frequency vector set, and the space-frequency vector set includes a plurality of space-frequency vectors; and when used to indicate the P*L space-frequency vectors, the fourth indication information is specifically used to indicate P subsets corresponding to the P polarization directions and indexes of the L space-frequency vectors in each polarization direction in a corresponding subset.

Optionally, the length of the frequency domain vector is:

a quantity of subbands included in pilot transmission bandwidth configured for a terminal device, where the pilot transmission bandwidth is bandwidth configured to transmit a reference signal, and the reference signal is a reference signal used for channel measurement;

a length of signaling used to indicate a position of a to-be-reported subband and a quantity of to-be-reported subbands; or a quantity of to-be-reported subbands.

In still another embodiment, the processing unit 1200 is configured to generate fifth indication information, where the fifth indication information is used to indicate a feedback mode for feeding back a PMI, and the feedback mode is a first feedback mode or a second feedback mode; the first feedback mode is a mode for feeding back the PMI based on a port selection vector set, and the second feedback mode is a mode for feeding back the PMI based on a space-frequency vector set; or the first feedback mode is a mode for feeding back the PMI based only on a port selection vector set, and the second feedback mode is a mode for feeding back the PMI based on the port selection vector set and a frequency domain vector set; the port selection vector set includes a plurality of port selection vectors, each port selection vector is used to indicate a port of one reference signal, and the reference signal is a precoded reference signal; the frequency domain vector set includes a plurality of frequency domain vectors, and each frequency domain vector is used to indicate a variation pattern of a channel in frequency domain and the space-frequency vector set includes a plurality of space-frequency vectors, and each space-frequency vector is a Kronecker product of one port selection vector and one frequency domain vector; and the communications unit 1100 is configured to send the fifth indication information.

Optionally, the fifth indication information is carried in an RRC message.

Specifically, the communications apparatus 1000 may correspond to the network device in the method 300 to the method 700 according to the embodiments of this application. The communications apparatus 1000 may include units configured to perform the steps performed by the network device in the method 300 in FIG. 3, the method 400 in FIG. 4, the method 500 in FIG. 5, the method 600 in FIG. 6, or the method 700 in FIG. 7. In addition, the units in the communications apparatus 1000 and the foregoing other operations and/or functions are used to implement corresponding procedures of the method 300 in FIG. 3, the method 400 in FIG. 4, the method 500 in FIG. 5, the method 600 in FIG. 6, or the method 700 in FIG. 7.

When the communications apparatus 1000 is configured to perform the method 300 in FIG. 3, the communications unit 1100 may be configured to perform S320 to S350 in the method 300, and the processing unit 1200 may be configured to perform S360 in the method 300.

When the communications apparatus 1000 is configured to perform the method 400 in FIG. 4, the communications unit 1100 may be configured to perform S420 to S440 in the method 400, and the processing unit 1200 may be configured to perform S450 in the method 400.

When the communications apparatus 1000 is configured to perform the method 500 in FIG. 5, the communications unit 110 may be configured to perform S520 to S540 in the method 500, and the processing unit 1200 may be configured to perform S550 in the method 500.

When the communications apparatus 1000 is configured to perform the method 600 in FIG. 6, the communications unit 1100 may be configured to perform S620 to S640 in the method 600, and the processing unit 1200 may be configured to perform S650 in the method 600.

When the communications apparatus 1000 is configured to perform the method 700 in FIG. 7, the communications unit 1100 may be configured to perform S720 and S740 in the method 700, and the processing unit 1200 may be configured to perform S710 in the method 700.

It should be understood that a specific process in which each unit performs the foregoing corresponding steps is described in detail in the foregoing method embodiments. For brevity, details are not described herein again.

Figure 10:
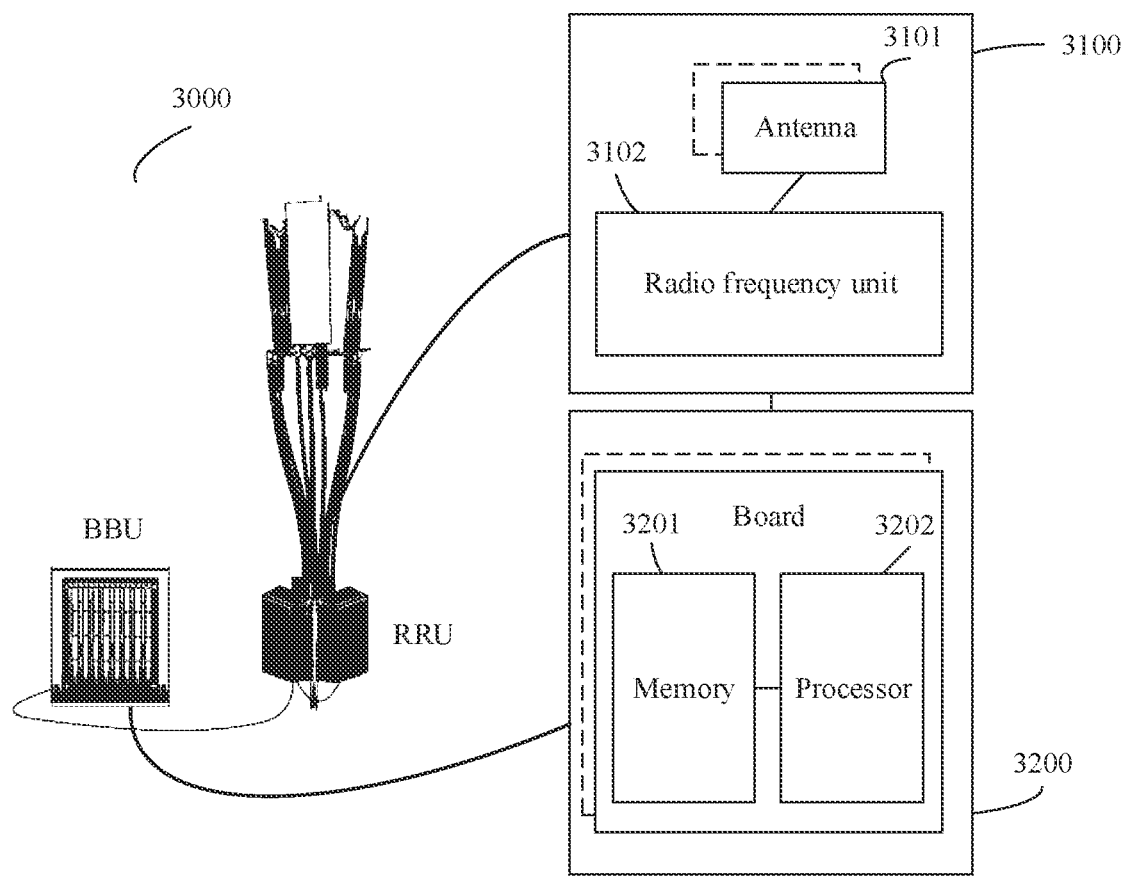
FIG. 10 is a schematic structural diagram of a network device according to an embodiment of this application.

It should be further understood that when the communications apparatus 1000 is a network device, the communications unit in the communications apparatus 1000 may correspond to a transceiver 3200 in a network device 3000 shown in FIG. 10, and the processing unit 1200 in the communications apparatus 1000 may correspond to a processor 3202 in the network device 3000 shown in FIG. 10.

It should be further understood that when the communications apparatus 1000 is a chip configured in a network device, the communications unit 1100 in the communications apparatus 1000 may be an input/output interface.

FIG. 9 is a schematic structural diagram of a terminal device 2000 according to an embodiment of this application. The terminal device 2000 may be applied to the system shown in FIG. 1, and performs functions of the terminal device in the foregoing method embodiments.

As shown in the figure, the terminal device 2000 includes a processor 2010 and a transceiver 2020. Optionally, the terminal device 2000 further includes a memory 2030. The processor 2010, the transceiver 2002, and the memory 2030 may communicate with each other through an internal connection path, to transfer a control signal and/or a data signal. The memory 2030 is configured to store a computer program. The processor 2010 is configured to invoke the computer program from the memory 2030 and run the computer program, to control the transceiver 2020 to send and receive a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit in FIG. 8.

The transceiver 2020 may correspond to the communications unit in FIG. 8, and may also be referred to as a transceiver unit. The transceiver 2020 may include a receiver (or referred to as a receive machine or a receiver circuit) and a transmitter (or referred to as a transmit machine or a transmitter circuit). The receiver is configured to receive a signal, and the transmitter is configured to transmit a signal.

It should be understood that the terminal device 2000 shown in FIG. 9 can implement the processes of the terminal device in the method embodiments shown in FIG. 3 to FIG. 7. The operations and/or the functions of the modules in the terminal device 2000 are intended to implement corresponding procedures in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments, and the transceiver 2020 may be configured to perform an action of receiving or sending that is performed by the terminal device from or to the network device and that is described in the foregoing method embodiments. For details, refer to the descriptions in the foregoing method embodiments. Details are not described herein again.

Optionally, the terminal device 2000 may further include a power supply 2050 that is configured to supply power to various components or circuits in the terminal device.

In addition, to improve functions of the terminal device, the terminal device 2000 may further include one or more of an input unit 2060, a display unit 2070, an audio circuit 2080, a camera 2090, a sensor 2100, and the like. The audio circuit may further include a speaker 2082, a microphone 2084, and the like.

FIG. 10 is a schematic structural diagram of a network device according to an embodiment of this application, for example, may be a schematic structural diagram of a base station. The base station 3000 may be applied to the system shown in FIG. 1, to perform a function of the network device in the foregoing method embodiments.

As shown in the figure, the base station 3000 may include one or more radio frequency units, such as a remote radio unit (RRU) 3100 and one or more baseband units (BBU) (which may also be referred to as digital units, (DU)) 3200. The RRU 3100 may be referred to as a transceiver unit (or a communications unit), and may correspond to the communications unit 1100 in FIG. 8. Optionally, the transceiver unit 3100 may also be referred to as a transceiver machine, a transceiver circuit, a transceiver, or the like, and may include at least one antenna 3101 and a radio frequency unit 3102. Optionally, the transceiver unit 3100 may include a receiving unit and a sending unit. The receiving unit may correspond to a receiver (or referred to as a receive machine or a receiver circuit), and the sending unit may correspond to a transmitter (or referred to as a transmit machine or a transmitter circuit). The RRU 3100 is mainly configured to: receive and send a radio frequency signal, and perform conversion between a radio frequency signal and a baseband signal. For example, the RRU 3100 is configured to send indication information to a terminal device. The BBU 3200 is mainly configured to: perform baseband processing, control the base station, and so on. The RRU 3100 and the BBU 3200 may be physically disposed together, or may be physically disposed separately, to be specific, the base station is a distributed base station.

The BBU 3200 is a control center of the base station, or may be referred to as a processing unit. The BBU 3200 may correspond to the processing unit 1200 in FIG. 8, and is mainly configured to implement a baseband processing function, for example, channel coding, multiplexing, modulation, or spreading. For example, the BBU (a processing unit) may be configured to control the base station to perform an operation procedure related to the network device in the foregoing method embodiments, for example, generate the foregoing indication information.

In an example, the BBU 3200 may include one or more boards, and a plurality of boards may jointly support a radio access network (for example, an LTE network) having a single access standard, or may separately support radio access networks (for example, an LTE network, a 5G network, or another network) having different access standards. The BBU 3200 further includes a memory 3201 and a processor 3202. The memory 3201 is configured to store a necessary instruction and necessary data. The processor 3202 is configured to control the base station to perform a necessary action, for example, is configured to control the base station to perform an operation procedure related to the network device in the foregoing method embodiments. The memory 3201 and the processor 3202 may serve one or more boards. In other words, a memory and a processor may be independently disposed on each board. Alternatively, a plurality of boards may share a same memory and a same processor. In addition, a necessary circuit may further be disposed on each board.

It should be understood that the base station 3000 shown in FIG. 10 can implement the processes of the network device in the method embodiments in FIG. 3 to FIG. 7. The operations and/or the functions of the modules in the base station 3000 are intended to implement corresponding procedures in the foregoing method embodiments. For details, refer to the descriptions in the foregoing method embodiments. To avoid repetition, detailed descriptions are properly omitted herein.

The BBU 3200 may be configured to perform an action that is implemented inside the network device and that is described in the foregoing method embodiments, and the RRU 3100 may be configured to perform an action of receiving or sending that is performed by the network device from or to the terminal device and that is described in the foregoing method embodiments. For details, refer to the descriptions in the foregoing method embodiments. Details are not described herein again.

An embodiment of this application further provides a processing apparatus, including a processor and an interface. The processor is configured to perform the communication method in any one of the foregoing method embodiments.

It should be understood that the processing apparatus may be a chip. For example, the processing apparatus may be a field programmable gate array (FPGA), an application-specific integrated chip (ASIC), a system on chip (SoC), a central processing unit (CPU), a network processor (NP), a digital signal processing circuit (DSP), a micro controller unit (MCU), a programmable controller (PLD), or another integrated chip.

In an implementation process, the steps in the foregoing methods may be completed by using a hardware integrated logic circuit in the processor or instructions in a form of software. The steps of the method disclosed with reference to the embodiments of this application may be directly performed and completed by a hardware processor, or may be performed and completed by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing method in combination with hardware of the processor. To avoid repetition, details are not described herein.

It should be noted that the processor in the embodiments of this application may be an integrated circuit chip, and has a signal processing capability. In an implementation process, the steps in the foregoing method embodiments may be completed by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in the embodiments of this application. The general-purpose processor may be a microprocessor, any conventional processor, or the like. The steps in the methods disclosed with reference to the embodiments of this application may be directly performed and completed by a hardware decoding processor, or may be performed and completed by a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing method in combination with hardware of the processor.

It may be understood that the memory in the embodiments of this application may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM. EPROM), an electrically erasable programmable read-only memory (electrically EPROM, EEPROM), or a flash memory. The volatile memory may be a random-access memory (RAM) that is used as an external cache. Through example but not limitative description, many forms of RAMs are available, for example, a static random-access memory (static RAM, SRAM), a dynamic random access memory (dynamic RAM, DRAM), a synchronous dynamic random access memory (synchronous DRAM, SDRAM), a double data rate synchronous dynamic random-access memory (double data rate SDRAM, DDR SDRAM), an enhanced synchronous dynamic random access memory (enhanced SDRAM, ESDRAM), a SynchLink dynamic random-access memory (SynchLink DRAM, SLDRAM), and a direct rambus random-access memory (direct rambus RAM, DR RAM). It should be noted that the memory of the systems and methods described in this specification includes but is not limited to these types of memories and any memory of another proper type.

According to the methods provided in the embodiments of this application, this application further provides a computer program product. The computer program product includes computer program code. When the computer program code is run on a computer, the computer is enabled to perform the signal receiving and sending method in any one of the embodiments shown in FIG. 3 to FIG. 7.

According to the methods provided in the embodiments of this application, this application further provides a computer-readable medium. The computer-readable medium stores program code. When the program code is run on a computer, the computer is enabled to perform the signal receiving and sending method in any one of the embodiments shown in FIG. 3 to FIG. 7.

According to the methods provided in the embodiments of this application, this application further provides a system. The system includes the foregoing one or more terminal devices and the foregoing one or more network devices.

The network device and the terminal device in the foregoing apparatus embodiments completely correspond to the network device and the terminal device in the method embodiments. A corresponding module or unit performs a corresponding step. For example, a communications unit (a transceiver) performs a receiving step or a sending step in the method embodiments, and another step other than the sending step and the receiving step may be performed by a processing unit (a processor). For a function of a specific unit, refer to the corresponding method embodiments. There may be one or more processors.

Terms such as "component". "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed by various computer-readable media that store various data structures. For example, the components may communicate by using a local and/or remote process based on a signal having one or more data packets (for example, data from two components interacting with another component in a local system, a distributed system, and/or across a network such as the internet interacting with another system by using the signal).

A person of ordinary skill in the art may be aware that illustrative logical blocks and steps described with reference to the embodiments disclosed in this specification may be implemented by electronic hardware or a combination of computer software and electronic hardware. Whether the functions are performed by hardware or software depends on a particular application and a design constraint of the technical solutions. A person skilled in the art may use different methods to implement the described functions for each particular application, but it should not be considered that such an implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

In the foregoing embodiments, all or some of the functions of the functional units may be implemented by software, hardware, firmware, or any combination thereof. When software is used for implementation, all or some of the embodiments may be implemented in a form of computer program product. The computer program product includes one or more computer instructions (programs). When the computer program instructions (programs) are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random-access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
generating first indication information that indicates one or more port selection vectors, one or more frequency domain vectors, and one or more linear combination coefficients, wherein each of the one or more linear combination coefficients corresponds to a port selection vector and a frequency domain vector, each of the one or more port selection vectors indicates a port of a precoded reference signal, and each of the one or more frequency domain vectors indicates a variation pattern of a channel in a frequency domain; and
sending the first indication information.

2. The method according to claim 1, further comprising:
receiving second indication information indicating a length of the port selection vector.

3. The method according to claim 2, further comprising:
receiving third indication information indicating a length of the frequency domain vector.

4. The method according to claim 1, wherein the first indication information indicates L port selection vectors, K frequency domain vectors, and P*L*K linear combination coefficients, the L port selection vectors are port selection vectors in each of P polarization directions, the K frequency domain vectors are frequency domain vectors in each of the P polarization directions, each of the P*L*K linear combination coefficients corresponds to a port selection vector and a frequency domain vector in each of the P polarization directions.

5. The method according to claim 1, wherein the first indication information indicates L port selection vectors, the L port selection vectors are obtained from a subset in a predefined port selection vector set that comprises a plurality of port selection vectors; and wherein the first indication information further indicates the subset and indexes of the L port selection vectors in the subset.

6. The method according to claim 1, wherein the first indication information indicates P*L port selection vectors, K frequency domain vectors, and P*L*K linear combination coefficients, the P*L port selection vectors are port selection vectors in P polarization directions, a quantity of port selection vectors in each of the P polarization directions is L, the K frequency domain vectors are in each of the P polarization directions, each of the P*L*K linear combination coefficients corresponds to a port selection vector and a frequency domain vector in each of the P polarization directions.

7. The method according to claim 6, wherein the L port selection vectors in each of the P polarization directions are obtained from a subset in a predefined port selection vector set that comprises a plurality of port selection vectors; and wherein
the first indication information further indicates P subsets corresponding to the P polarization directions and indexes of the L port selection vectors in each of the P polarization directions.

8. The method according to claim 1, wherein a length of the frequency domain vector is at least one of:
a quantity of subbands comprised in a pilot transmission bandwidth configured for a terminal device, wherein the pilot transmission bandwidth is configured to transmit a reference signal used for channel measurement;
a length of signaling for indicating positions of subbands to be reported; or
a quantity of the subbands to be reported.

9. A method comprising:
receiving first indication information that indicates one or more port selection vectors, one or more frequency domain vectors, and one or more linear combination coefficients, wherein each of the one or more linear combination coefficients corresponds to a port selection vector and a frequency domain vector, each of the one or more port selection vectors indicates a port of a precoded reference signal, and each of the one or more frequency domain vectors indicates a variation pattern of a channel in a frequency domain; and
determining a precoding vector based on the first indication information.

10. The method according to claim 9, further comprising:
sending second indication information indicating a length of the port selection vector.

11. The method according to claim 10, further comprising:
sending third indication information indicating a length of the frequency domain vector.

12. The method according to claim 9, wherein the first indication information indicates L port selection vectors, K frequency domain vectors, and P*L*K linear combination coefficients, the L port selection vectors are port selection vectors in each of P polarization directions, the K frequency domain vectors are frequency domain vectors in each of the P polarization directions, each of the P*L*K linear combination coefficients corresponds to a port selection vector and a frequency domain vector in each of the P polarization directions.

13. The method according to claim 9, wherein the first indication information indicates L port selection vectors, the L port selection vectors are obtained from a subset in a predefined port selection vector set that comprises a plurality of port selection vectors; and wherein the first indication information further indicates the subset and indexes of the L port selection vectors in the subset.

14. The method according to claim 9, wherein the first indication information indicates P*L port selection vectors, K frequency domain vectors, and P*L*K linear combination coefficients, the P*L port selection vectors are port selection vectors in P polarization directions, a quantity of port selection vectors in each of the P polarization direction is L, the K frequency domain vectors are in each of the P polarization directions, each of the P*L*K linear combination coefficients corresponds to a port selection vector and a frequency domain vector in each of the P polarization directions.

15. The method according to claim 14, wherein the L port selection vectors in each of the P polarization directions are obtained from a subset in a predefined port selection vector set that comprises a plurality of port selection vectors; and wherein the first indication information further indicates P subsets corresponding to the P polarization directions and indexes of the L port selection vectors in each of the P polarization directions.

16. The method according to claim 9, wherein a length of the frequency domain vector is at least one of:
a quantity of subbands comprised in a pilot transmission bandwidth configured for a terminal device, wherein the pilot transmission bandwidth is configured to transmit a reference signal used for channel measurement;
a length of signaling for indicating positions of subbands to be reported; or
a quantity of the subbands to be reported.

17. A processing apparatus, comprising:
at least one processor; and
one or more memories coupled to the at least one processor and storing programming instructions for execution by the at least one processor to perform operations comprising:
generating first indication information that indicates one or more port selection vectors, one or more frequency domain vectors, and one or more linear combination coefficients, wherein each of the one or more linear combination coefficients corresponds to a port selection vector and a frequency domain vector, each of the one or more port selection vectors indicates a port of a precoded reference signal, and each of the one or more frequency domain vectors indicates a variation pattern of a channel in a frequency domain; and
sending the first indication information.

18. The apparatus according to claim 17, the operations further comprising:
receiving second indication information indicating a length of the port selection vector.

19. The apparatus according to claim 18, the operations further comprising: receiving third indication information indicating a length of the frequency domain vector.

20. The apparatus according to claim 17, wherein the first indication information indicates L port selection vectors, K frequency domain vectors, and P*L*K linear combination coefficients, the L port selection vectors are port selection vectors in each of P polarization directions, the K frequency domain vectors are frequency domain vectors in each of the P polarization directions, each of the P*L*K linear combination coefficients corresponds to a port selection vector and a frequency domain vector in each of the P polarization directions.

21. The apparatus according to claim 17, wherein the first indication information indicates L port selection vectors, the L port selection vectors are obtained from a subset in a predefined port selection vector set that comprises a plurality of port selection vectors; and wherein the first indication information further indicates the subset and indexes of the L port selection vectors in the subset.

22. A non-transitory computer-readable medium, comprising one or more instructions executable by at least one processor to perform operations comprising:
  generating first indication information that indicates one or more port selection vectors, one or more frequency domain vectors, and one or more linear combination coefficients, wherein each of the one or more linear combination coefficients corresponds to a port selection vector and a frequency domain vector, each of the one or more port selection vectors indicates a port of a precoded reference signal, and each of the one or more frequency domain vectors indicates a variation pattern of a channel in a frequency domain; and
  sending the first indication information.

23. The non-transitory computer-readable medium according to claim 22, the operations further comprising:
  receiving second indication information indicating a length of the port selection vector.

24. The non-transitory computer-readable medium according to claim 23, the operations further comprising: receiving third indication information indicating a length of the frequency domain vector.

25. The non-transitory computer-readable medium according to claim 22, wherein the first indication information indicates L port selection vectors, the L port selection vectors are obtained from a subset in a predefined port selection vector set that comprises a plurality of port selection vectors; and wherein the first indication information further indicates the subset and indexes of the L port selection vectors in the subset.

26. A processing apparatus, comprising:
  at least one processor; and
  one or more memories coupled to the at least one processor and storing programming instructions for execution by the at least one processor to perform operations comprising:
  receiving first indication information that indicates one or more port selection vectors, one or more frequency domain vectors, and one or more linear combination coefficients, wherein each of the one or more linear combination coefficients corresponds to a port selection vector and a frequency domain vector, each of the one or more port selection vectors indicates a port of a precoded reference signal, and each of the one or more frequency domain vectors indicates a variation pattern of a channel in a frequency domain; and
  determining a precoding vector based on the first indication information.

27. The processing apparatus according to claim 26, the operations further comprising:
  sending second indication information indicating a length of the port selection vector.

28. The processing apparatus according to claim 26, the operations further comprising:
  sending third indication information indicating a length of the frequency domain vector.

29. The processing apparatus according to claim 26, wherein the first indication information indicates L port selection vectors, the L port selection vectors are obtained from a subset in a predefined port selection vector set that comprises a plurality of port selection vectors; and wherein the first indication information further indicates the subset and indexes of the L port selection vectors in the subset.

30. A non-transitory computer-readable medium, comprising one or more instructions executable by at least one processor to perform operations comprising:
  receiving first indication information that indicates one or more port selection vectors, one or more frequency domain vectors, and one or more linear combination coefficients, wherein each of the one or more linear combination coefficients corresponds to a port selection vector and a frequency domain vector, each of the one or more port selection vectors indicates a port of a precoded reference signal, and each of the one or more frequency domain vectors indicates a variation pattern of a channel in a frequency domain; and determining a precoding vector based on the first indication information.

31. The non-transitory computer-readable medium according to claim 30, the , operations further comprising:
  sending second indication information indicating a length of the port selection vector.

32. The non-transitory computer-readable medium according to claim 30, the operations further comprising:
  sending third indication information indicating a length of the frequency domain vector.

33. The non-transitory computer-readable medium according to claim 30, wherein the first indication information indicates L port selection vectors, the L port selection vectors are obtained from a subset in a predefined port selection vector set that comprises a plurality of port selection vectors; and wherein
  the first indication information further indicates the subset and indexes of the L port selection vectors in the subset.

* * * * *

UNITED STATES PATENT AND TRADEMARK OFFICE
CERTIFICATE OF CORRECTION

PATENT NO. : 11,411,620 B2
APPLICATION NO. : 17/176529
DATED : August 9, 2022
INVENTOR(S) : Huangping Jin et al.

It is certified that error appears in the above-identified patent and that said Letters Patent is hereby corrected as shown below:

In the Claims

On Column 76 Line 13, In Claim 28, delete "claim 26," and insert -- claim 27, --.

On Column 76 Line 40, In Claim 31, delete "the ," and insert -- the --.

Signed and Sealed this
Twenty-second Day of November, 2022

*Katherine Kelly Vidal*
*Director of the United States Patent and Trademark Office*